United States Patent
Shipman et al.

(10) Patent No.: US 12,208,861 B2
(45) Date of Patent: Jan. 28, 2025

(54) BICYCLE GEAR SHIFTING SYSTEM

(71) Applicant: SRAM, LLC, Chicago, IL (US)

(72) Inventors: Christopher Shipman, Chicago, IL (US); Brian Jordan, Highland Park, IL (US); Sage Hahn, Chicago, IL (US)

(73) Assignee: SRAM, LLC, Chicago, IL (US)

(*) Notice: Subject to any disclaimer, the term of this patent is extended or adjusted under 35 U.S.C. 154(b) by 1063 days.

(21) Appl. No.: 16/659,020

(22) Filed: Oct. 21, 2019

(65) Prior Publication Data

US 2020/0140035 A1 May 7, 2020

Related U.S. Application Data

(60) Provisional application No. 62/801,085, filed on Feb. 4, 2019, provisional application No. 62/754,312, filed on Nov. 1, 2018.

(51) Int. Cl.
| | | |
|---|---|---|
| *B62M 9/1346* | (2010.01) |
| *B62M 9/04* | (2006.01) |
| *B62M 9/10* | (2006.01) |
| *B62M 9/131* | (2010.01) |
| *B62M 9/132* | (2010.01) |
| *B62M 9/134* | (2010.01) |
| *B62M 9/14* | (2006.01) |

(52) U.S. Cl.
CPC ............ *B62M 9/1346* (2013.01); *B62M 9/04* (2013.01); *B62M 9/105* (2013.01); *B62M 9/132* (2013.01); *B62M 9/134* (2013.01); *B62M 9/131* (2013.01); *B62M 9/14* (2013.01)

(58) Field of Classification Search
CPC .......... B62M 9/04; B62M 9/10; B62M 9/105; B62M 9/131; B62M 9/132; B62M 9/133; B62M 9/134; B62M 9/1344; B62M 9/1346; B62M 9/14; B62M 9/122; B62M 9/1244; B62M 9/1246
USPC ......................................................... 474/80
See application file for complete search history.

(56) References Cited

U.S. PATENT DOCUMENTS

| | | |
|---|---|---|
| 426,524 A | 4/1890 | Clough |
| 639,548 A | 12/1899 | Field |
| 737,746 A | 9/1903 | Seabury |

(Continued)

FOREIGN PATENT DOCUMENTS

| | | |
|---|---|---|
| DE | 102018111714 A1 | 11/2018 |
| EP | 3251940 A1 | 12/2017 |

(Continued)

*Primary Examiner* — Michael R Mansen
*Assistant Examiner* — Raveen J Dias

(57) ABSTRACT

A bicycle front shifting system includes operable to transmit a wireless signal, a crank assembly with two crank arms and a pedal on each of the two crank arms. The crank assembly is rotatable about a rotation axis. A front shift unit is coupled to the crank assembly and is rotatable about the rotation axis. The front shift unit includes a chain ring component with a big chain ring and a small chain ring. The small chain ring has a small diameter and the big chain ring has a big diameter that is larger than the small diameter. A shift mechanism is coupled to and rotatable with the chain ring component about the rotation axis. The shift mechanism is configured to receive the wireless signal from the shifter and to shift a chain between the big chain ring and the small chain ring according to the wireless signal.

17 Claims, 61 Drawing Sheets

(56) References Cited

U.S. PATENT DOCUMENTS

| | | | |
|---|---|---|---|
| 881,729 A | 3/1908 | Smith | |
| 4,580,997 A * | 4/1986 | Browning | B62M 9/14 |
| | | | 474/160 |
| 4,592,738 A * | 6/1986 | Nagano | B62M 9/14 |
| | | | 474/162 |
| 5,205,794 A | 4/1993 | Browning | |
| 5,354,243 A * | 10/1994 | Kriek | B62M 9/14 |
| | | | 474/135 |
| 6,431,573 B1 | 8/2002 | Lerman et al. | |
| 8,909,424 B2 | 12/2014 | Jordan | |
| 9,394,030 B2 | 7/2016 | Shipman | |
| 9,499,233 B2 * | 11/2016 | Schuster | B62M 9/06 |
| 10,167,055 B2 | 1/2019 | Macgee | |
| 10,220,913 B2 | 3/2019 | Kitamura | |
| 10,435,112 B2 * | 10/2019 | Tetsuka | B62M 9/16 |
| 10,703,443 B2 * | 7/2020 | Schuster | B62M 9/12 |
| 10,989,281 B2 * | 4/2021 | Allen | B62M 9/10 |
| 11,214,333 B2 * | 1/2022 | Zubieta Andueza | B62M 9/14 |
| 11,279,441 B2 * | 3/2022 | Zubieta Andueza | B62M 9/12 |
| 2002/0084618 A1 | 7/2002 | Lerman et al. | |
| 2006/0063624 A1 | 3/2006 | Voss | |
| 2011/0028252 A1 | 2/2011 | Tzvetkov | |
| 2013/0008282 A1 * | 1/2013 | Johnson | B62M 3/00 |
| | | | 74/594.2 |
| 2013/0225340 A1 | 8/2013 | Tzvetkov | |
| 2014/0114538 A1 | 4/2014 | Shipman | |
| 2014/0248982 A1 * | 9/2014 | Schuster | B62M 9/06 |
| | | | 474/69 |
| 2015/0274253 A1 * | 10/2015 | Hara | B62M 1/36 |
| | | | 74/594.2 |
| 2017/0283006 A1 * | 10/2017 | Schuster | F16H 55/54 |
| 2018/0339747 A1 * | 11/2018 | Niki | B62J 43/20 |
| 2019/0308692 A1 * | 10/2019 | Schuster | B62M 9/1342 |
| 2020/0231249 A1 * | 7/2020 | Ho | B62K 23/06 |
| 2020/0331557 A1 * | 10/2020 | Schuster | B62M 9/12 |
| 2020/0377174 A1 * | 12/2020 | Allen | B62M 9/04 |
| 2021/0031877 A1 * | 2/2021 | Zubieta Andueza | B62M 9/105 |
| 2021/0031879 A1 * | 2/2021 | Zubieta Andueza | B62M 9/105 |

FOREIGN PATENT DOCUMENTS

| | | |
|---|---|---|
| FR | 3046985 A1 | 7/2017 |
| WO | 2018007264 A1 | 1/2018 |

* cited by examiner

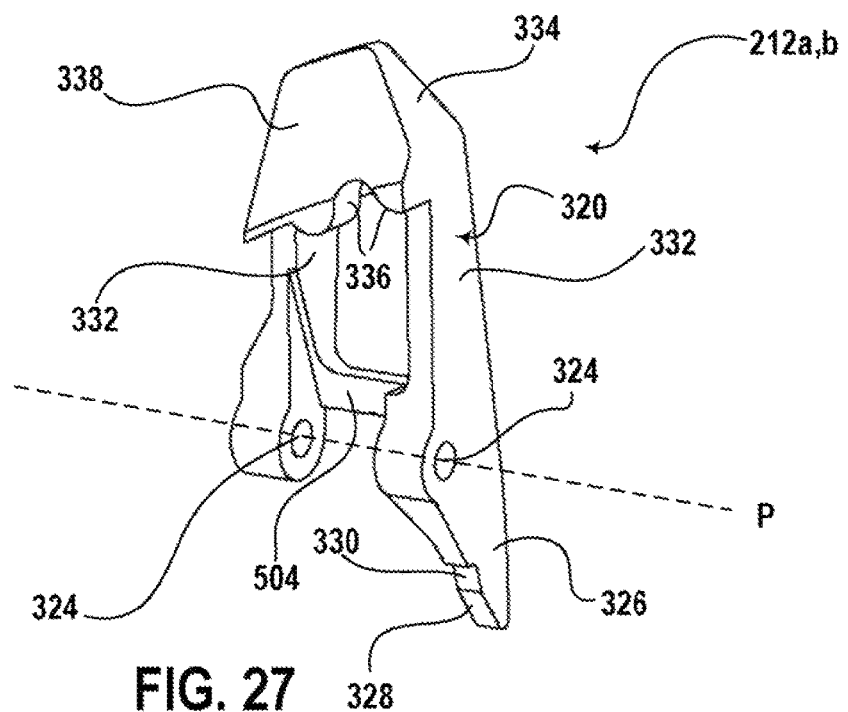
FIG. 27
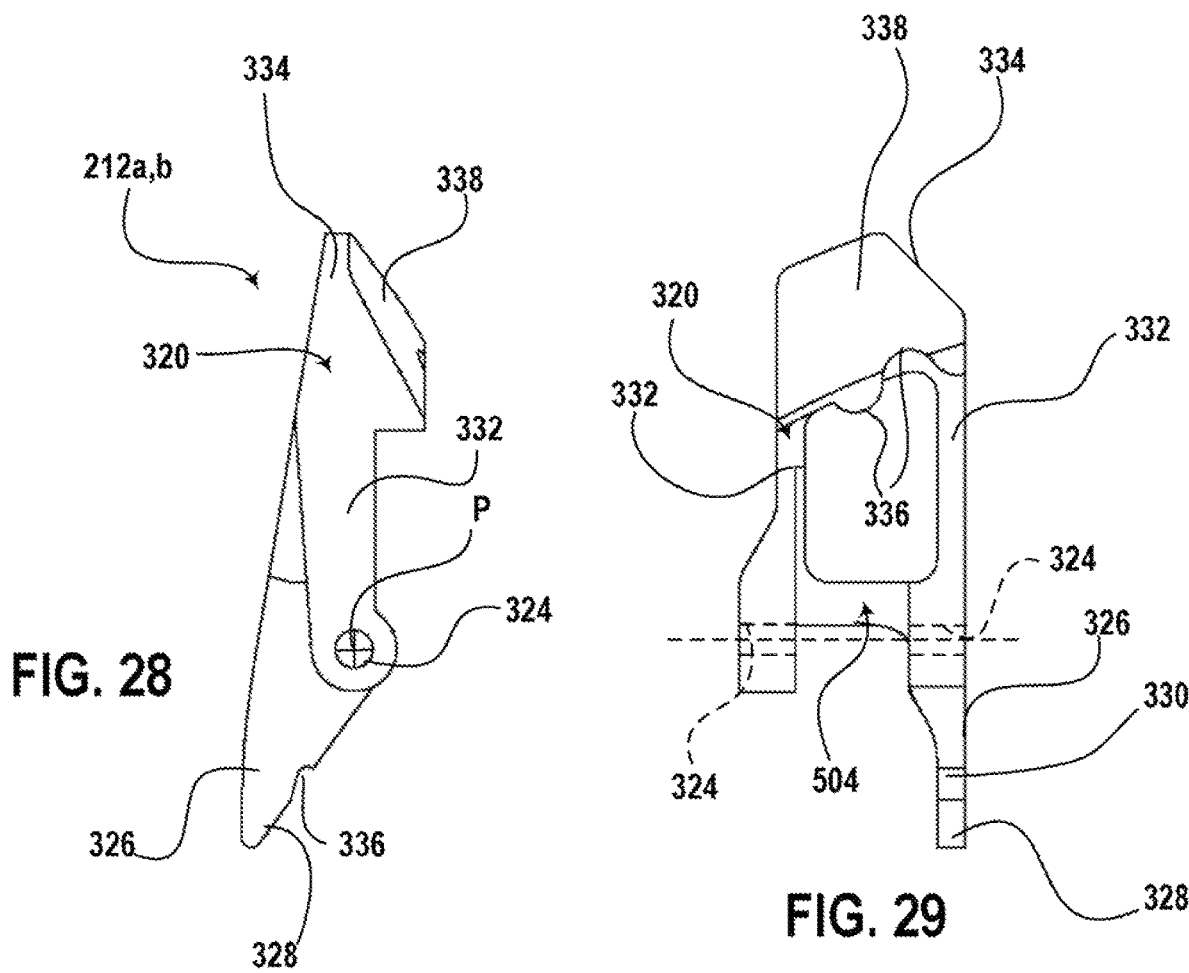
FIG. 28
FIG. 29

BICYCLE GEAR SHIFTING SYSTEM

RELATED APPLICATION DATA

This patent is related to and claims priority benefit of prior filed U.S. provisional application Ser. No. 62/754,312, filed Nov. 1, 2018 and U.S. provisional application Ser. No. 62/801,085, filed Feb. 4, 2019. The entire contents of these prior filed applications are hereby incorporated herein by reference.

BACKGROUND

1. Field of the Disclosure

The present disclosure is generally directed to front shifting systems for bicycles, and more particularly to a front shifting system that is incorporated as a part of a crank assembly of a bicycle.

2. Description of Related Art

A bicycle typically includes a system for driving a chain on a bicycle to provide motive force for the system. A driving system typically involves a front and a rear drive.

Rear cassette and front chain ring shifting systems for bicycles are known in the art. Such shifting systems typically utilize a front or rear derailleur to move the chain from one sprocket or chain ring to another. The typical front or rear derailleur is mounted to a stationary part of a frame of a bicycle. A rear derailleur is typically mounted to or directly adjacent to the rear wheel dropouts on the bicycle frame. Thus, the frame is often provided with a bracket at the dropout location for attaching the rear derailleur.

Traditional front drive systems include a crank assembly. The crank assembly may include two crank arms connected by a spindle. The crank assembly may also include one or more driving sprockets. When two or more driving sprockets are used various techniques for shifting the chain from one driving sprocket to another driving sprocket have been used.

The most common technique involves the use of a front gear changing device, such as a front derailleur typically mounted to a frame of a bicycle, the includes plates positioned on either side of the chain to push the chain between driving sprockets. The front derailleur is typically mounted to the seat tube or other part of a bicycle frame that is closely adjacent the front chain rings of the crank assembly. An open, accessible location must then be left on the seat tube frame to accommodate clamping a front derailleur to the tube. In some cases, a mounting bracket is provided on the bicycle frame for attaching the front derailleur to the frame. The pushing technique of front derailleurs can cause rough drive transitions between driving sprockets, and can be problematic when shifting under load.

Existing front derailleurs can create several other problems, disadvantages, or drawbacks for the bicycle, including the frame designer. For example, the frame designer must account for a mounting location for the front derailleur when designing the frame of a bicycle with a front shifting system. Thus, a portion of the frame must be left accessible and positioned relatively close to the front chain rings. Having to accommodate for mounting a front derailleur to a part of the bicycle frame places design constraints on the designer. It is possible that, when mounting the front derailleur to the bicycle frame, the derailleur is incorrectly positioned relative to the front chain rings. This can reduce the quality and effectiveness of a front shifting operation or can result in the inability to shift, particularly when the chain is under heavy loads.

Also, mounting the front derailleur to a portion of the bicycle frame effectively makes the frame a part of the front shifting system. While a bicycle is being ridden, the frame can flex when under stress. Any movement or flexing of the frame where the front derailleur is mounted or between that mounting location and the attachment point of the front chain rings can cause shifting problems. For example, a rider may attempt to execute a shift operation while the frame is flexed, resulting in misalignment of the front derailleur and the front chain rings. Such misalignment can again result in poor shift quality, cause the chain to derail, or allow the chain to slip during the shift. Such misalignment may again result in the inability to execute a shift, particularly under heavy chain loads.

The known front derailleur designs also can make installation and bicycle set-up more difficult, and thus more time consuming and/or expensive. The installer must take the steps necessary to separately obtain the clamps or fasteners, the necessary tools, and the derailleur and then install the front derailleur on the bicycle frame. The installer, or another person tuning or setting up the bicycle, must then also properly position and align the front derailleur relative to the front chain rings during set-up of the system. The set-up can be difficult to do for those lacking specific skills and training. Proper positioning and alignment of the front derailleur relative to the front chain rings is required to ensure quality shifting capability.

SUMMARY

In an example a bicycle front shifting assembly is presented. The front shifting assembly includes a front shift unit configured to be coupled to a crank assembly for rotation therewith about a rotation axis, the front shift unit having a chain ring component and a shift mechanism coupled to the chain ring component. The chain ring component has a big chain ring having a plurality of teeth defining a big chainring plane and a small chain ring having a plurality of teeth defining a small chainring plane, the small chain ring having a small diameter and the big chain ring having a big diameter that is larger than the small diameter. The shift mechanism includes at least one protruding shift element disposed in a transition zone between the big chain ring and the small chain ring, the shift mechanism configured to move the at least one protruding shift element axially between the big chainring plane and the small chainring plane.

In an example, a front shift unit for a bicycle is provided. The front shift unit includes a chain ring component having a big chain ring and a small chain ring joined for co-rotation with one another about a rotation axis, the big chain ring having a big diameter and a plurality of big ring sprocket teeth and the small chain ring having a small diameter and a plurality of small ring sprocket teeth, the big diameter being larger than the small diameter. The front shift unit also includes a shift mechanism coupled to the chain ring component, the shift mechanism including an electronic control unit, a gearmotor unit, at least one upshift element, at least one downshift element, and a power supply arranged to provide power for the electronic control unit and the gearmotor unit to operate the at least one upshift element and the at least one downshift element. The at least one upshift element is disposed in a transition zone between the small chain ring teeth and the big chain ring teeth and axially movable by the electronic control unit and the gearmotor unit to shift a chain from the plurality of small ring sprocket teeth on the small chain ring to the plurality of big ring sprocket teeth on the big chain ring. The at least one downshift element is operable by the electronic control unit and the gearmotor unit to shift a chain from the plurality of big ring sprocket teeth on the big chain ring to the plurality of small ring sprocket teeth on the small chain ring.

BRIEF DESCRIPTION OF THE DRAWINGS

Objects, features, and advantages of the present invention will become apparent upon reading the following description in conjunction with the drawing figures, in which:

FIG. 27 shows a perspective view of one example of a downshift element of the shift mechanism for the front shift unit of FIG. 10 in accordance with the teachings of the present disclosure.

FIG. 28 shows a front view of the downshift element of FIG. 27.

FIG. 29 shows a left or inboard side view of the downshift element of FIG. 27.

DETAILED DESCRIPTION OF THE DISCLOSURE

Figure 1:
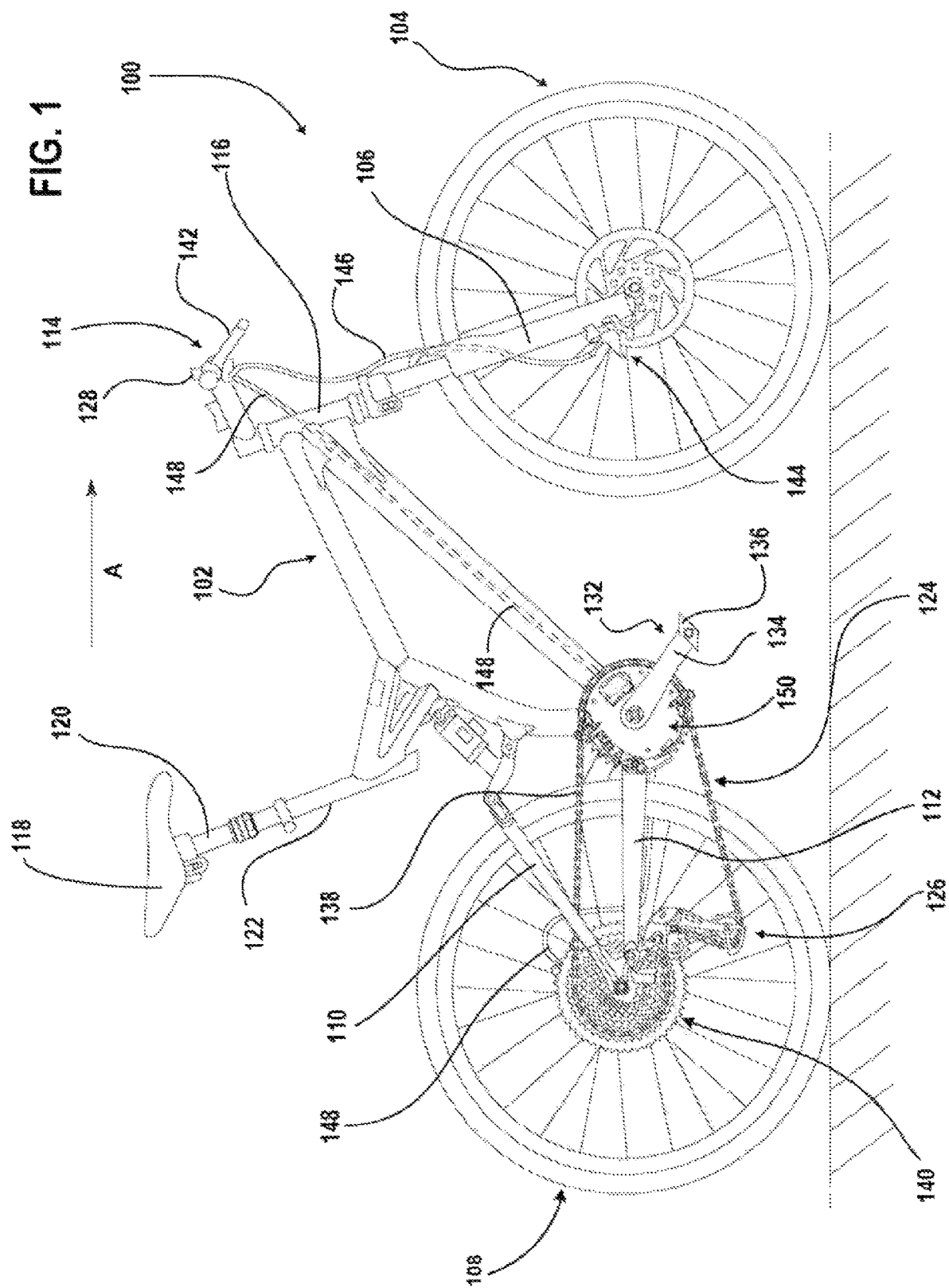
FIG. 1 shows a side view of one example of a bicycle in a conventional road-ready condition, the bicycle including a front shifting system in accordance with the teachings of the present disclosure.

The present disclosure is related to front shifting systems for bicycles and to bicycles that incorporate such front shifting systems. The disclosed front shifting systems and bicycles solve or improve upon the above-noted and/or other problems and disadvantages with prior known front shifting systems and bicycles. The front shifting systems disclosed herein is incorporated entirely on the chain ring components, with no part separately attached to the bicycle frame. This provides frame designers with greater freedom of design, since the designers do not have to accommodate a portion of the front shifting system on the frame. The disclosed front shifting systems thus also eliminate the possibility of incorrectly positioning a portion of the front shifting system relative to the chain rings. The disclosed front shifting systems also improve shift performance because, since the bicycle frame is not a part of the front shifting system, any flex in the frame during use does not cause any problems while shifting. The disclosed front shifting systems can also be installed on bicycle frames that are not designed for mounting a front gear changer or derailleur. The disclosed front shifting systems shift smoothly and consistently, even while under heavy chain loads. The disclosed front shifting systems are easier to install and set up than a traditional front gear changer or derailleur and do not require specific skills or training. These and other objects, features, and advantages of the disclosed hub assemblies and trainers will become to those having ordinary skill in the art upon reading this disclosure.

Those having ordinary skill in the art should understand that the drawings and detailed description provided herein are for illustration only and do not limit the scope of the inventions or the disclosure. The appended claims define the scope of the inventions and the disclosure. The detailed description below may use terms such as "first", "second", "third", "top", "bottom", "left", "right", "front", "rear", and/or the like. Use of such terms is only intended for clarity and often merely to differentiate among parts and components having the same names. Use of such terms is not intended to limit the scope of the disclosure to a specific order, arrangement, or orientation of such parts or components unless specifically stated herein. Further, such terms may refer to bicycle mechanisms that are conventionally mounted to a bicycle and with the bicycle oriented and used in a standard manner, unless otherwise indicated.

Also, multiple embodiments of the disclosed front shifting systems and bicycles may be disclosed and described herein. Each embodiment may have a specific combination of features, parts, components, functions, aspects, or the like. The scope of the disclosure is not intended to be limited solely to those specific combinations. Each of the disclosed features, parts, components, functions, aspects and the like may be employed independent of one another or in other combinations not specifically disclosed or described herein.

Exchanging, or shifting, a chain between two or more sprockets may be accomplished with at least one ("1") shift element being moved into a chainline of a drive system. The shift elements may be protruding shift elements may move in an axial direction relative to a rotational axis of the sprockets. The protruding shift elements may be configured to extend and/or retract in the axial direction for moving into and/or out of the chainline. The at least one moving shift element may be disposed radially between a root circle of a larger sprocket and a tooth tip of a smaller sprocket. The at least one moving shift element may include an array or plurality of protruding shift elements. The protruding shift elements of the array may be disposed at different radial distances relative to the larger and/or smaller sprockets.

Exchanging, or shifting, a change between two or more sprockets may be accomplished from a larger sprocket to a smaller sprocket using downshifting element, which may be formed as a slide or slanted planar surface that may be moved into, and/or out of, the chainline at the larger sprocket to cause the chain to slide or shift towards the smaller sprocket.

A device for a cycle drive train may include movable shift elements. The movable shift elements may be disposed on a chain ring structure. The device for a cycle drive train may include movable down shift elements. The movable down shift elements may include a slanted surface configured to be moved into a chainline of a large chain ring. The device for a cycle drive train may include electronic and/or electrical elements configured to control and/or operate shift elements. The electronic and/or electrical elements may be disposed on a chain ring structure. The electronic and/or electrical elements may include an electric motor, electrical linear actuators, solenoids, or other electrical devices operable to cause motion or movement. In an example, the electric motor, or other electrical motive device, is configured to cause movement of the shift elements.

Turning now to the drawings, FIG. 1 depicts one example of a bicycle 100 with a frame 102, a front wheel 104 coupled to a fork 106 of the frame, and a rear wheel 108 coupled to seat stays 110 and chain stays 112 on the frame. The wheels 104, 108 support the frame 102 above a surface on which the bicycle 100 can travel in a forward direction indicated by the arrow 'A'. The bicycle 100 has a handlebar assembly 114 that is mounted to a head tube 116 of the frame 102. The bicycle 100 also has a seat 118 carried by a seat post 120 received in a seat tube 122 of the frame 102.

The bicycle 100 has a multiple-geared drivetrain 124 that may have one or both of a front gear changer (described further below as a front shifting system) and a rear gear changer mounted to the frame 102. The gear changers may be electromechanical derailleurs, for example, including a rear derailleur 126 and a front shifting system, which is described in detail below. The gear changers can be operable using a one or more gear shifters 128, which may be mounted to the handlebar assembly 114. The gear shifters 128 may operate the gear changes through wireless communication, as in the disclosed example, or via a physical connection using a mechanical shift cable or hydraulic line (not shown). The drivetrain 124 includes chain rings, also described in detail below, that are driven by a crank assembly 132, which has two crank arms 134 and two pedals, respectively 136. The chain rings are connected by a chain 138 to a plurality of sprockets on the frame 102 at the rear wheel 108. The plurality of sprockets may be identified as a rear cassette 140 mounted to the frame 102 coaxial with the rear wheel 108. The bicycle 100 as described above, other than the chain rings and the front shifting system, is known in the art and is shown in FIG. 1 to be a mountain bike. Those having ordinary skill in the art should recognize that the type and style of bicycle may vary from the disclosed example. For example, a road bicycle with drop-style handlebars, along with a drivetrain having road type gearing with a road gear range may be used instead of a mountain bike or other bicycle gear range.

In this example, the bicycle 100 includes brake system. The brake system includes at least one brake lever 142 that is movably connected to the handlebar assembly 114. The brake lever 142 is configured to operate components of the braking system of the bicycle 100. In one example, the brake system can include one or both of a hydraulic or cable actuated front brake mechanism 144 coupled to the front wheel 104 via a hydraulic line or mechanical cable 146 and a hydraulic or cable actuated rear brake mechanism (not shown) coupled to the rear wheel 108 through a hydraulic line or mechanical cable 148. As noted above, the brake system can be a hydraulic actuated system or a mechanical actuated system and both are known in the art.

Figure 2:
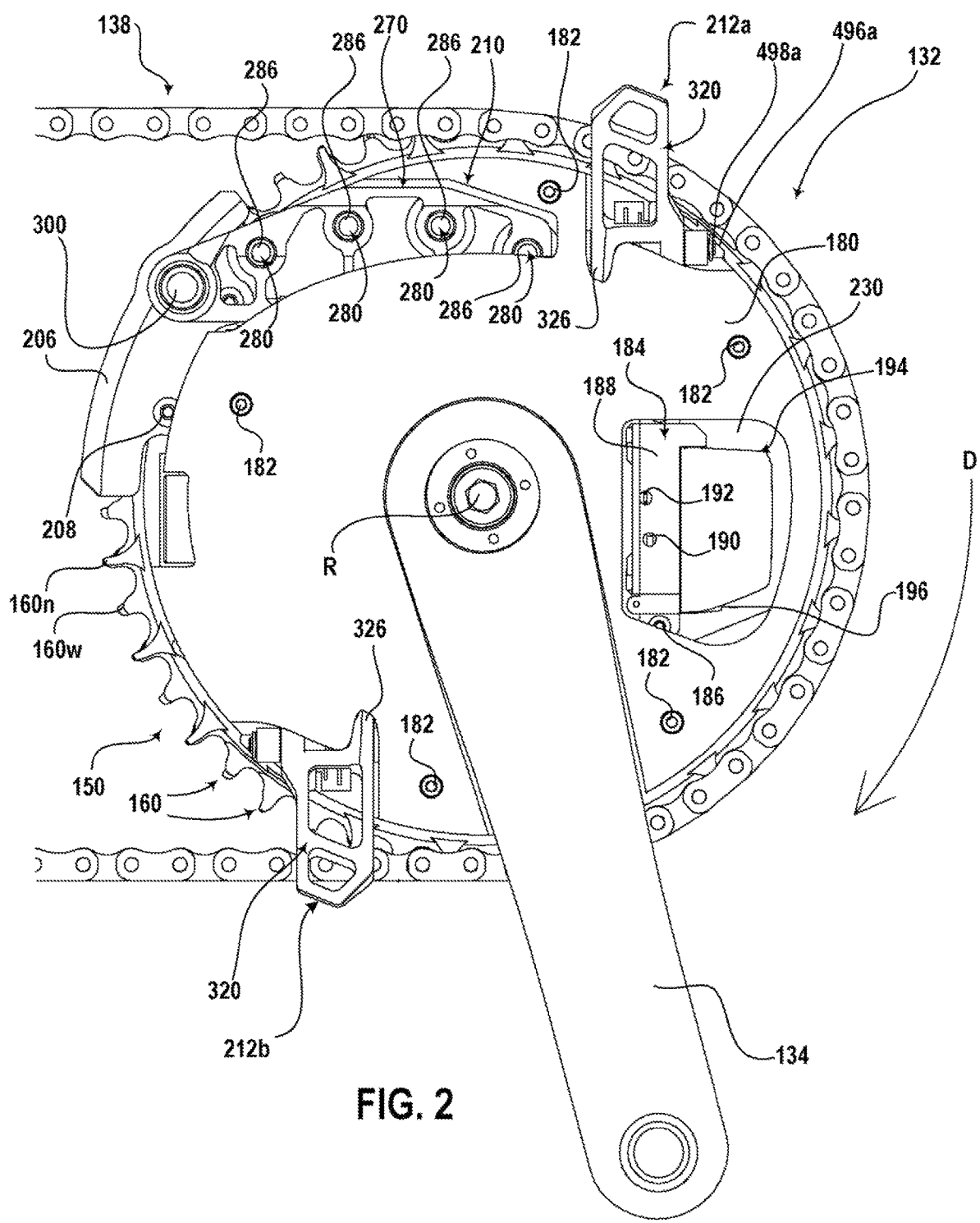
FIG. 2 shows a right or outboard side plan view of part of the crank assembly of the bicycle in FIG. 1 and including a substantial portion of one example of a front shifting system in accordance with the teachings of the present disclosure.
Figure 3:
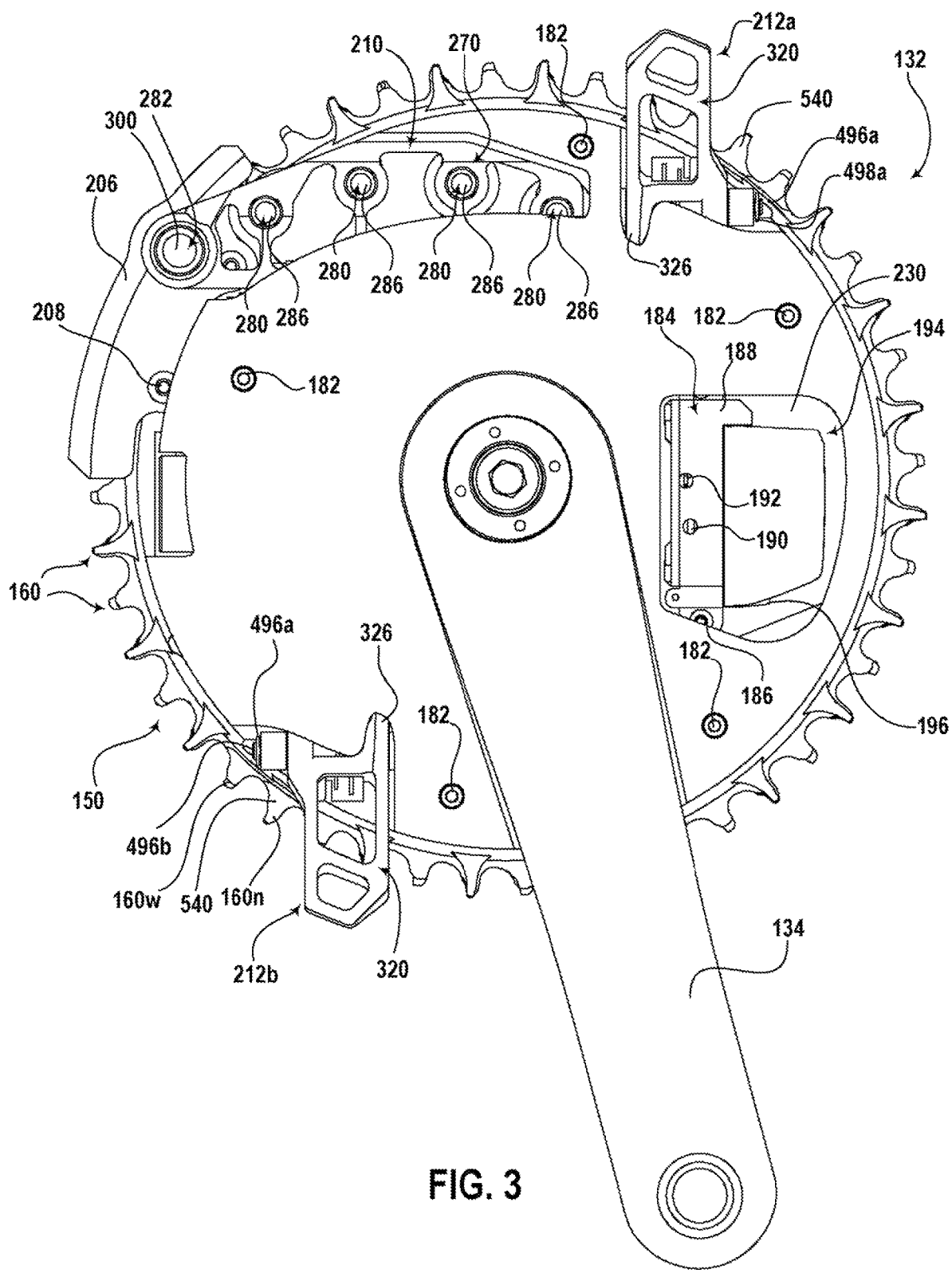
FIG. 3 shows the crank assembly and the front shifting system of FIG. 2 but with the bicycle chain removed.

FIGS. 2 and 3 show substantial portions of a front shifting system of the drivetrain 124 of the bicycle 100 constructed in accordance with the teachings of the present disclosure and from the right side of the bicycle. The front shifting system includes a front shift unit 150. The crank arms 134 of the crank assembly 132 are carried as part of the front shift unit 150, around which the chain 138 is routed, as shown in FIG. 2. FIG. 3 shows the same view of the front shifting system, but with the chain 138 removed. As described in detail below, the front shift unit 150 carries all the components of the disclosed front shifting system, other than the gear shifter 128 or wireless actuator. The wireless gear shifter 128 of the front shifting system is not carried on the front shift unit 150 since it needs to be in easy reach of a rider of the bicycle 100. The gear shifter 128 may instead be mounted remotely on the handlebar assembly 114 of the bicycle 100, as noted above.

Figure 4:
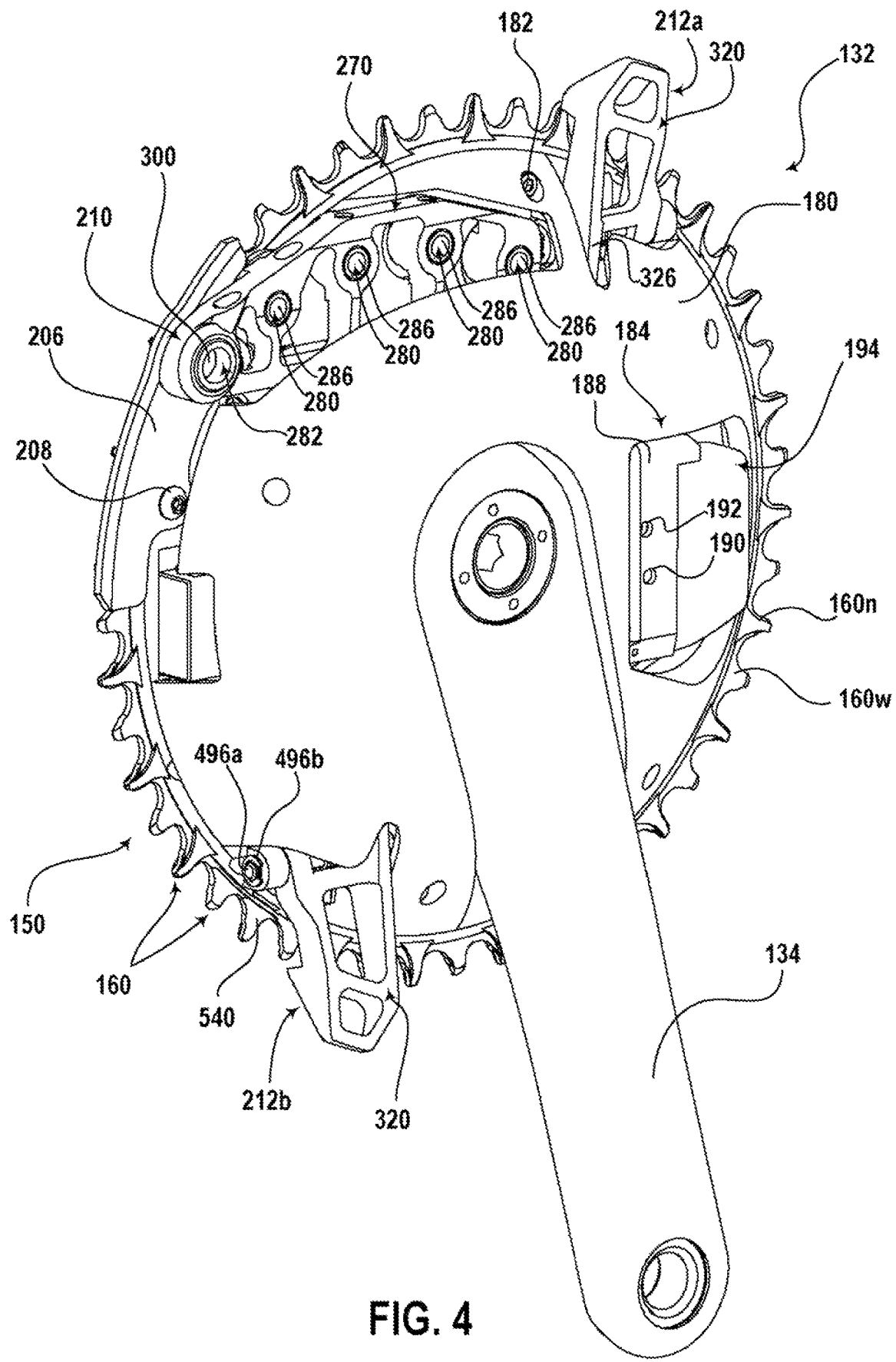
FIG. 4 shows a right or outboard side perspective view of the crank assembly and front shifting system of FIG. 3.
Figure 5:
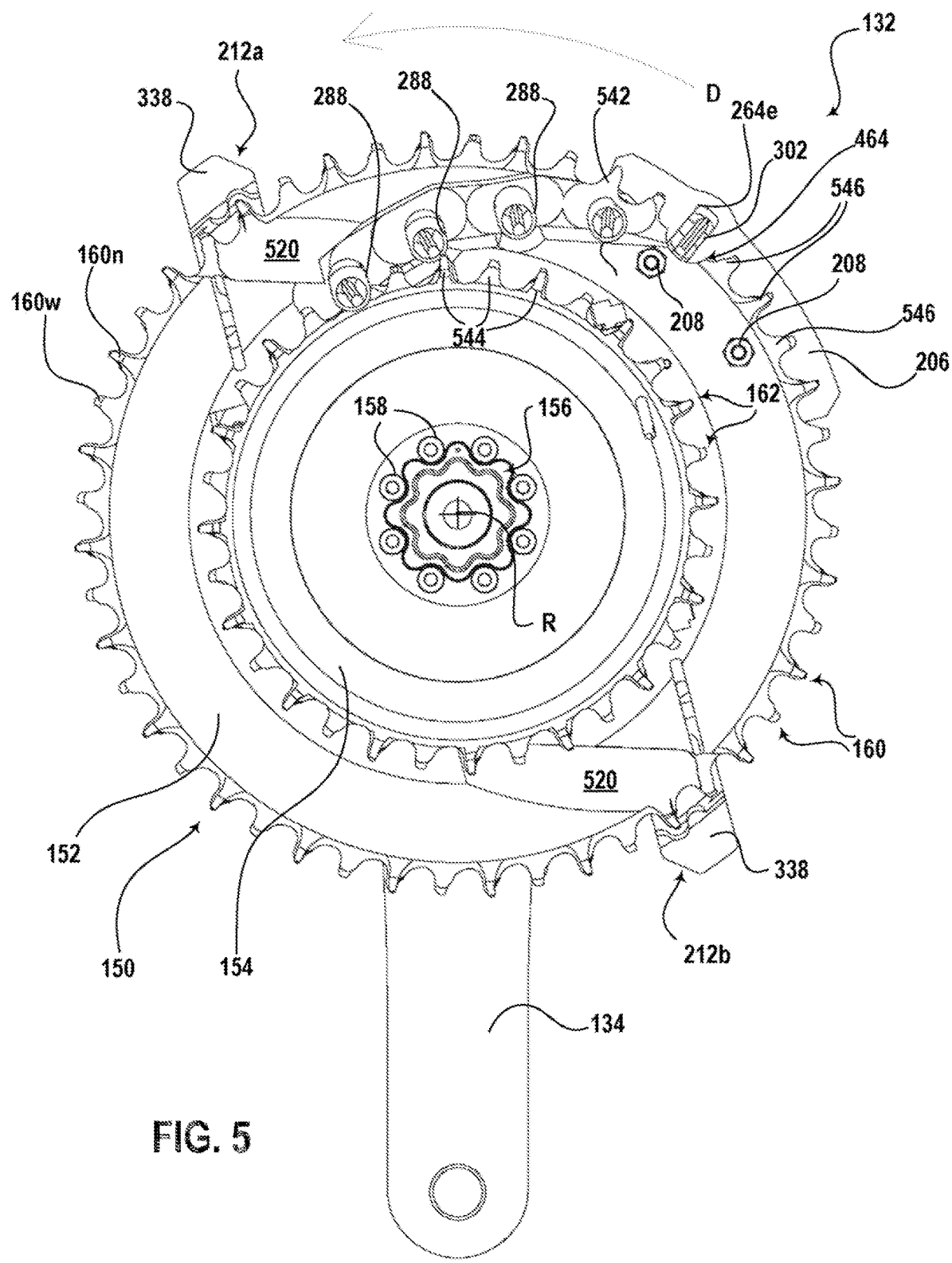
FIGS. 5 and 5B show a left or inboard side plan view of the crank assembly and front shifting system of FIG. 3.
Figure 6:
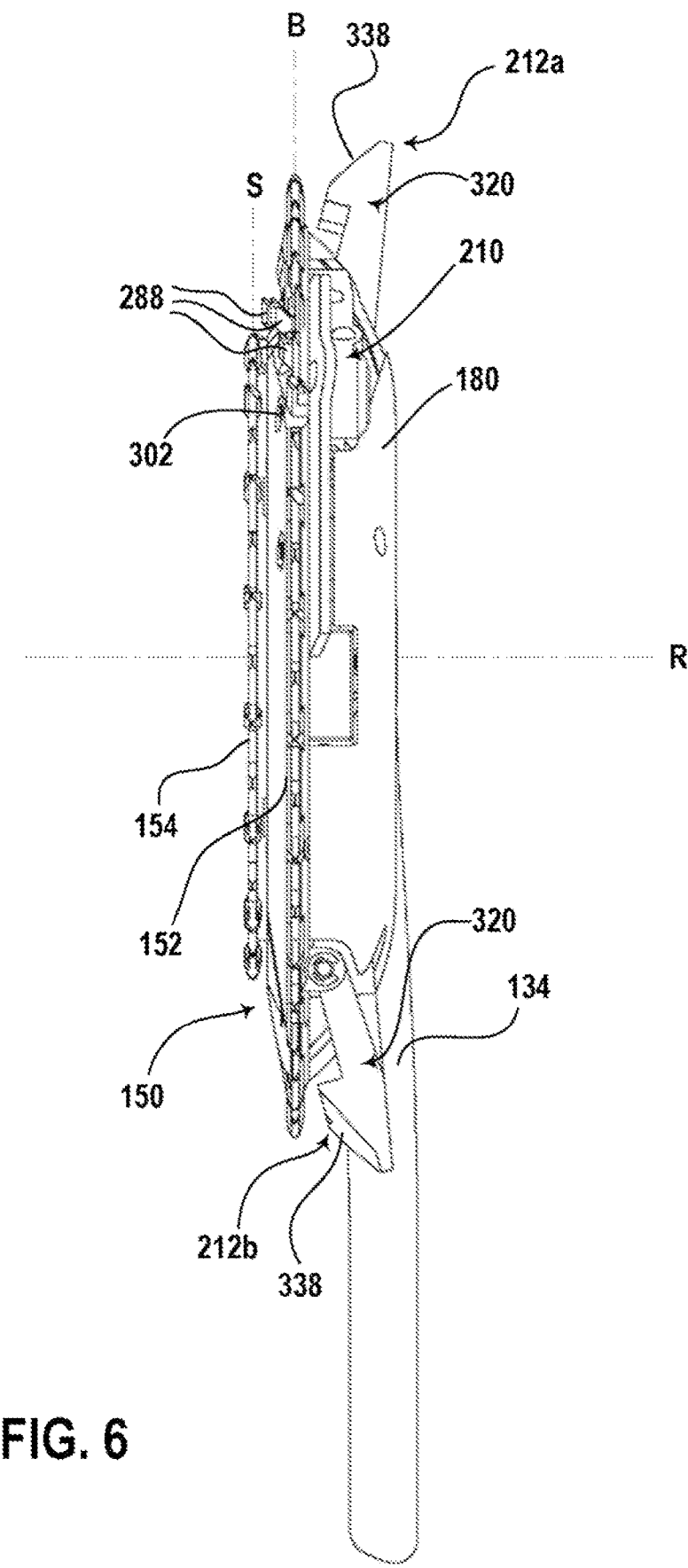
FIG. 6 shows a rear view of the crank assembly and front shifting system of FIG. 3.

FIGS. 4-6 show perspective, left side, and edge views of the portions of the front shifting system and front shift unit 150 depicted in FIGS. 2 and 3. In this example, the front shift unit 150 has two chain rings 152 and 154 that are fixedly connected to and concentric with one another in order to rotate together about a rotation axis R of the front shift unit. The chain rings 152, 154 are rotationally or torsionally engaged with one of the crank arms 134 through a mutual splined connection 156. The crank arm 134 is retained to the front shift unit 150 by a plurality of screws 158, which have threads configured to engage threaded holes (not shown) in the crank arm around the splined connection 156. The screws 158 and splined connection 156 can vary from the example shown and can be replaced by other suitable fastener and connection configurations. The crank arm 134 may be torsionally engaged with, and retained to, a conventional spindle (not shown) in a manner that is well known in the art. The spindle can be rotatably received by ball bearings of a bottom bracket (not shown) carried on the frame 102 of the bicycle 100. Thus, the front shift unit 150 may be rotatable relative to the bottom bracket about the rotation axis R.

Figure 7:
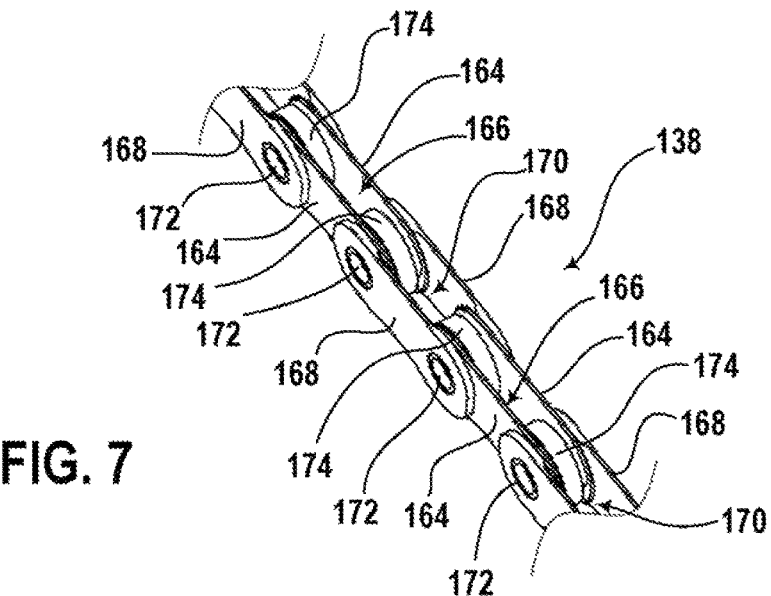
FIG. 7 shows a perspective view of one example of a bicycle chain, as depicted in FIGS. 1 and 2, and suitable for the front shifting system in accordance with the teachings of the present disclosure.
Figure 8:
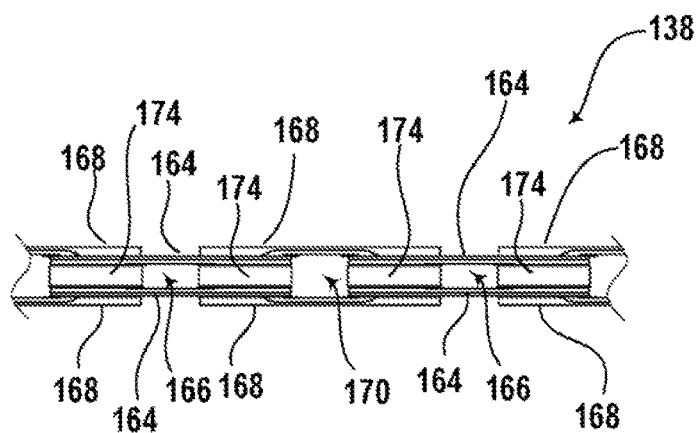
FIG. 8 shows a top view of the bicycle chain of FIG. 7.
Figure 9:
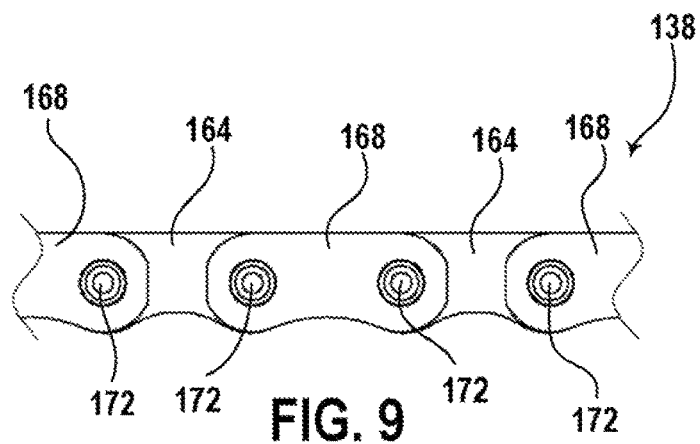
FIG. 9 shows a side view of the bicycle chain of FIG. 7.

FIGS. 7-9 depict several views of a small segment of the chain 138. In a typical construction, the chain 138 can be formed of a plurality of inner and outer links that are joined together. The inner links are formed by pairs of inner plates 164 that define a narrower tooth space 166 between the plates. The outer links are formed by pairs of outer plates 168 that define a wider tooth space 170 between the plates. The plates 164, 168 and links are joined to one another by rivets or pins 172 across the links and the width of the chain 138. The rivets 172 can each optionally carry a roller 174 disposed between the plates and may include a bushing (not shown) between the rollers and rivets.

The chain 138 can engage either one of the chain rings 152, 154 around their respective circumferences. The chain ring 152 has a relatively large diameter and may be called a big chain ring, as is known in the art. The big chain ring 152 has sprocket teeth 160 spaced apart around its perimeter or circumference. The chain ring 154 has a smaller diameter than the big chain ring 152 and may be called a small chain ring, as is known in the art. The small chain ring 154 has sprocket teeth 162 spaced apart around its perimeter or circumference. The chain 138 engages either the sprocket teeth 160 of the big chain ring 152 or the sprocket teeth 162 of the small chain ring 154. The small chain ring 154 is positioned inboard or to the left of the big chain ring 152 in this example. The sprocket teeth 160 of the big chain ring 152 may be configured to have alternating narrow teeth 160$n$ and wide teeth 160$w$ as can be seen in FIGS. 4 and 6. Likewise, the sprocket teeth 162 of the small chain ring 154 may be configured to have alternating narrow teeth 162$n$ and wide teeth 162$w$. Thus, the teeth 160 and 162 around the respective chain rings 152, 154 may alternate between being narrow teeth 160n or 162n to fit the narrower tooth spaces 166 between the inner plates 164 and wide teeth 160w or 162w to substantially fill the wider tooth spaces 170 between the outer plates 168 of the chain 138. By pedaling via the crank arms 134 in a rotational direction P, the front shift unit 150 and the chain 138 rotate, which drives a rear sprocket of the rear cassette 140 to propel the bicycle 100 forward in the direction of the arrow A in FIG. 1.

Still referring to FIGS. 2-6, a cover or cowling 180 is fixedly attached to the outboard or right facing side of the front shift unit 150 by screws 182 or other suitable fasteners or methods. The cowling 180 is sized to cover a substantial portion of the outboard side of the front shift unit 150 and shaped, i.e., smooth and rounded or domed, to reduce aerodynamic resistance to the bicycle's forward motion. The cowling 180 may be structural in nature (as opposed to being primarily an aerodynamic cover) to add strength and stiffness to the front shift unit 150. Furthermore, the cowling 180 can be configured to keep road debris away from the more sensitive parts of the front shift unit 150 and to prevent the rider from accidentally coming into contact with these sensitive parts.

The main components of the front shifting system on the front shift unit 150 are first introduced below. More specific details of each of the main components, various additional sub-components, and ancillary components according to the teachings of the present disclosure are then described below. The function and operation of each of the main components, sub-components, and ancillary components are then described. Lastly, the shifting function and operation of the front shifting system are also described below. In general, the front shifting system includes components configured and arranged to shift the chain 138 between the big chain ring 152 and the small chain ring 154 according to a rider's selective operation of the shifter 128. The disclosed front shifting system can upshift the chain 138 from the small chain ring 154 to the big chain ring 152 and can downshift the chain from the big chain ring to the small chain ring. Upshifts and downshifts are performed smoothly and quickly by the disclosed front shifting system and are performed with components that are disposed entirely on the front shift unit 150.

First, referring to FIGS. 3 and 10-12, the front shifting system includes a control unit 184, which may be a waterproof electronic device. The control unit 184 is attached to the front shift unit 150 by screws or other fasteners 186. In this example, the control unit 184 is attached to the outboard or right side of the big chain ring 152. The control unit 184 contains a printed circuit board (PCB). The printed circuit board may include a wireless radio and antenna, a microprocessor, and spring-biased electrical contacts. During use, the wireless radio and antenna can send and receive shift commands to and from a rider-controlled actuator, such as the aforementioned shifter 128, which may be located on the handlebar assembly 114 of the bicycle 100. The wireless radio and antenna may also be used to communicate with the electronic rear derailleur 126. The microprocessor can receive, process, and send out electronic signals. The microprocessor, wireless radio, and antenna can be contained within a waterproof housing or case 188 of the control unit 184.

The control unit 184 may also have a button 190 and a light emitting diode (LED) 192 or other illumination element that are exposed on the housing 188. The button 190 can be an electronic switch that is actuated by the rider. The button 190 may be used for pairing the control unit 184 of the front shift unit 150 with the shifter 128 on the handlebar assembly 114 and, optionally, for pairing the control unit 184 and thus the front shift unit 150 with the electronic rear derailleur 126. The LED 192 may be a multi-color LED, such as a red-green-blue (RGB) LED or a red-green-blue-white (RGBW) LED. The LED may thus be capable of producing light in three colors and be configured to provide visual feedback to the rider to indicate a state of the front shifting system. Optionally, the printed circuit board may also include an electronic audio or noise emitter that can provide audible feedback to the rider.

Figure 10:
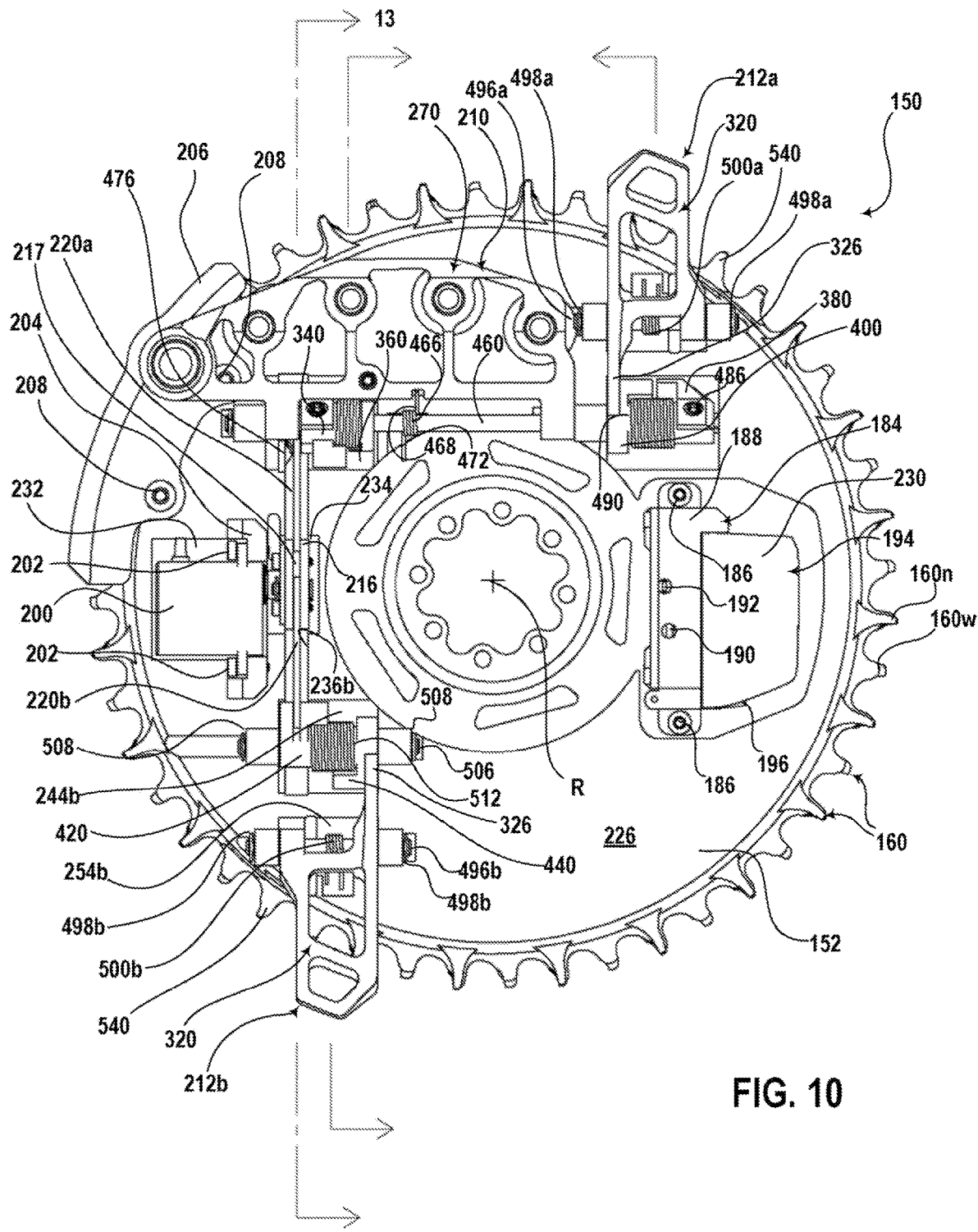
FIG. 10 shows a right or outboard side plan view of one example of a front shift unit of the front shifting system of FIG. 3 and with a cowling and crank arm removed.
Figure 11:
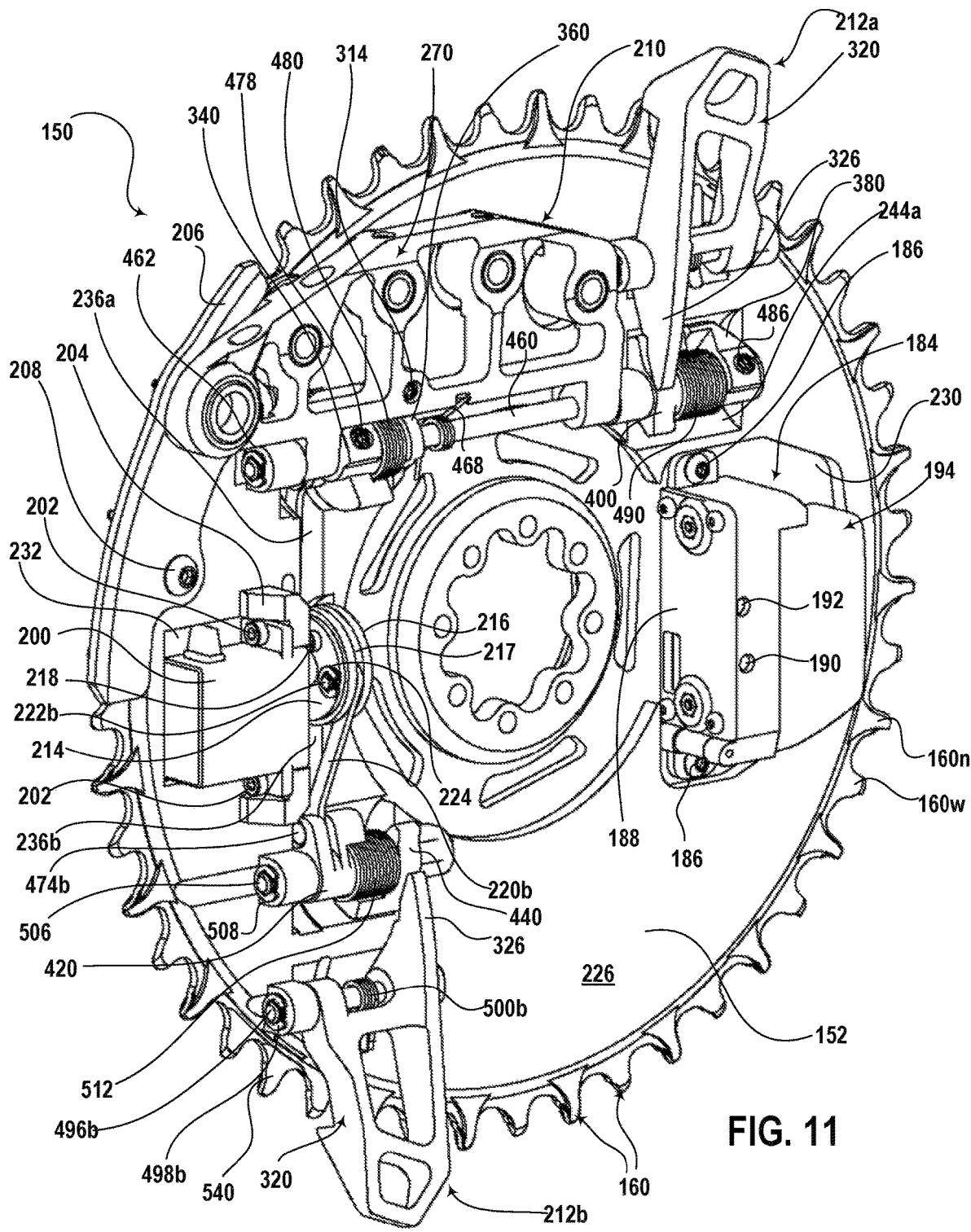
FIG. 11 shows a right or outboard side perspective view of the front shift unit of FIG. 10 and with the shift mechanism components in an upshift state in accordance with the teachings of the present disclosure.
Figure 12:
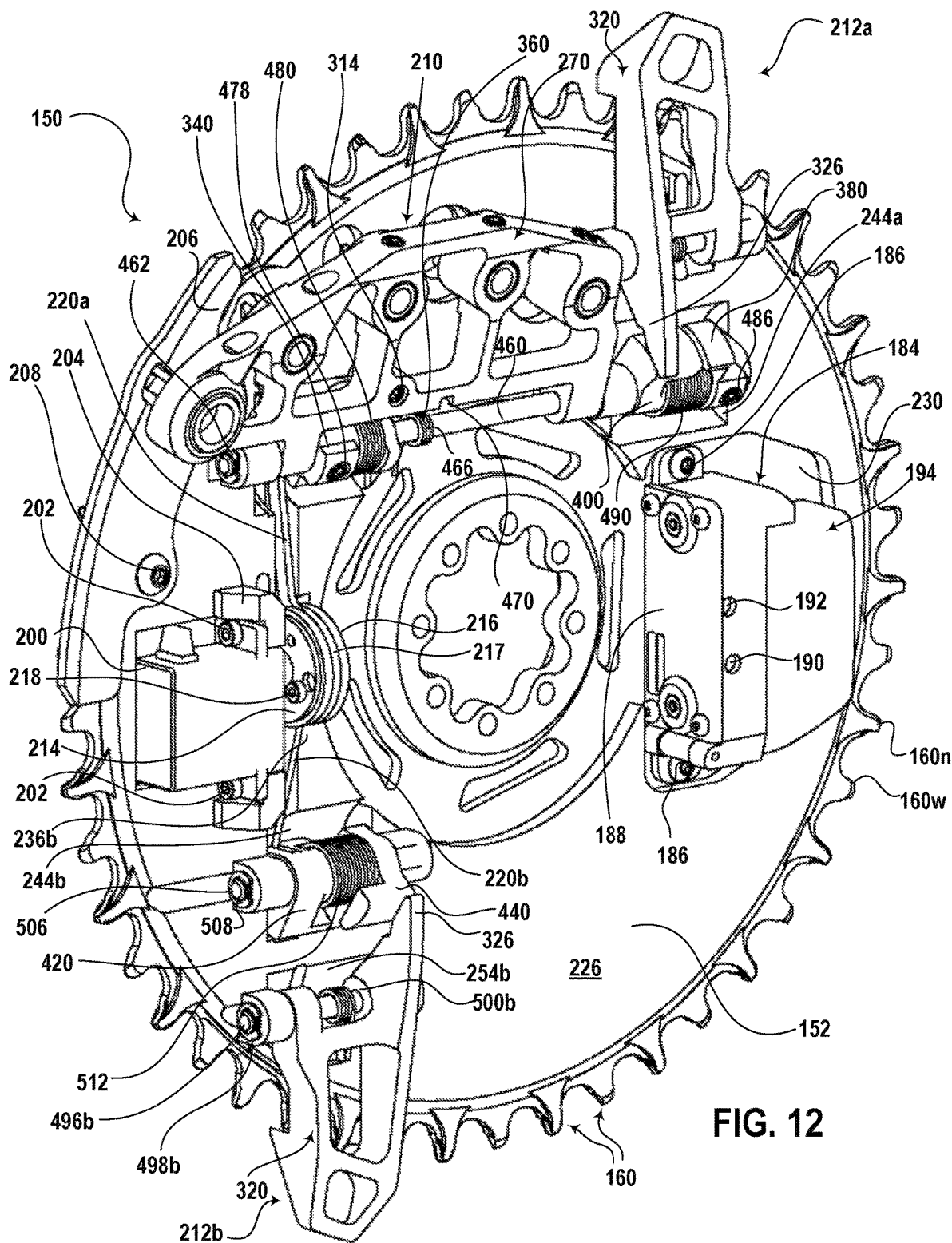
FIG. 12 shows the front shift unit of FIG. 11, but with the shift mechanism components in a downshift state in accordance with the teachings of the present disclosure.

Referring to FIGS. 10-12, the front shifting system includes a power supply, which may be a rechargeable power supply 194 as described herein, for providing power to operate the front shifting system. In this example, the power supply 194 is attached to the housing 188 of the control unit 184. A latch 196 may be provided and actuated so that the power supply 194 can be quickly and easily installed, removed, and replaced by a rider without the use of a tool. The power supply 194 may be a lithium-ion type rechargeable power supply or may be another suitable power supply type, if desired. When the power supply 194 is attached to the housing 188 of the control unit 184, the power supply is in electrical contact with the spring-biased electrical contacts and can supply electrical energy to the PCB.

With continued reference to FIGS. 10-12, the front shifting system also includes a gearmotor unit 200, which may be a waterproof electromechanical device. In this example, the gearmotor unit 200 is mounted to the right or outboard side of the big chain ring 152. The gearmotor unit 200 may be attached via screws 202 or other suitable fasteners to a bracket 204 carried on the outboard side of the big chain ring 152. The bracket 204 may likewise be attached or mounted to the big chain ring 152 by similar fasteners or screws. Alternatively, the bracket 204 may be formed as an integral portion of the big chain ring 152 or as an integral portion of a housing of the gearmotor unit 200 to reduce the number of parts to be assembled from three to two. The gearmotor unit 200 can include an electric motor (not shown) and a gear train (not shown). The gear train can be configured to reduce speed and increase power output, i.e., output torque produced by the electric motor of the gearmotor unit 200. The gear train can be internal to the gearmotor unit 200 and can be connected to and drive rotation of a mechanical output portion of the gearmotor unit 200. The gearmotor unit 200 can also include an angular position sensing system (not shown) that senses the angular position of the mechanical output portion of gearmotor unit 200. The gearmotor unit 200 receives electric power and electronic signals from the control unit 184 and can do so via an electric cable (not shown).

The front shifting system also includes a chain guard or guard rail 206 that is attached to the big chain ring 152 on the right side or outboard side. The chain guard rail 206 may be attached to the big chain ring 152 by screws 208 or other suitable fasteners. The chain guard rail 206 is sized and positioned to guide the chain 138, as necessary during use and while shifting, in order to help prevent the chain 138 from derailing to the outboard side of big chain ring 152. The chain guard rail 206 is placed adjacent the sprocket teeth 160 and spaced therefrom to the outboard side. The chain guard rail 206 acts as an outboard direction barrier for the chain 138.

The front shifting system further includes an upshift element 210 that is carried on the big chain ring 152. In this example, the upshift element 210 is on the right side or outboard side of the big chain ring 152 and is pivotable about its lower edge relative to the outboard side. In one example, the upshift element 210 can be made from aluminum so that the element is lightweight and yet strong and durable. The upshift element 210 may be cast aluminum in one example. The upshift element 210 is configured to selectively guide the chain 138 from the sprocket teeth 162 of the small chain ring 154 to the sprocket teeth 160 of the big chain ring 152, as described in further detail below. In an alternate example, the upshift element 210 may be injection molded from a Nylon material or a long fiber reinforced thermoplastic material. Various components of the upshift element 210, as described below, may also be attached separately to the upshift element 210 or may instead be molded or otherwise formed as an integral portion of the element.

The front shifting system also includes at least one downshift element carried on the right side or outboard side of the big chain ring 152. In this example, the front shifting system includes two such elements including a first downshift element 212a and a second downshift element 212b, each being pivotable about a central portion thereof relative to the outboard side. In one example, the first and second downshift elements 212a and 212b are disposed generally 180 degrees opposite one another around the circumference of the front shift unit 150. In one example, each downshift element 212a and 212b can also be made from aluminum so that each element is lightweight and yet strong and durable. The first and second downshift elements 212a and 212b may be cast aluminum in one example. As with the upshift element 210, each downshift element 212a and 212b, in an alternate example, may be injection molded from a Nylon material or a long fiber reinforced thermoplastic material.

In the disclosed example, the first downshift element 212a and second downshift element 212b have the same construction and configuration. Thus, only one downshift element may be shown or described in detail below. However, it should be understood that such illustrations and description may apply equally to either of the first and second downshift elements 212a and 212b. The first and second downshift elements 212a and 212b are generally configured to selectively guide the chain 138 from the sprocket teeth 160 of the big chain ring 152 to the sprocket teeth 162 of the small chain ring 154, as described in further detail below. As will become apparent below, the front shifting system may include only one of the downshift elements or may include more than two of the downshift elements, if desired.

Figure 13:
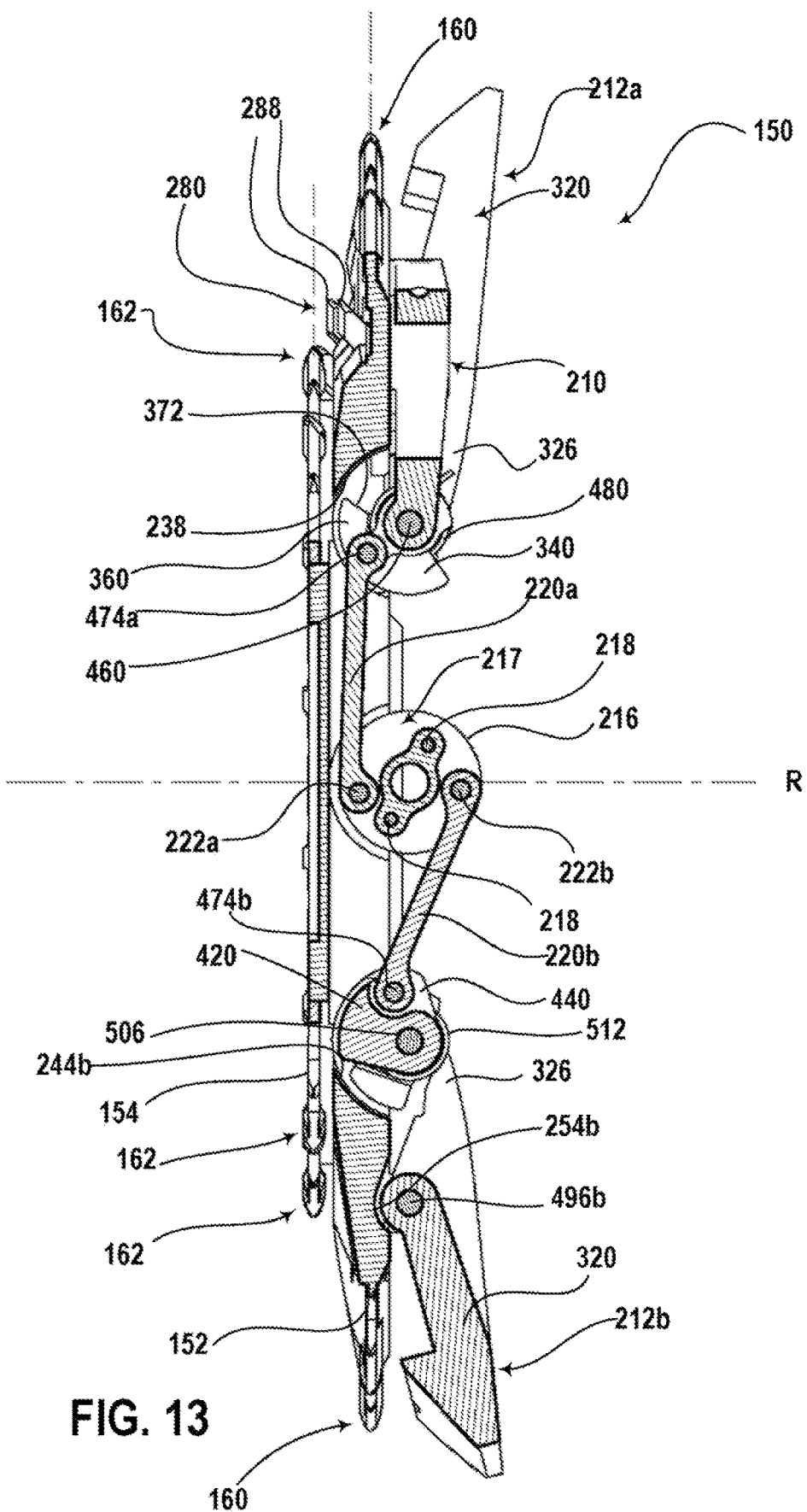
FIG. 13 shows a cross-section taken along line 13-13 of the front shift unit of FIG. 10 and with the shift mechanism components in the upshift state of FIG. 11.

Referring now to FIGS. 10, 11, and 13, in this example, output torque from the electric motor of the gearmotor unit 200 is transferred to the mechanical output portion of the gear motor unit. The mechanical output portion of the gearmotor unit 200 is identified herein generally as a motor output 214, which can be in the form of an output shaft or a disc, bracket, horn, or the like coupled to such an output shaft via a splined interface or other suitable connection. The motor output 214 in this example may be axially retained to the gearmotor unit 200 by a screw or other suitable fastener (not shown). A hub 216 may be attached to the motor output 214, also by screws 218 or other suitable fasteners. The hub 216 can be a circular disc or other suitable device for connecting the gearmotor unit 200 to other components of the front shifting system. In this example, the hub has a circumferential slot 217 formed around the perimeter of the hub. A first link 220a and a second link 220b are connected to the hub 216. Each link 220a and 220b is a relatively thin, elongate element with a hole at each end. The hub 216 also has two holes formed through the hub and may be disposed 180 degrees opposite one another around the circumference of the hub. The proximal ends of the first link 220a and second link 220b are received in the slot 217 with their holes aligned with a corresponding one of the two holes in the hub 216. A first pin 222a and a second pin 222b are substantially cylindrical in shape and are received through the corresponding holes in the hub 216 and in the proximal ends of the respective links 220a and 220b. The pins 222a and 222b are retained axially by retaining rings 224 to secure the proximal ends of the links 220a and 220b to the hub 216. In this way, the first link 220a is rotatably attached to the hub 216 via the first pin 222a and the second link 220b is rotatably attached to the hub 216 via the second pin 222b. Rotation of the hub via the gearmotor unit 200 moves the first and second links 222a and 222b as described further below.

Figure 14:
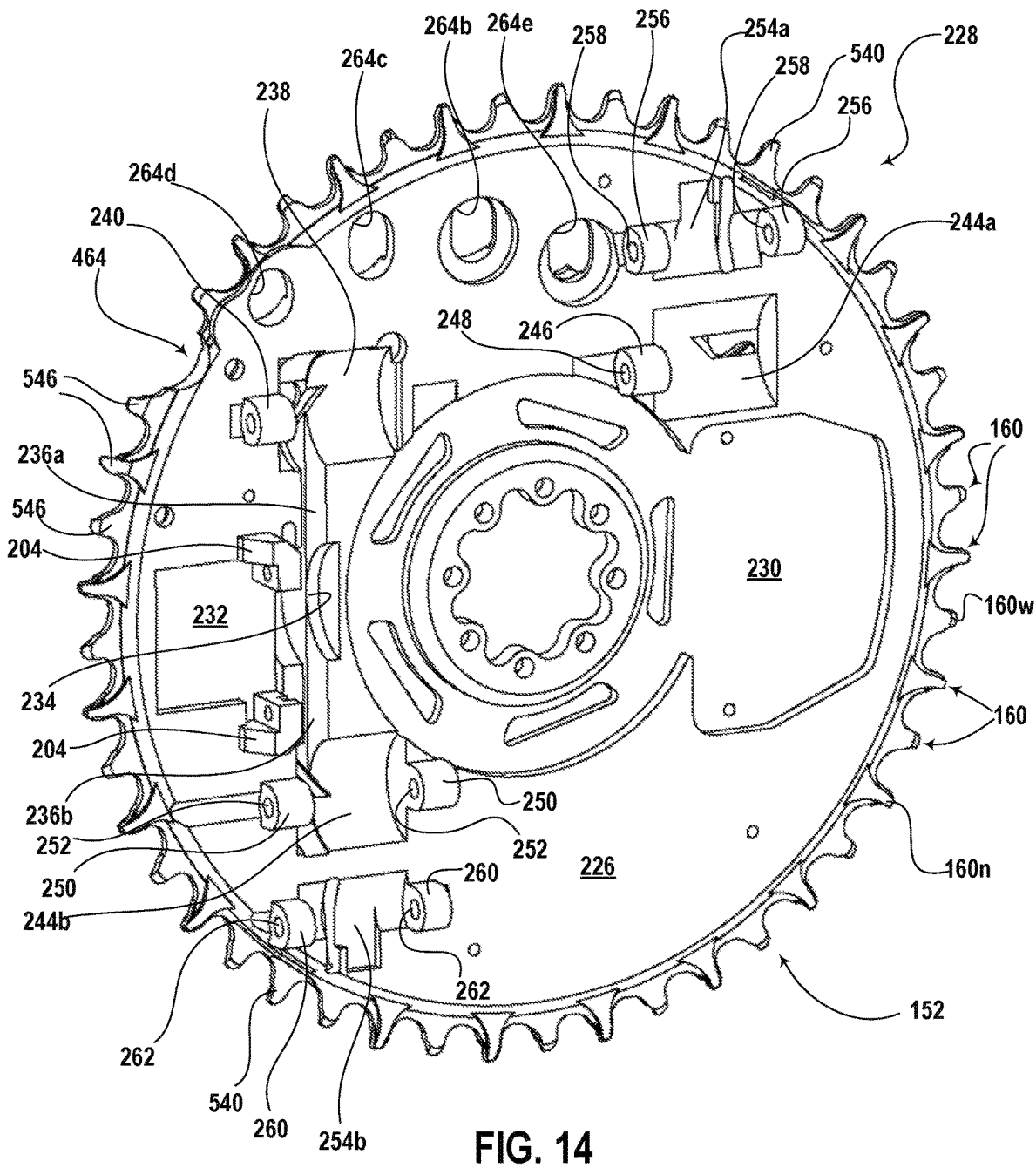
FIG. 14 shows a right or outboard side perspective view of one example of a chain ring component of the front shift unit of FIG. 10 and with the shift mechanism components removed.
Figure 15:
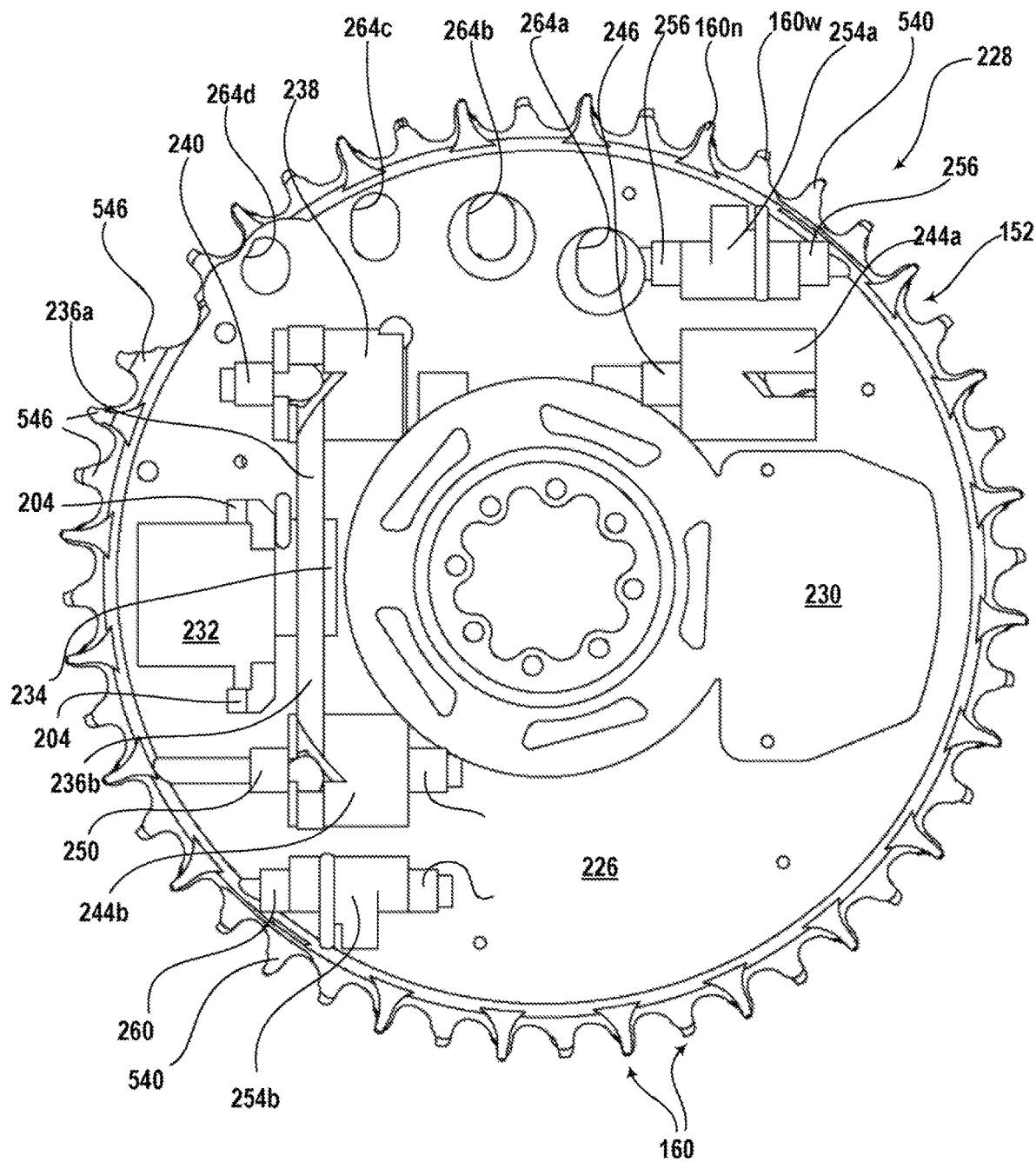
FIG. 15 shows a right or outboard side plan view of the chain ring component of FIG. 14.
Figure 16:
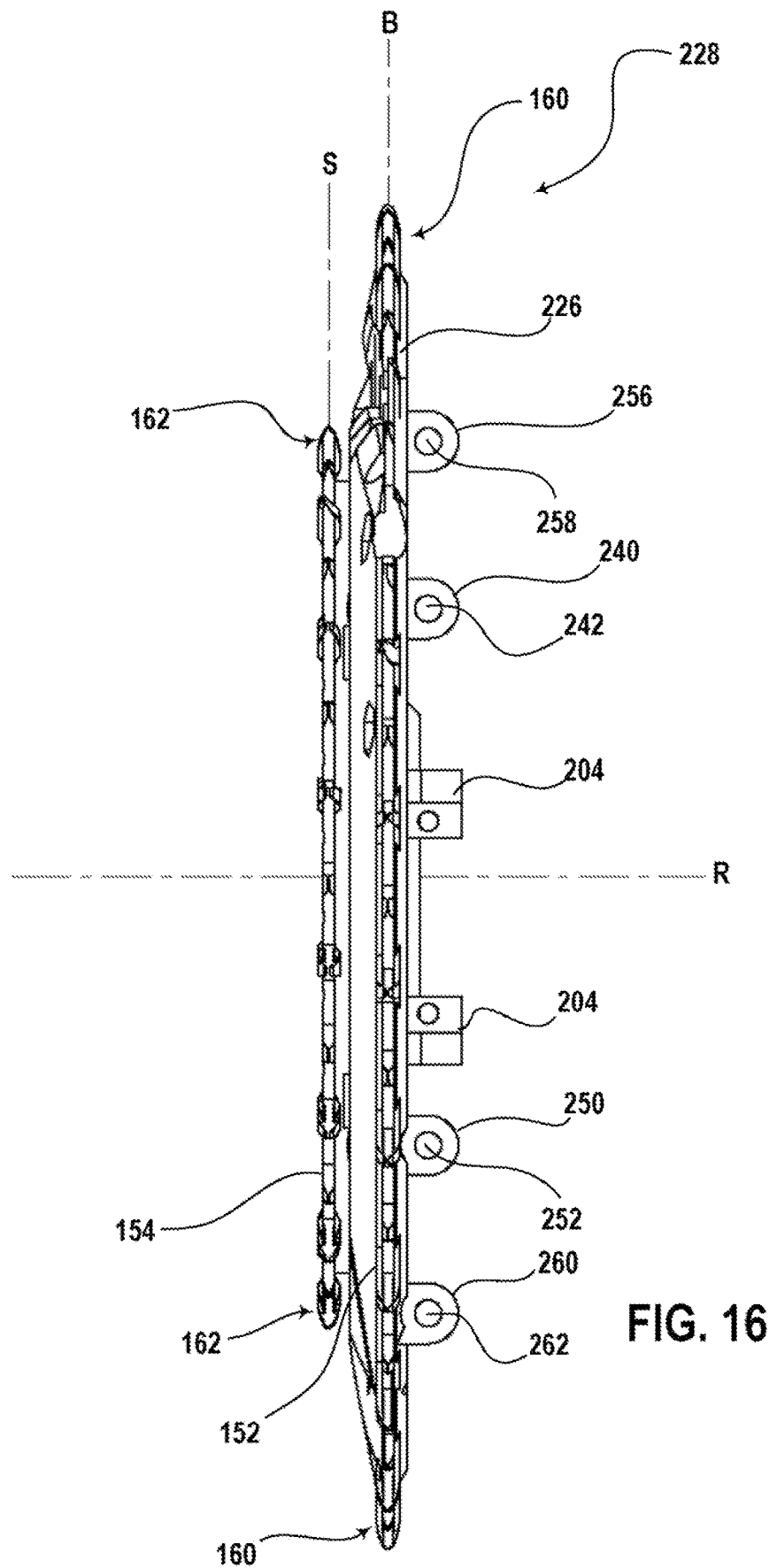
FIG. 16 shows a rear view of the chain ring component of FIG. 14.

FIGS. 14-16 show perspective and plan views of what is defined herein as a chain ring component 228, which includes the big chain ring 152 and the small chain ring 154. As shown, the right side or outboard side of the big chain ring 152 with the components of the front shifting system removed. In this example, the outboard side of the big chain ring 152 has a surface 226 with numerous optional features provided thereon. These optional features may each be integrally formed by a machining, casting, or other suitable process as an integrated part of the surface 226 of the big chain ring 152. Alternatively, a number of these optional features may be formed as separate components and attached to the surface 226 of the big chain ring 152 by welding, rivets, screws, or other suitable fasteners, or attachment techniques. In one example, the surface 226 may include a shallow recessed landing 230 that is sized and configured to receive the housing 188 of the control unit 184 therein. The landing 230 can assist in providing an easily identifiable mounting location for properly positioning the control unit 184 when installed on the surface 226. In another example, the surface 226 may include a shallow motor recess 232 that is sized and configured to receive the gearmotor unit 200 therein. The brackets 204, as noted above, may be integrally formed as a part of the surface 226 or may be separately attached thereto adjacent the motor recess 232.

Further, a shallow pocket 234 may be formed having a semi-circular shape to provide clearance depth in the surface 226 for the hub 216. The pocket 234 may be formed adjacent the brackets 204 but on the opposite side of the brackets relative to the motor recess 232. Recessed first and second channels 236a and 236b may be formed extending in opposite directions from the pocket 234 to accommodate the respective first and second links 220a and 220b (see also FIG. 13). The surface 226 also include an upshifter recess 238 formed having a semi-circular shape to accommodate upshift driver and actuator components, as described below. A shaft support 240 is positioned adjacent to the upshifter recess 238 and includes a bore 242 that extends through the support for receiving a shaft, also as described below. The surface 226 further includes a first downshifter recess 244a, also formed having a semi-circular shape, to accommodate a first downshift driver component, as described below. A shaft support 246 is positioned adjacent to the first downshifter recess 244a and includes a bore 248 that extends through the support for receiving a shaft, also as described below. The upshifter recess 238 and the first downshifter recess 244a are positioned spaced laterally apart on the surface 226. The shaft supports 240 and 246 are positioned so that their respective bores 242 and 248 are concentrically aligned with one another. Further, the upshifter recess 238 is connected to the first channel 236*a* so that the first link 220*a* can extend from the hub pocket 234 to the upshifter recess 238 along the first channel.

The outboard side surface 226 of the big chain ring 152 further includes a second downshifter recess 244*b*, also formed having a semi-circular shape, to accommodate a second downshift driver component, as described below. A pair of spaced apart shaft supports 250 is positioned adjacent to and on opposite sides of the second downshifter recess 244*b*. Each of the shaft supports 250 includes a bore 252 that extends through the support for receiving a shaft, also as described below. The shaft supports 250 are positioned across the second downshifter recess 244*b* from one another such that the bores 252 are concentrically aligned with one another. Further, the second downshifter recess 244*b* is connected to the second channel 236*b* so that the second link 220*b* can extend from the hub pocket 234 to the second downshifter recess 244*b* along the second channel.

The surface 226 also includes a first downshift element depression 254*a* that is positioned above and spaced from the first downshifter recess 244*a*. The first downshift element depression 254*a* is shaped and configured to accommodate the first downshift element 212*a*, as described below. A pair of spaced apart shaft supports 256 is positioned adjacent to and on opposite sides of the first downshift element depression 254*a*. Each of the shaft supports 256 includes a bore 258 that extends through the support for receiving a shaft, also as described below. The shaft supports 256 are positioned across the first downshift element depression 254*a* from one another such that the bores 256 are concentrically aligned with one another. The surface 226 further includes a second downshift element depression 254*b* that is positioned below and spaced from the second downshifter recess 244*b*. The second downshift element depression 254*b* is shaped and configured to accommodate the second downshift element 212*b*, as described below. A pair of spaced apart shaft supports 260 is positioned adjacent to and on opposite sides of the second downshift element depression 254*b*. Each of the shaft supports 260 includes a bore 262 that extends through the support for receiving a shaft, also as described below. The shaft supports 260 are positioned across the second downshift element depression 254*b* from one another such that the bores 262 are concentrically aligned with one another.

As noted above, since the first and second downshift elements 212*a* and 212*b* have the same construction, the first and second downshift element depressions 254*a* and 254*b* can also have the same construction. However, the depressions 254*a* and 254*b* need not have the same construction and can instead differ from one another as needed or desired for a particular application.

Lastly, the big chain ring 152 has a series of holes 264*a-d* that are provided to accommodate a portion of the upshift element 210, as described below. The series of holes 264*a-d* are arranged in an arc and are spaced apart from one another in a circumferential direction on the big chain ring 152. The series of holes 264*a-d* are also gradually different size and are arranged so that each successive hole is radially further away from the rotation axis R. In this example, the hole 264*a* is closer to the rotation axis R and is the larger of the holes. Each successive hole 264*b-d* is smaller than the prior hole and is further from the rotation axis R. More specifically, the hole 264*b* is smaller and further from the axis R than the hole 264*a*. The hole 264*c* is smaller and further from the axis R than the hole 264*b*. The hole 264*d* is smaller and further from the axis R than the hole 264*c*. In this example, there are four such holes 264*a-d* in the series. This number can differ, as will become apparent to those having ordinary skill in the art.

Figure 17:
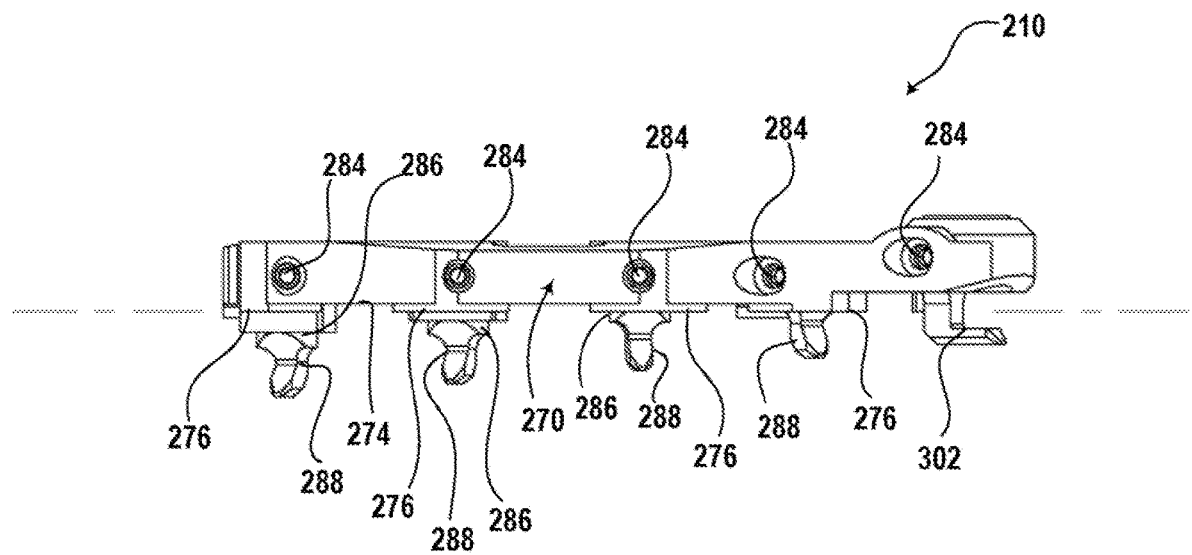
FIG. 17 shows a top view of one example of an upshift element of the shift mechanism for the front shift unit of FIG. 10 in accordance with the teachings of the present disclosure.
Figure 18:
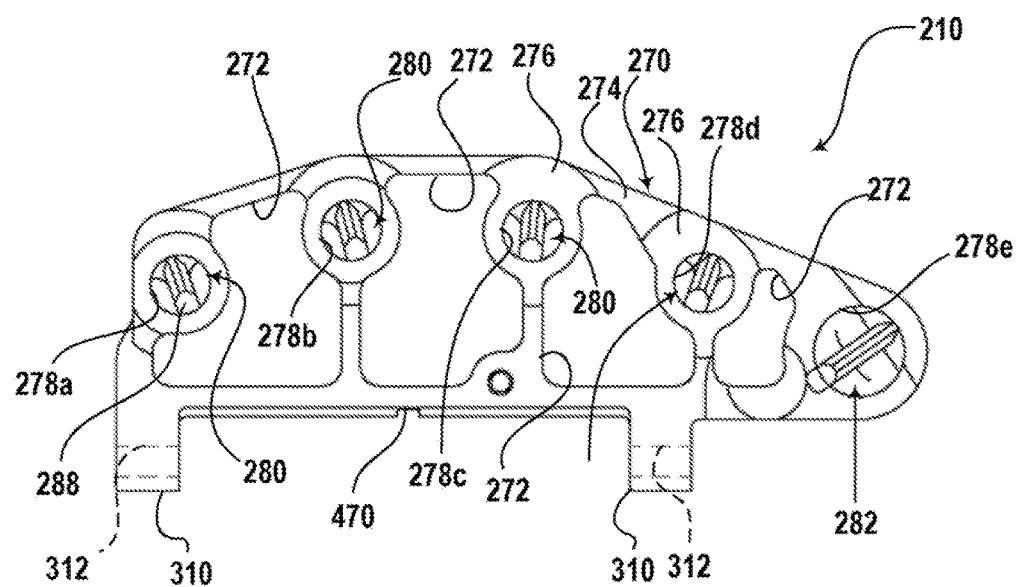
FIG. 18 shows a left or inboard side view of the upshift element of FIG. 17.
Figure 19:
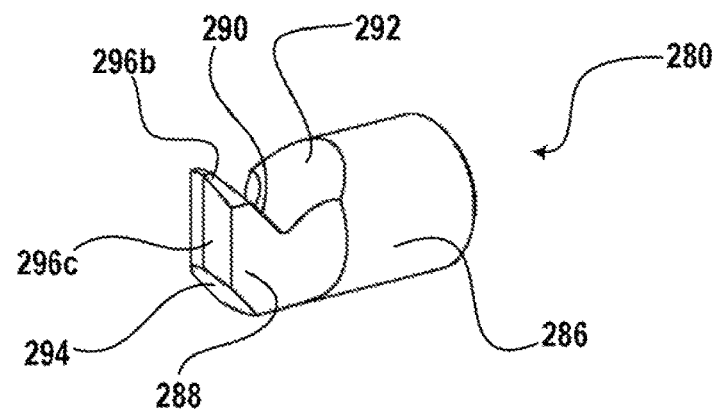
FIG. 19 shows a perspective view of one example of a chain guiding peg of the upshift element of FIG. 17 in accordance with the teachings of the present disclosure.
Figure 20:
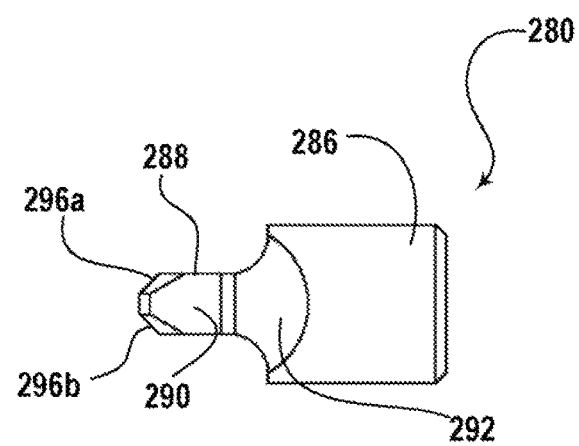
FIG. 20 shows a top view of the chain guiding peg of FIG. 19.
Figure 21:
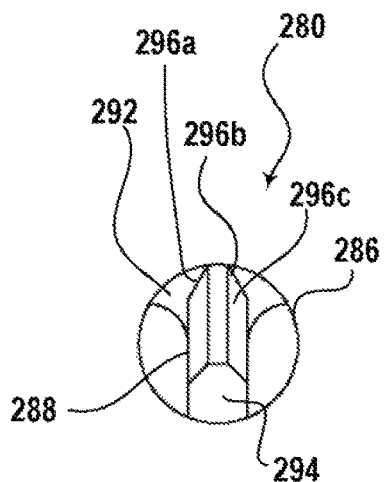
FIG. 21 shows a left or inboard side view of the chain guiding peg of FIG. 19.
Figure 22:
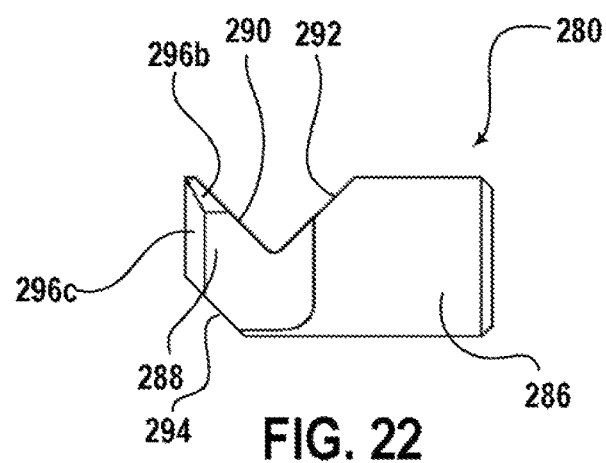
FIG. 22 shows a rear view of the chain guiding peg of FIG. 19.
Figure 23:
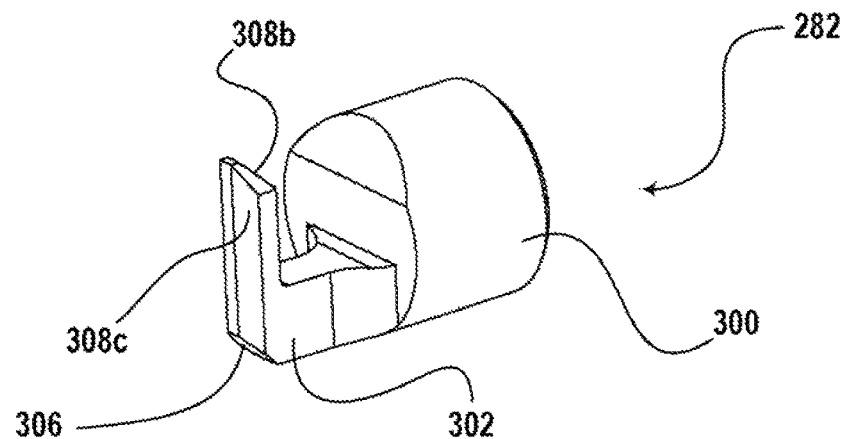
FIG. 23 shows a perspective view of one example of a chain upshifting peg of the upshift element of FIG. 17 in accordance with the teachings of the present disclosure.
Figure 24:
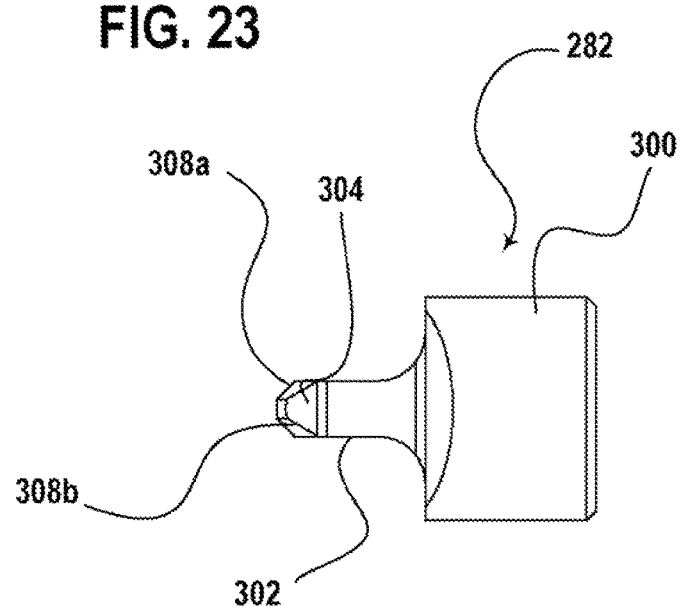
FIG. 24 shows a top view of the chain upshifting peg of FIG. 23.
Figure 25:
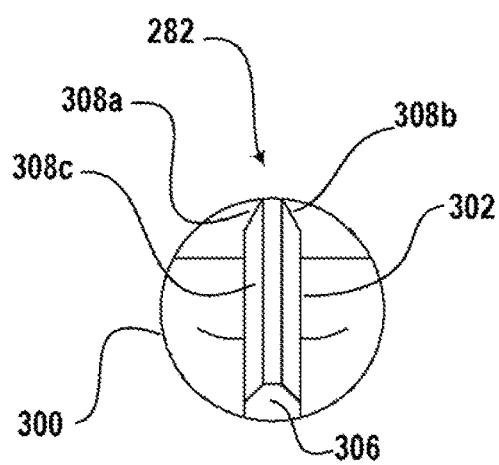
FIG. 25 shows a left or inboard side view of the chain upshifting peg of FIG. 23
Figure 26:
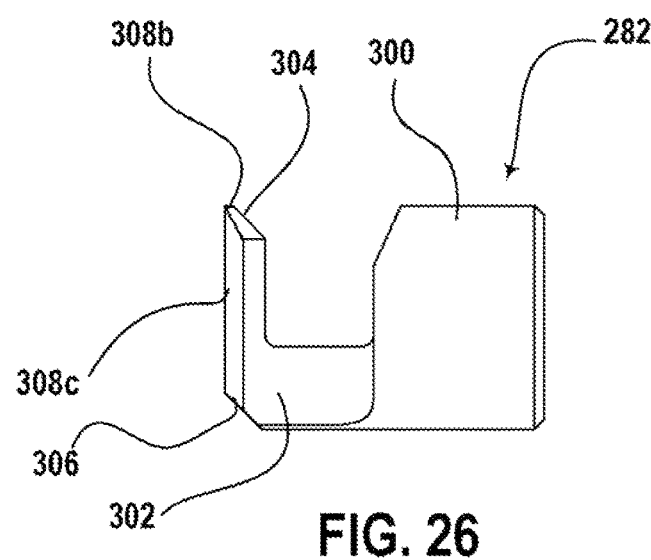
FIG. 26 shows a rear view of the chain upshifting peg of FIG. 23.

Referring to FIGS. 17 and 18, the upshift element 210 is shown detached from the front shift unit 150. In this example, the upshift element 210 has a body 270 with some openings 272 formed through the material of the body. The openings 272 may be provided to eliminate material of the body 270 to reduce the weight of and the material usage to form the upshift element 210. The body 270 has an inboard facing side 274 with a series of contact surfaces 276 that are coplanar with one another and that lie on a chain ring contact plane C. A series of bores 278*a-e* are provided through or in the body 270 of the upshift element 210. The series of bores 278*a-e* is arranged in an arc along the body 210. In this example, there are five such bores 278*a-e* in the series. This number can also differ, as will become apparent to those having ordinary skill in the art.

In this example, four of the bores 278*a-d* of the series are each configured to receive a chain guiding peg 280 therein. A fifth bore 278*e* of the series is configured to receive a chain upshifting hook 282 therein. In this example, the chain guiding pegs 280 and the chain upshifting peg 282 may each be fixed to the body 270 of the upshift element 210 within the respective bores 278*a-e* via a corresponding series of set screws 284. The set screws 284 are exposed along a top edge of the body 270, which can generally follow the arc of the series of bores 278*a-e*. The set screws 284 may be used to adjust and retain an angular or rotated position and an axial insertion or depth position of the chain guiding pegs 280 and the chain upshifting peg 282 relative to the body 270 of the upshift element 210.

Referring to FIGS. 19-22, each chain guiding peg 280 can be identical in construction and thus only one is described in detail herein. In this example, the chain guiding peg 280 has a cylinder-shaped barrel end 286 and a hook 288 projecting in an axial direction from the barrel end. The barrel end 286 is sized and configured to seat in one of the bores 278*a-d*. The hook 288 has an angled top surface 290 and the barrel end 286 has an angled top portion 292 adjacent the angled top portion of the hook (see FIG. 22). Thus, the angled top surface 290 and angled top portion 292 are positioned to converge and meet between the barrel end 286 and the hook 288 and are configured for contacting the chain 138, as described below. The hook 288 also has an angled bottom surface 294 opposite to and parallel with the angled top surface 292. The hook 288 further has a plurality of chamfers 296*a*-296*c* on the tip and on edges of the hook.

Referring to FIGS. 23-26, the chain upshifting peg 282 can be different from the chain guiding pegs 280. In this example, the chain upshifting peg 282 has a cylinder-shaped barrel end 300 and a hook 302 projecting in an axial direction from the barrel end. The barrel end 300 is sized and configured to seat in the bore 278*e* in the body 270 of the upshifting element 210. The hook 302 is L-shaped with a portion spaced from the barrel end 300 (see FIG. 26). The hook 302 has a chamfer 304 at the tip and facing the barrel end 300. The hook 302 is configured to contact and engage the chain 138, as described below. The hook 302 also has a chamfer 306 on the bottom that faces away from the barrel end 300 and is opposite to and parallel with the chamfer 304 at the tip of the hook. The hook 302 also has a plurality of chamfers 308*a*-308*c* on the tip and on edges of the hook.

In this example, each of the chain guiding and chain upshifting pegs 280 and 282 may be formed from a hardened steel for wear resistance, durability, and strength. However, these peg and hook elements may be formed of other suitable materials, if desired. In another example, the upshift element 210 and the chain guiding and chain upshifting pegs 280, 282 may be formed as one integral unit from the same material, if desired. Also, each of the chain guiding pegs 280 may instead be formed as a unique element to present the hook at a different, required depth. Further, the bores 278a-e can each be blind bores and the barrel ends 286, 300 may each have a different length to automatically set the depth of each chain guiding and chain upshifting peg or element when installed. The barrels and bores can also be configured with features that will automatically set the rotational position of each peg when installed. Further, each bore may have a different size to aid in installing the correct peg element in the correct bore on the upshift element 210.

As shown in FIG. 17, the chain guiding pegs 280 and the chain upshifting peg 282 are arranged in a staggered, gradually receding insertion depth relative to the contact surfaces 276 on the body 270 and from the bore 278a to the bore 278e. More specifically, the angled top surface 290 and the tip of each hook 288 for each successive chain guiding peg 280 from the bore 278a to the bore 278d is closer to the plane C of the contact surfaces 276 than the previous one. Likewise, the chamfer 304 and the tip of the hook 302 of the chain upshifting peg 282 in the bore 278e is closer to the plane C than the adjacent hook 288 of the chain guiding peg 280 in the bore 278d. The purpose of this peg and hook arrangement is described in detail below.

The upshift element 210 also has a pair of gudgeons 310 that are spaced apart along and protrude from a bottom edge of the body 270. Each gudgeon 310 has a through bore 312 oriented in a direction parallel with of the length of the body 270. The through bores 312 of the gudgeons 310 are concentrically aligned with one another. The body 270 also has an adjustable set screw 314 extending widthwise or depth wise through upshift element 210. The adjustable set screw 314 is threaded and engaged in a threaded hole through the body 270. The purpose and function of the set screw 314 are described below.

As noted above, the first and second downshift elements 212a and 212b have the same configuration and construction in this example. FIGS. 27-29 show the first downshift element 212a, which is described in some detail. The description is equally applicable to the second downshift element 212b as well and thus each is shown and referenced herein with the same features and reference numbers. In this example, the first downshift element 212a includes a body 320 with a proximal end, a distal end, and a fulcrum 322 disposed generally between the ends. A pair of coaxial holes 324 are disposed spaced apart across a width of the body 320 and define a pivot axis P at the fulcrum 322.

The body 320 includes a drive arm 326 along one side of the body. The drive arm 326 extends radially relative to the axis P and from one of the holes 324 at the fulcrum 322. The free end of the drive arm 326 is the proximal end of the body 320 in this example. A radial face of the drive arm 326 defines a cam surface 328 of the downshift element 212a. The cam surface 328 includes a notch 330. The other end of the body, opposite the drive arm 326, terminates at the distal end. The other end has two legs 332 that extend radially relative to the axis P and from a respective one of the holes 324 at the fulcrum 322. A head 334 is connected to the distal ends of the legs 332. The proximal end of the head 334 connected to the legs 332 is thicker than the legs to define a contoured surface 336 (see FIG. 28) that faces radially inward toward the fulcrum axis P. However, the contoured surface 336 has a non-flat contour and is oriented at an angle, i.e., non-parallel relative to the axis P (see FIGS. 27 and 29).

The head 334 also defines a contact face 338 on a tangential surface of the head. The contact face 338 is angled, i.e., non-parallel relative to a radial reference between the axis P and the distal end of the downshift element 212a. The contact face 338 is configured to engage the chain 138, as is described in more detail below.

In one example, the first and second downshift elements 212a and 212b may be made from anodized aluminum. In another example, these elements may be made from other light weight, less expensive, and/or less durable materials. However, in such an example, the head 334, or at least the contact face 338 portion thereof, may be made separately from a more durable, wear resistant material, such as hardened steel, and attached to the head or to the body 320 of the downshift element.

Figure 30:
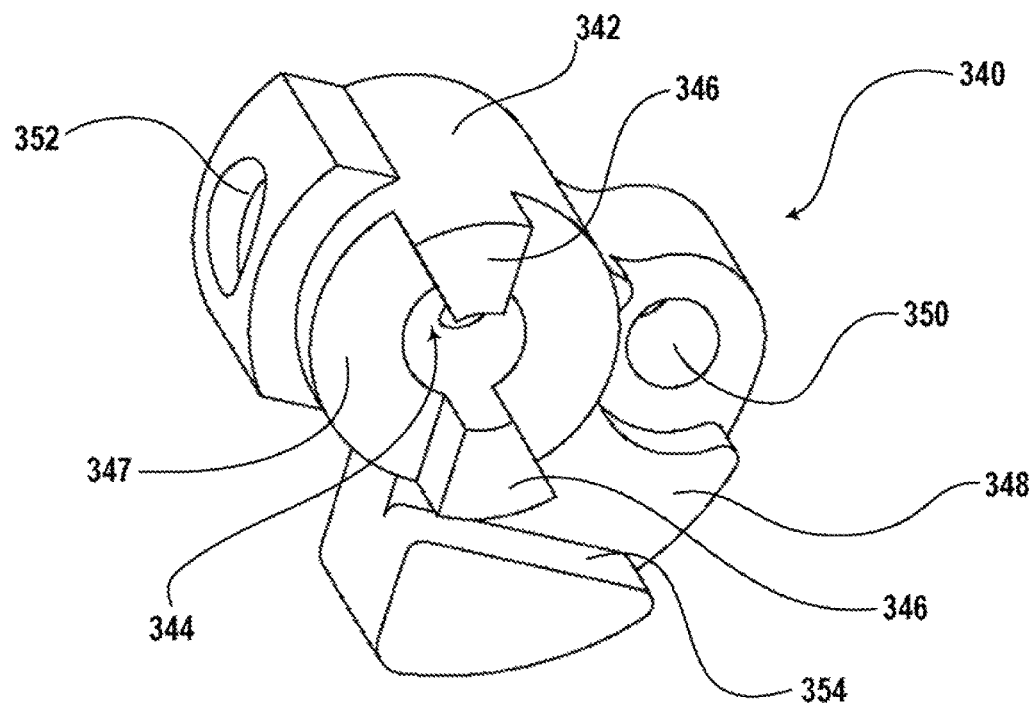
FIG. 30 shows a perspective view of one example of an upshift driver of the shift mechanism for the front shift unit of FIG. 10 in accordance with the teachings of the present disclosure.
Figure 31:
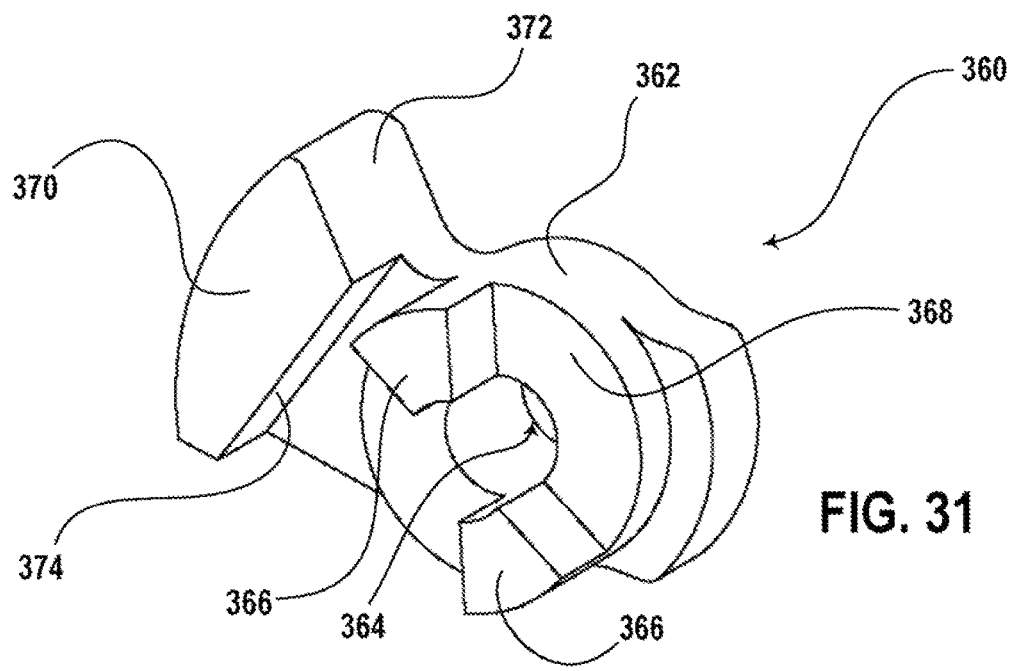
FIG. 31 shows a perspective view of one example of an upshift actuator of the shift mechanism for the front shift unit of FIG. 10 in accordance with the teachings of the present disclosure.

Referring to FIGS. 30 and 31, the upshift element 210 of the front shifting system is associated with two upshift driving components that effect movement of the upshift element, as described in greater detail below. In this example, one of the upshift driving components is an upshift driver 340 depicted in FIG. 30. The upshift driver 340 has a cylinder-shaped hub 342 with a central hole 344 formed axially through the hub. The upshift driver 340 rotates about the axis of the central hole 344. Two torque protrusions 346 protrude axially from a face 347 of the hub 342. The torque protrusions 346 are wedge shaped and are positioned 180 degrees opposite one another around the central hole 344. The torque protrusions 346 are configured to transmit torque during use, as described below.

A drive body 348 of the upshift driver 340 protrudes radially from the hub 342 relative to the axis of the central hole 344. A link hole 350 is formed through the drive body 348. The link hole 350 has an axis that is parallel to, but spaced radially apart from, the axis of the central hole 344. A threaded bore 352 is formed radially into the hub 342 and is oriented perpendicular to axis of the central hole 344. A portion of the drive body 348 forms a first spring contact surface 354 that is configured and arranged to engage a torsion spring or return spring, as described below. In this example, the first spring contact surface 354 faces radially inward toward the axis of the central hole 344 but lies in a plane that is spaced from or tangential relative to the axis.

In this example, the other of the upshift driving components is an upshift actuator 360 depicted in FIG. 31. The upshift actuator 360 also has a cylinder-shaped hub 362 with a central hole 364 formed axially through the hub. The upshift actuator 360 rotates about the axis of the central hole 364. Two torque protrusions 366 protrude axially from a face 368 of the hub 362. The torque protrusions 366 are also wedge shaped and are also positioned 180 degrees opposite one another around the central hole 364. The face 368 of the upshift actuator 360 contacts the face 347 of the upshift driver 340 and the torque protrusions 366 are configured to rotationally engage the torque protrusions 344 on the upshift driver 340 to transmit torque during use, as described below.

An actuator arm 370 of the upshift actuator 360 protrudes radially from the hub 362 relative to the axis of the central hole 364. A contact surface 372 on the actuator arm 370 faces in a circumferential direction. The contact surface 372 is configured to contact a portion of the upshift element 210 to move the element during use, as is described in further detail below. A portion of the actuator arm 370 forms a second spring contact surface 374 that is configured and arranged to engage a torsion spring or return spring, as described below. In this example, the second spring contact surface 374 also faces radially inward toward the axis of the central hole 364 but lies in a plane that is spaced from or tangential relative to the axis.

Figure 32:
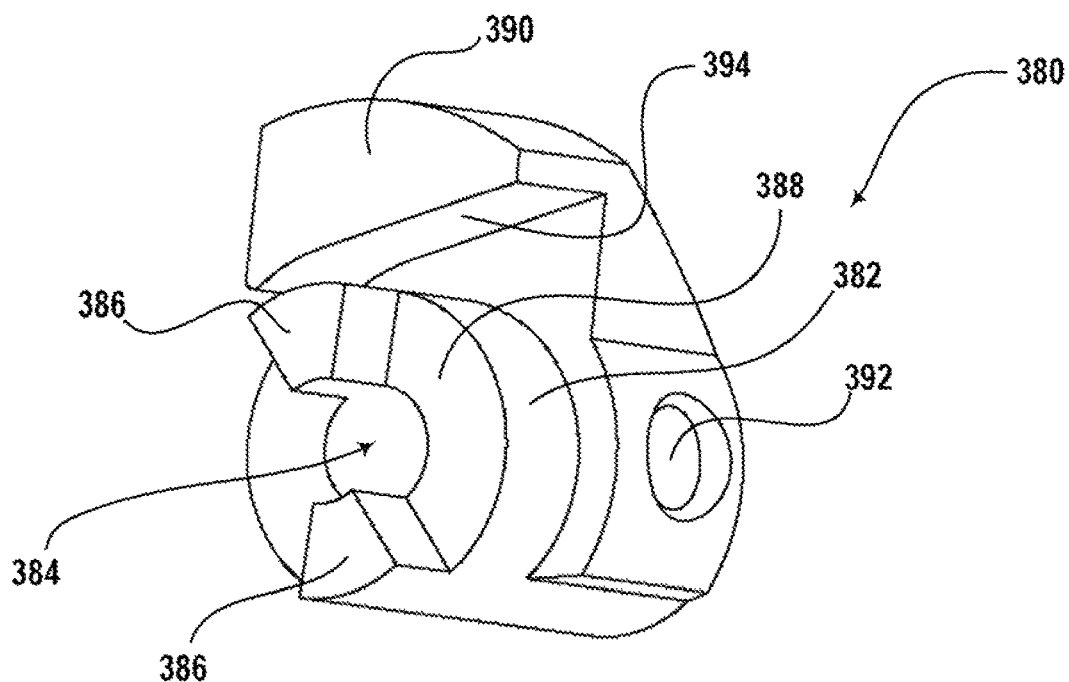
FIG. 32 shows a perspective view of one example of a first downshift driver of the shift mechanism for the front shift unit of FIG. 10 in accordance with the teachings of the present disclosure.
Figure 33:
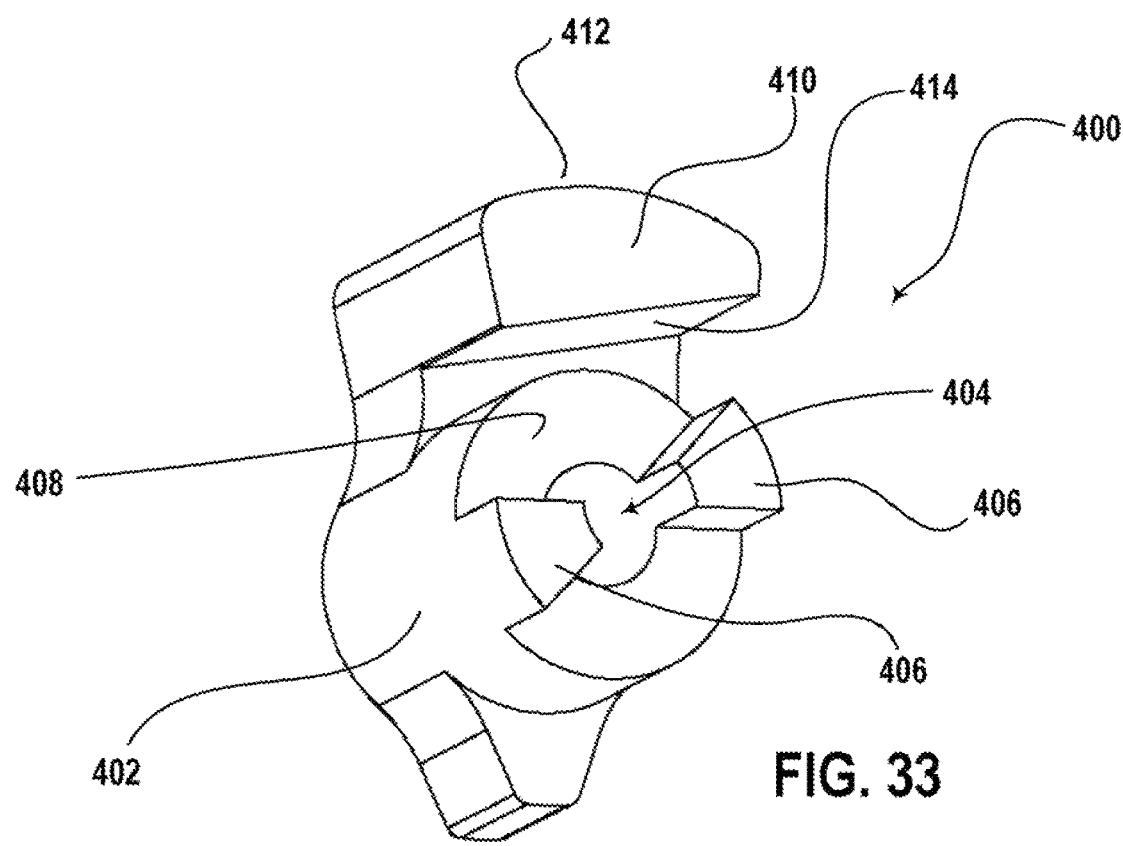
FIG. 33 shows a perspective view of one example of a first downshift cam of the shift mechanism for the front shift unit of FIG. 10 in accordance with the teachings of the present disclosure.

Referring to FIGS. 32 and 33, the first downshift element 212a of the front shifting system is associated with two downshift driving components that effect movement of the first downshift element, as described in greater detail below. In this example, one of the downshift driving components is a first downshift driver 380 depicted in FIG. 32. The first downshift driver 380 also has a cylinder-shaped hub 382 with a central hole 384 formed axially through the hub. The first downshift driver 380 also rotates about the axis of the central hole 384. Two torque protrusions 386 protrude axially from a face 388 of the hub 382. The torque protrusions 386 are also wedge shaped and are positioned 180 degrees opposite one another around the central hole 384. The torque protrusions 386 are configured to transmit torque during use, as described below.

A protrusion 390 of the first downshift driver 380 protrudes radially from the hub 382 relative to the axis of the central hole 384. A threaded bore 392 is formed radially into the hub 382 and is oriented perpendicular to axis of the central hole 384. An undercut portion of the protrusion 390 forms a first spring contact surface 394 that is configured and arranged to engage a torsion spring or return spring, as described below. In this example, the first spring contact surface 394 faces radially inward toward the axis of the central hole 384 but lies in a plane that is spaced from or tangential relative to the axis.

In this example, the other of the downshift driving components is a first downshift cam 400 depicted in FIG. 33. The first downshift cam 400 has a cylinder-shaped hub 402 with a central hole 404 formed axially through the hub. The first downshift cam 400 rotates about the axis of the central hole 404. Two torque protrusions 406 protrude axially from a face 408 of the hub 402. The torque protrusions 406 are also wedge shaped and are also positioned 180 degrees opposite one another around the central hole 404. The face 408 of the first downshift cam 400 contacts the face 388 of the first downshift driver 380 and the torque protrusions 406 are configured to rotationally engage the torque protrusions 386 on the first downshift driver 380 to transmit torque during use, as described below.

A cam arm 410 of the first downshift cam 400 protrudes radially from the hub 402 relative to the axis of the central hole 404. A cam surface 412 on the cam arm 410 faces in an outward radial direction at the end of the cam arm. The cam surface 412 is curved, may be concentric with the axis of the central hole 404, and is configured to contact a portion of the first downshift element 212a to move the element during use, as is described in further detail below. An undercut portion of the cam arm 410 forms a second spring contact surface 414 that is configured and arranged to engage a torsion spring or return spring, as described below. In this example, the second spring contact surface 414 also faces radially inward toward the axis of the central hole 404 but lies in a plane that is spaced from or tangential relative to the axis.

Figure 34:
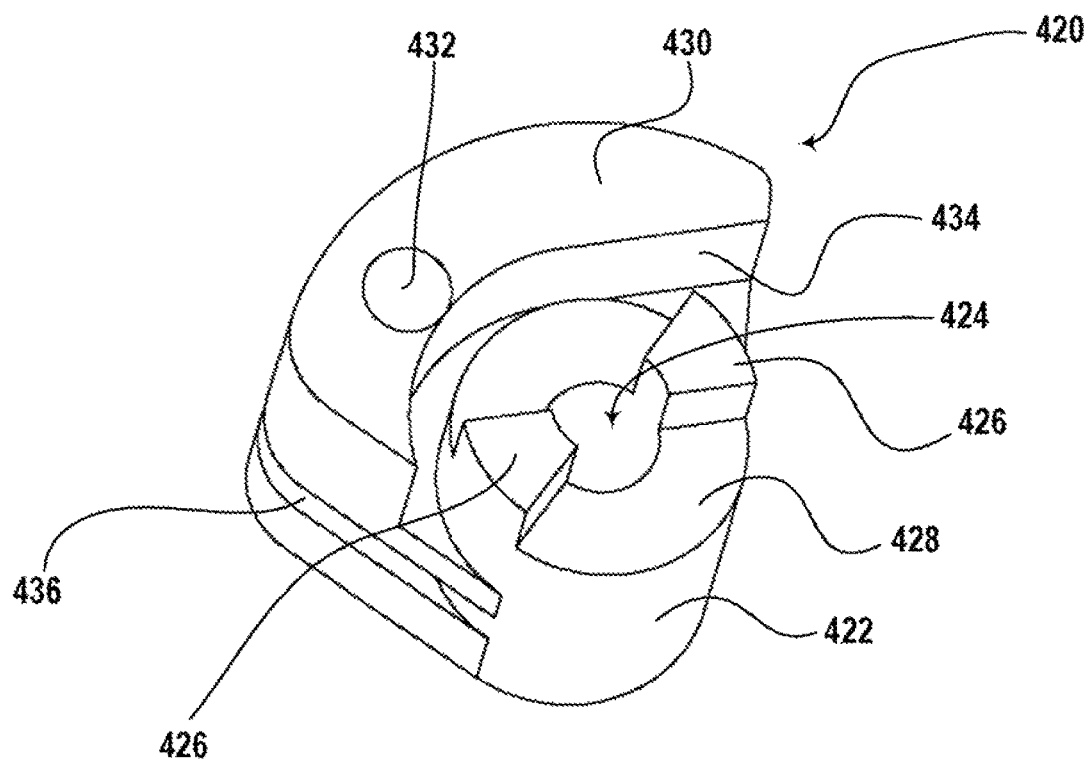
FIG. 34 shows a perspective view of one example of a second downshift driver of the shift mechanism for the front shift unit of FIG. 10 in accordance with the teachings of the present disclosure.
Figure 35:
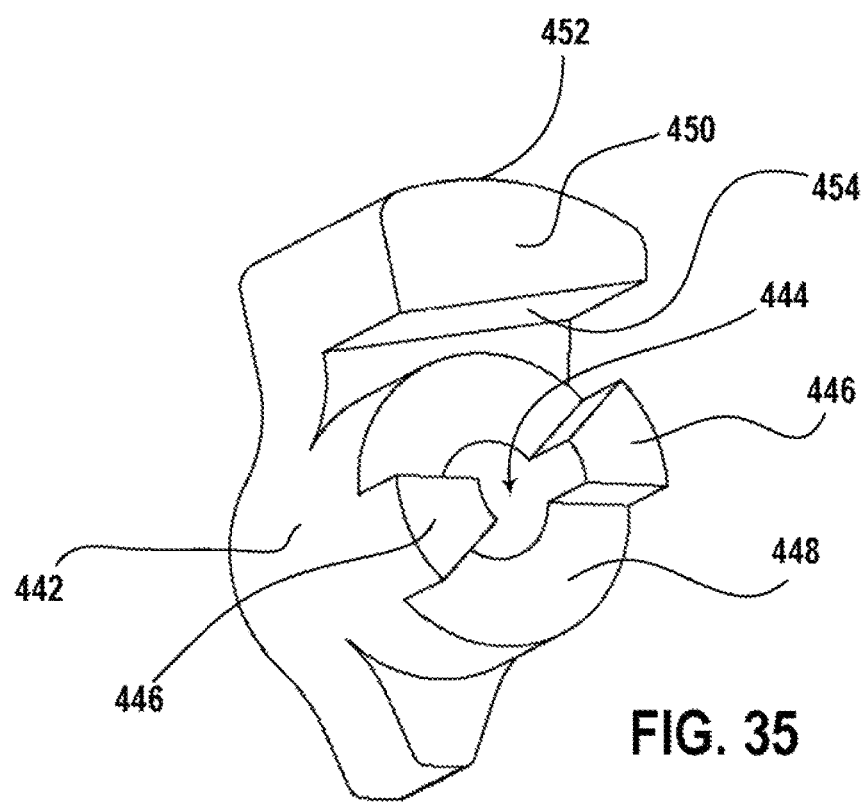
FIG. 35 shows a perspective view of one example of a second downshift cam of the shift mechanism for the front shift unit of FIG. 10 in accordance with the teachings of the present disclosure.
Figure 36:
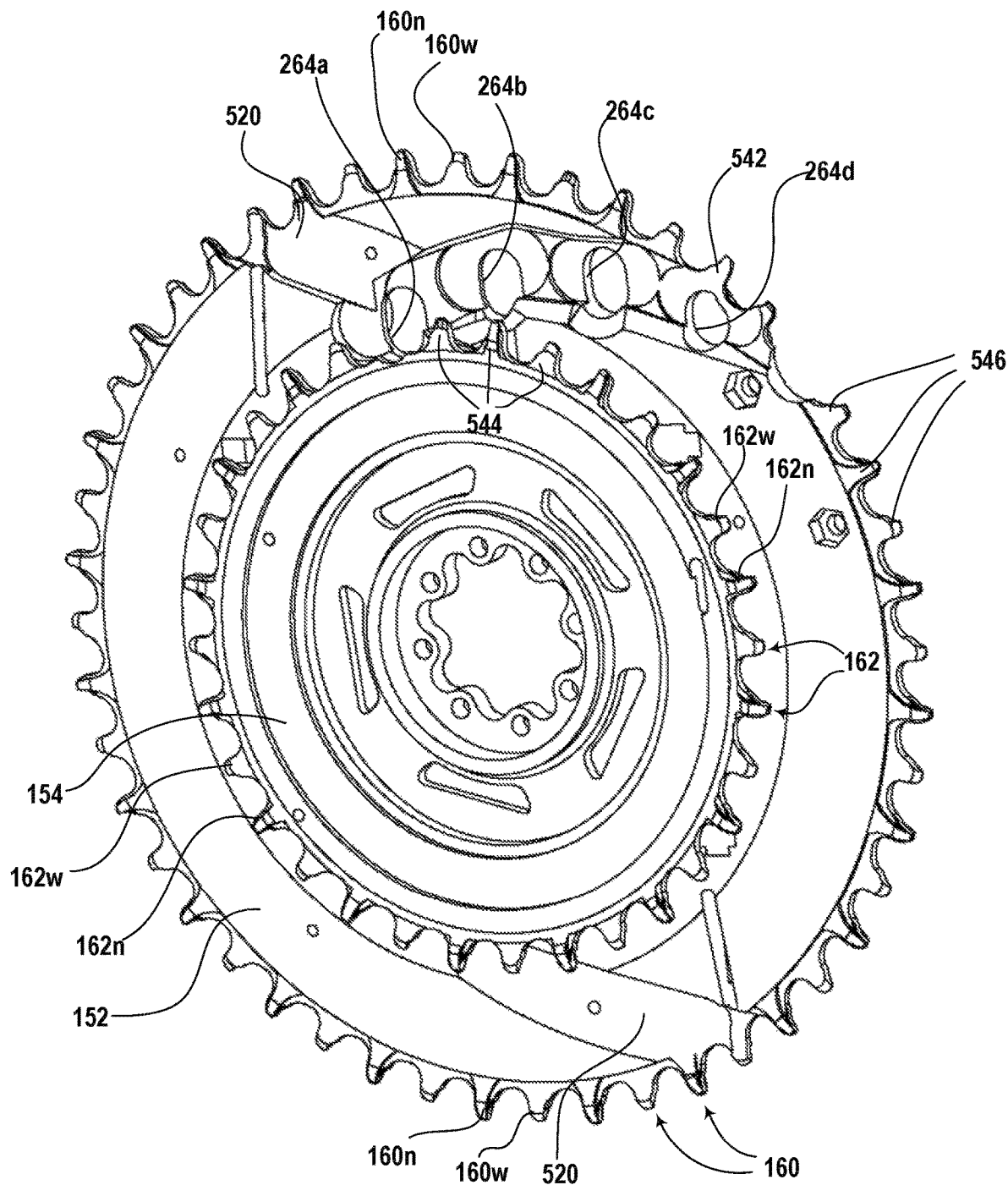
FIG. 36 shows a left or inboard side perspective view of the chain ring component of FIG. 14.
Figure 37:
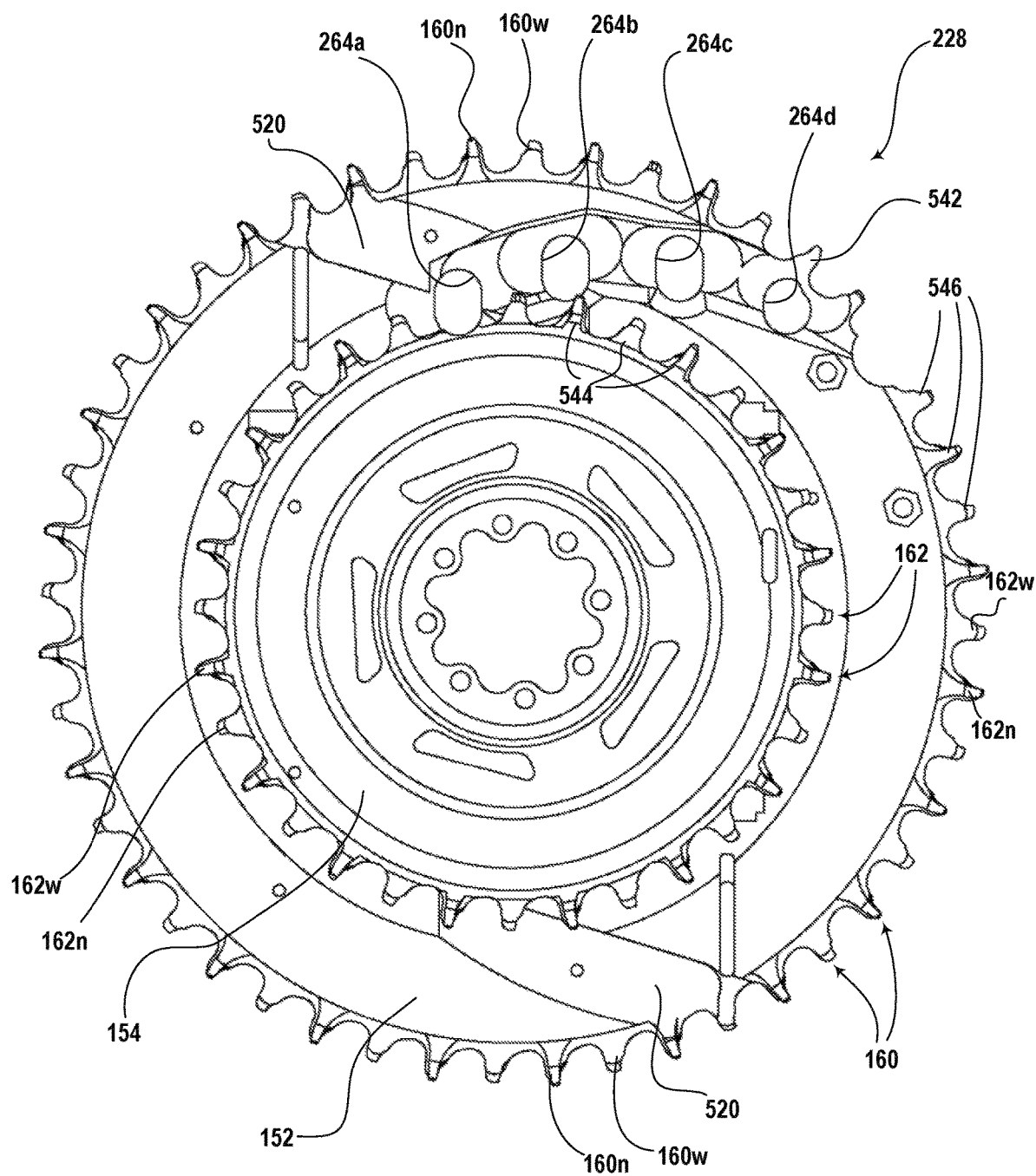
FIG. 37 shows a left or inboard side plan view of the chain ring component of FIG. 14.

Referring to FIGS. 34 and 35, the second downshift element 212b of the front shifting system is also associated with two downshift driving components that effect movement of the second downshift element, as described in greater detail below. In this example, one of the downshift driving components is a second downshift driver 420 depicted in FIG. 34. The second downshift driver 420 also has a cylinder-shaped hub 422 with a central hole 424 formed axially through the hub. The second downshift driver 420 also rotates about the axis of the central hole 424. Two torque protrusions 426 protrude axially from a face 428 of the hub 422. The torque protrusions 426 are also wedge shaped and are positioned 180 degrees opposite one another around the central hole 424. The torque protrusions 426 are configured to transmit torque during use, as described below.

A lobe 430 of the second downshift driver 420 protrudes radially from the hub 422 relative to the axis of the central hole 424. A link hole 432 is formed through the lobe 430. The link hole 432 has an axis that is parallel to, but spaced radially apart from, the axis of the central hole 424. An undercut portion of the lobe 430 forms a first spring contact surface 434 that is configured and arranged to engage a torsion spring or return spring, as described below. In this example, the first spring contact surface 434 faces radially inward toward the axis of the central hole 424. A curved portion of the first spring contact surface 434 is curved and is concentric with the axis of the central hole 424 but spaced from the hub 422. A straight portion of the first contact surface 434 lies in a plane that is spaced from or tangential relative to the axis. A slot 436 is provided in the lobe 430 and extends in a plane perpendicular to the axis of the link hole 432. The slot 436 also has a depth whereby it fully intersects the link hole 432, which effectively divides the link hole 432 into two coaxial holes, one on each side of the slot 436.

In this example, the other of the downshift driving components is a second downshift cam 440 depicted in FIG. 35. The second downshift cam 440 is substantially similar to the first downshift cam 400 and thus also has a cylinder-shaped hub 442 with a central hole 444 formed axially through the hub. The second downshift cam 440 rotates about the axis of the central hole 444. Two torque protrusions 446 protrude axially from a face 448 of the hub 442. The torque protrusions 446 are also wedge shaped and are also positioned 180 degrees opposite one another around the central hole 444. The face 448 of the second downshift cam 440 contacts the face 428 of the second downshift driver 420 and the torque protrusions 446 are configured to rotationally engage the torque protrusions 426 on the second downshift driver 420 to transmit torque during use, as described below.

A cam arm 450 of the first downshift cam 440 protrudes radially from the hub 442 relative to the axis of the central hole 444. A cam surface 452 on the cam arm 450 faces in an outward radial direction at the end of the cam arm. The cam surface 452 is curved, may be concentric with the axis of the central hole 444, and is configured to contact a portion of the second downshift element 212b to move the element during use, as is described in further detail below. An undercut portion of the cam arm 450 forms a second spring contact surface 454 that is configured and arranged to engage a torsion spring or return spring, as described below. In this example, the second spring contact surface 454 also faces radially inward toward the axis of the central hole 444 but lies in a plane that is spaced from or tangential relative to the axis.

The assembled or installed configuration of the various components described above is now provided below. Throughout the following description of the assembled components of the front shift unit 150, continued reference to numerous different figures may be helpful. Specific figures are identified below when describing the components of the assembled front shift unit 150. However, there may also be other figures, though not specifically mentioned, that may be of interest below as well.

Referring to FIGS. 10-13, a first cam shaft 460 extends between the shaft support 240 adjacent the upshifter recess 238 and the shaft support 246 adjacent the first downshifter recess 244a on the big chain ring 152 (see FIGS. 14 and 15).

The first cam shaft 460 extends through the bores 242 and 248 (see FIGS. 14 and 16) of the corresponding shaft supports 240 and 246. A retainer, such as a snap ring or a retaining ring 462 (see FIG. 10) can be employed on at least one end or on both ends of the first cam shaft 460 to axially retain the shaft and prevent it from being withdrawn from the bores 242, 248 in the shaft supports 240, 246.

Referring to FIGS. 10-13, the upshift element 210 is rotatably supported on the first cam shaft 460 between the shaft supports 240 and 246. More specifically, the first cam shaft is received through the bores 312 in the gudgeons 310 on the bottom edge of the body 270 of the upshift element 210. Referring also to FIGS. 5, 13-15, 18, 36, and 37, the series of bores 278a-d in the upshift element 210 align with respective ones of the series of holes 264a-d in the big chain ring 152. Thus, the teeth 288 on the chain guiding pegs 280, which are seated in the bores 278a-d in the body 270 of the upshift element 210, are positioned to correspondingly align with the series of holes 264a-d in the big chain ring 152. Further, referring to FIGS. 5, 14, 15, 36, 37, the guard rail 206, which is mounted to the big chain ring 152, includes a bore 264e that is positioned radially outboard of the big chain ring 152. The hook 302 on the chain upshift peg 282, which is seated in the bore 278e in the body 270 of the upshift element 210, is positioned to correspondingly align with the hole 264e in the guard rail 206.

As can be seen in FIGS. 5, 14, 15, 36, and 37, the big chain ring 152 includes a gap 464 among the sprocket teeth 160 on the perimeter of the chain ring. The hole 264e in the guard rail 206 is positioned to align with the gap 464. Thus, the hook 302 of the chain upshifting hook 282 also aligned with the gap 464. As noted below, the series of holes 264a-d are arranged in an arc and are spaced apart from one another in a circumferential direction on the big chain ring 152. The series of holes 264a-d are also gradually arranged so that each successive hole is radially further away from the rotation axis R, with the hole 264a being closer to the rotation axis R and the hole 264d being further from the rotation axis. The hole 264e is positioned to follow the same arc whereby the hole is still further from the rotation axis R than the adjacent hole 264d. In this example, the hole 264e in the guard rail 206 creates a fifth hole in the series of holes in the big chain ring 152. Again, this number can differ, as will become apparent to those having ordinary skill in the art.

When the upshift element 210 is mounted to the big chain ring 152, the upshift element can pivot about the axis of the first cam shaft 460 toward and away from the big chain ring 152, as described further below. To accommodate, the teeth 288 of the chain guiding pegs 280 and the hook 302 of the chain upshifting peg 282 are also arranged in the same arc as the holes 264a-e. Thus, the teeth 288 of the chain guiding pegs 280 can pass freely out of, and into and through, the corresponding holes 264a-d in the big chain ring 152. Likewise, the hook 302 of the chain upshifting peg 282 can pass freely out of, and into and through, the hole 264e in the guard rail 206.

Referring to FIGS. 10-13, an upshift biasing element, such as a torsion spring 466, can be provided to bias the upshift element 210 in a desired direction. In this example, the torsion spring 466 is provided on the first cam shaft 460. The torsion spring 466 has a first leg 468 seated in a notch 470 in the bottom edge on the body 270 of the upshift element 210 and engages the upshift element. The torsion sprig 466 also has a second leg 472 borne against the surface 226 of the big chain ring 152. The legs 468 and 472 of the torsion spring 466 bias the upshift element 210 about the axis of the first cam shaft 460 in a direction toward the big chain ring 152, which is counterclockwise in FIG. 13.

The gearmotor unit 200 is seated in the motor recess 232 in the surface 226 on the big chain ring 152. The hub 216 extending from the gearmotor unit 200 is positioned over the pocket 234. One end, the proximal end, of the first link 220a is pivotally connected to the hub 216 by the first pin 222a, which is received through the hole in the proximal end of the link and is retained by one of the retaining rings 224. The first link 220a extends along the first recessed channel 236a in the surface 226 of the big chain ring 152. The upshift driver 340 is positioned over the upshifter recess 238 and the first cam shaft 460 is received through the central hole 344 in the hub 342 of the upshift driver. A first drive pin 474a is received through the link hole 350 in the drive body 348 on the upshift driver 340 and though a hole in the other end, the distal end, of the first link 220a. The first drive pin 474a connects the first link 220a to the upshift driver 340 and is retained by another retainer, such as a snap ring or retaining ring 476. In this way, the first link 220a is rotatably connected to the upshift driver 340. Referring to FIGS. 10-12 and 30, a set screw 478 is received in the threaded bore 352 on the upshift driver 340. In this example, the internal end of the set screw 478 can engage a flat surface (not shown) on the first cam shaft 460 to rotationally fix the upshift driver 340 to the first cam shaft so that rotation of the upshift driver rotates the first cam shaft, as described below.

Figure 38:
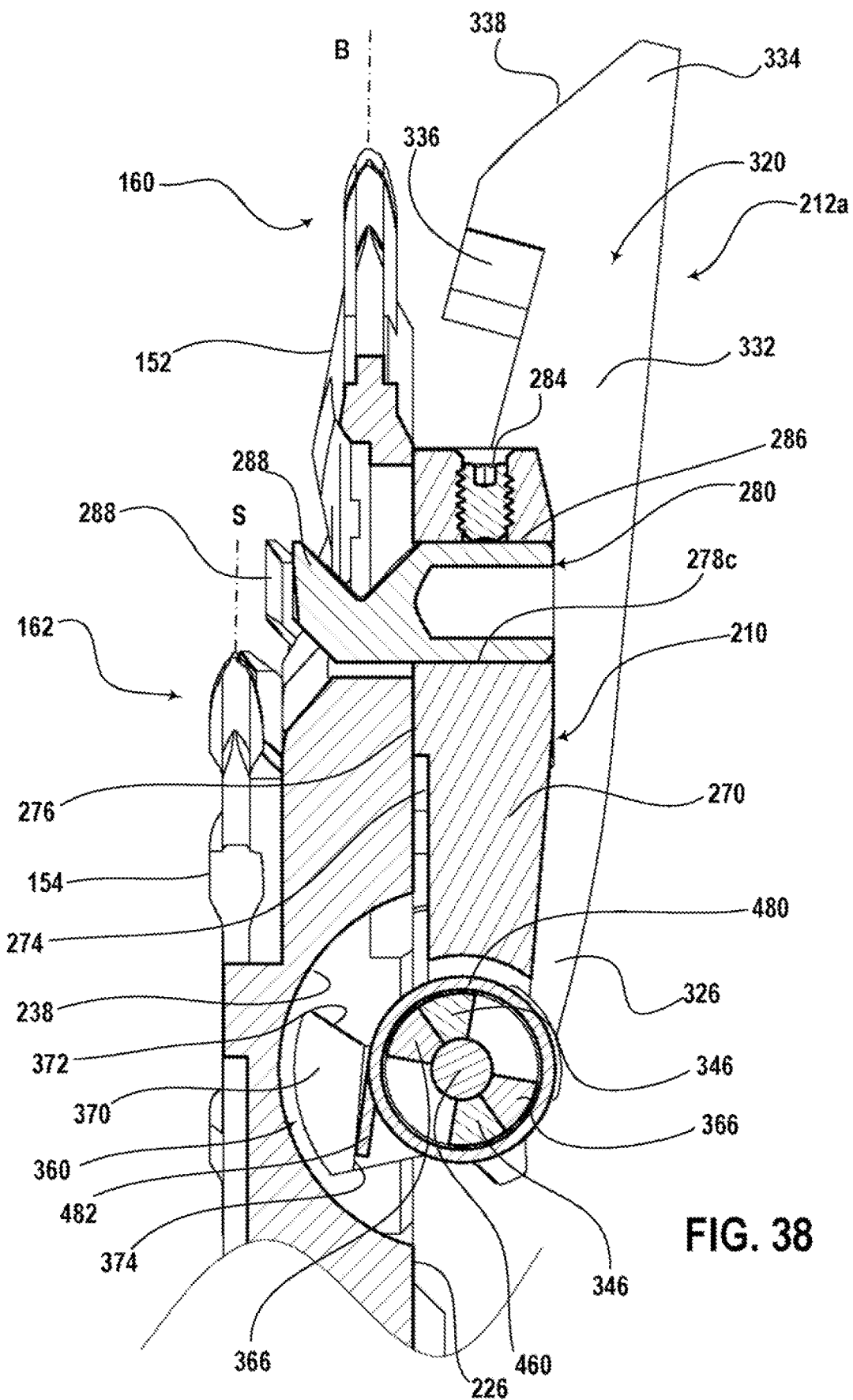
FIG. 38 shows a cross-section taken along line 38-38 of the front shift unit in FIG. 10 and depicting the upshift element of the shift mechanism in the upshift state.

Referring to FIGS. 10-12 and 38, the upshift actuator 360 is also positioned over the upshifter recess 238. The first cam shaft 460 is rotatably received through the central hole 364 in the hub 362 of the upshift actuator 360. The actuator arm 370 is positioned facing and within the upshifter recess 238. The upshift actuator 360 is positioned adjacent the upshift driver 340 on the first cam shaft 460 with their respective faces 368 and 347 closely confronting one another. The torque protrusions 366 of the upshift actuator 360 overlap axially with the torque protrusions 346 on the upshift driver 340. Thus, the torque protrusion 366 and 346 can rotationally engage with one another. An upshift biasing element, such as a torsion spring, i.e., an upshift spring 480 is disposed on the first cam shaft 460 and axially between the upshift driver 340 and the upshift actuator 360. A first leg (not shown) of the upshift spring 480 contacts or engages the first spring contact surface 354 on the upshift driver 340. A second leg 482 of the upshift spring 480 contacts or engages the second spring contact surface 374 on the upshift actuator 360. The upshift spring 480 is disposed and arranged to rotationally bias the torque protrusions 346 on the upshift driver 340 against the torque protrusions 366 on the upshift actuator 360, as shown in FIG. 38.

Referring to FIGS. 10-12, 32, and 39, the first downshift driver 380 is positioned over the first downshifter recess 244a and the first cam shaft 460 is also received through the central hole 384 in the hub 382 of the first downshift driver. A set screw 486 is received in the threaded bore 392 on the first downshift driver 380. In this example, the internal end of the set screw 486 can engage another flat surface (not shown) on the first cam shaft 460 to rotationally fix the first downshift driver 380 to the first cam shaft so that rotation of the first cam shaft also rotates the first down shift driver, as discussed further below.

Figure 39:
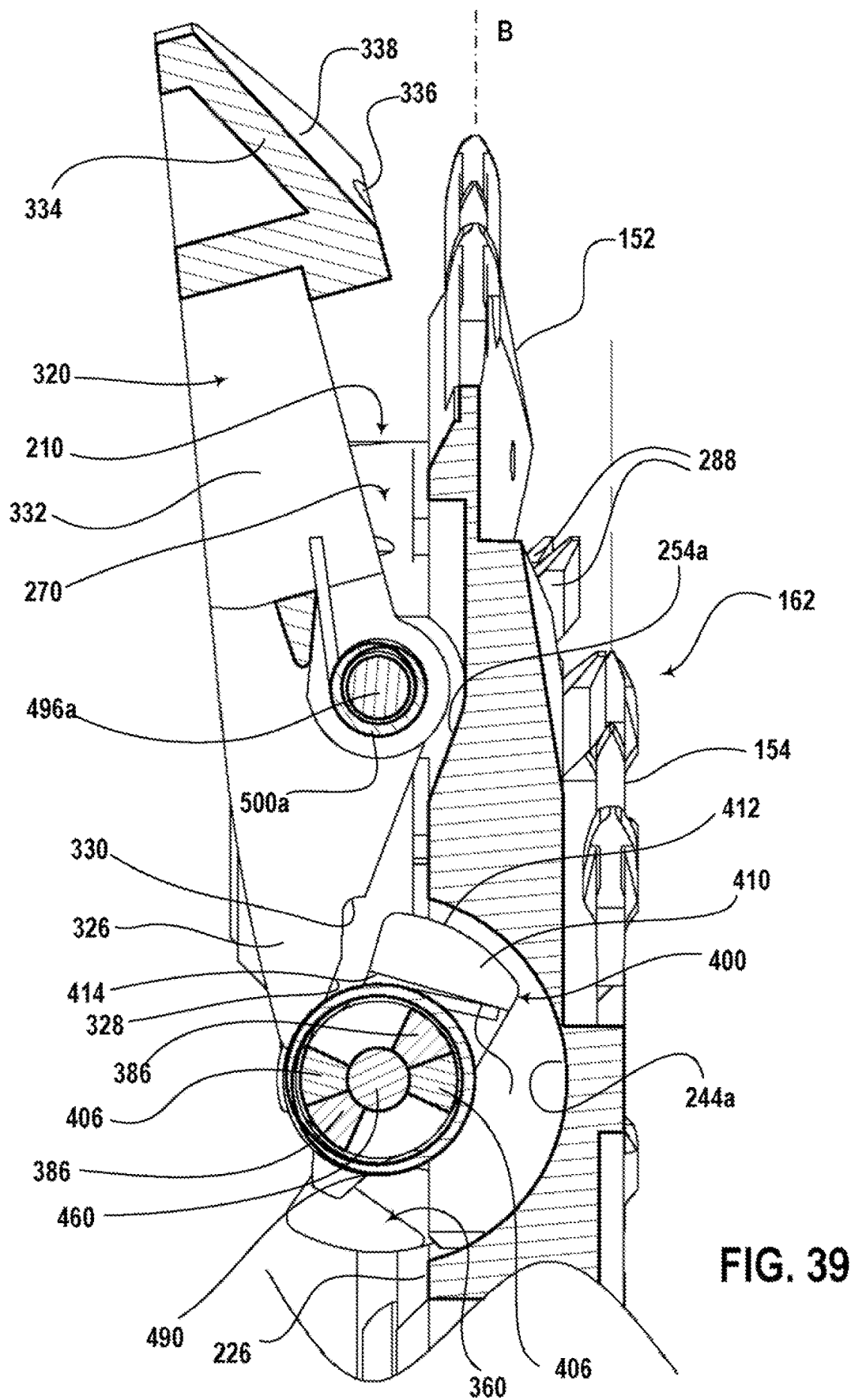
FIG. 39 shows a cross-section taken along line 39-39 of the front shift unit in FIG. 10 and depicting the first downshift element in the upshift state, i.e., a neutral state for the first downshift element.

Referring to FIGS. 10-12 and 39, the first downshift cam 400 is also positioned over the first downshifter recess 244a. The first cam shaft 460 is rotatably received through the central hole 404 in the hub 402 of the first downshift cam. The cam arm 410 is positioned facing and within the first downshifter recess 244a. The first downshift cam 400 is positioned adjacent the first downshift driver 380 on the first cam shaft 460 with their respective faces 408 and 388 closely confronting one another. The torque protrusions 406 of the first downshift cam 400 overlap axially with the torque protrusions 386 on the first downshift driver 380. Thus, the torque protrusion 406 and 386 can rotationally engage with one another. A first downshift biasing element, such as a torsion spring, i.e., a first downshift spring 490 is disposed on the first cam shaft 460 and axially between the first downshift driver 380 and the first downshift cam 400. A first leg (not shown) of the first downshift spring 490 contacts or engages the first spring contact surface 394 on the first downshift driver 380. A second leg 492 of the first downshift spring 490 contacts or engages the second spring contact surface 414 on the first downshift cam 400. The first downshift spring 490 is disposed and arranged to rotationally bias the torque protrusions 386 on the first downshift driver 380 against the torque protrusions 406 on the first downshift cam 400, as shown in FIG. 39.

Referring to FIGS. 10-12, 14-16, and 39, the first downshift element 212a is positioned over the first downshift element recess 254a in the surface 226 of the big chain ring 152. The fulcrum 322 of the first downshift element 212a is received in the first downshift element recess 254a. A first downshift shaft 496a is received through the bores 258 of the supports 256 adjacent the first downshift element recess 254a. The first downshift shaft 494a is retained axially by a retaining element, such as a snap ring or retaining ring 498a at each end of the shaft. The first downshift shaft 496a is also received through the holes 324 at the fulcrum 322 to pivotally support the first downshift element 212a on the shaft and relative to the supports 256. A first downshifter biasing element, i.e., a first downshifter spring 500a, such as a torsion spring, may be disposed on the first downshift shaft 496a. A first leg (not shown) of the first downshifter spring 500a can engage the surface 226 of the big chain ring 152. A second leg 502 of the first downshifter spring 500a can engage a spring contact surface 504 between the holes 324 of the fulcrum 322 on the first downshift element 212a. The first downshift spring 500a is configured and arranged to bias the head 334 and contact face 338 of the first downshift element 212a in a direction away from the big chain ring 152, the direction being counterclockwise in FIG. 39.

Referring to FIGS. 10-13 and 40, a second cam shaft 506 extends between the shaft supports 250 adjacent the second downshifter recess 244b on the big chain ring 152 (see FIGS. 14 and 15). The second cam shaft 506 extends through the bores 252 (see FIGS. 14 and 16) of the shaft supports 250. A pair of retainers, such as snap rings or retaining rings 508 (see FIG. 10) can be employed on the ends of the first cam shaft 506 to axially retain the shaft and prevent it from being withdrawn from the bores 252 in the shaft supports 250.

Referring to FIGS. 10-13 and 34, one end, the proximal end, of the second first link 220b is pivotally connected to the hub 216 by the second pin 222b, which is received through the hole in the proximal end of the second link and is retained by one of the retaining rings 224. The second link 220b extends along the second recessed channel 236b in the surface 226 of the big chain ring 152. The second downshift driver 420 is positioned over the second downshifter recess 244b and the second cam shaft 506 is rotatably received through the central hole 424 in the hub 422 of the second downshift driver. The other end, the distal end, of the second link 220b is received in the slot 436 in the lobe 430 of the second downshift driver 420A. A second drive pin 474b is received through the link hole 432 in the lobe 430 and though a hole in the distal end of the second link 220b. The second drive pin 474b rotatably connects the second link 220b to the second downshift driver 420 and is retained by another retainer, such as a snap ring or retaining ring (not shown). In this way, the second link 220b is rotatably connected to the second downshift driver 420 and drives rotation of the second downshift driver 420, as described below.

Figure 40:
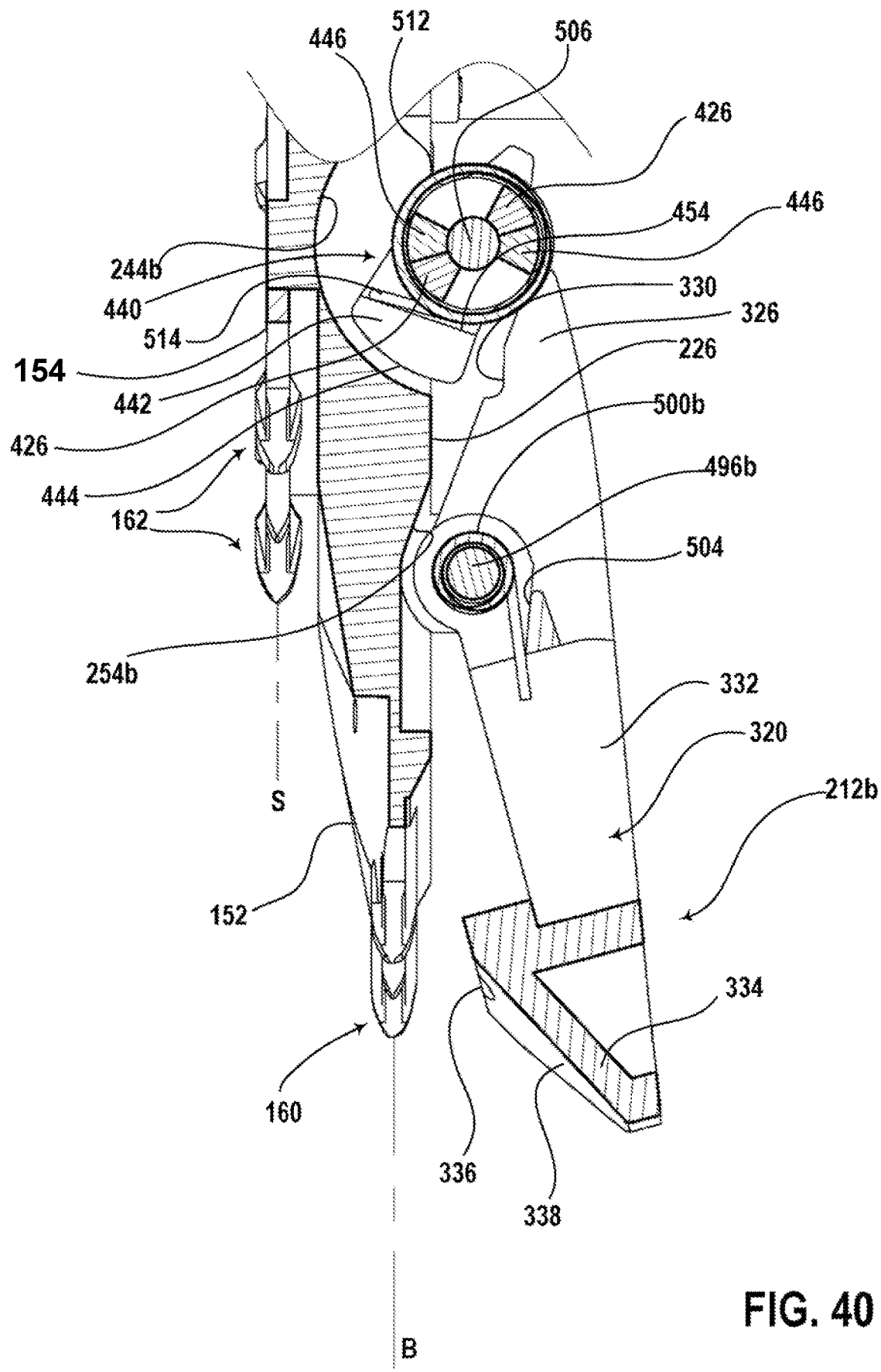
FIG. 40 shows a cross-section taken along line 40-40 of the front shift unit of FIG. 10 and depicting the second downshift element in the upshift state, i.e., a neutral state for the second downshift element.

Referring to FIGS. 10-13 and 40, the second downshift cam 440 is also positioned over the second downshifter recess 244b. The second cam shaft 506 is rotatably received through the central hole 444 in the hub 442 of the second downshift cam 440. The cam arm 450 is positioned facing and within the second downshifter recess 244b. The second downshift cam 440 is positioned adjacent the second downshift driver 420 on the second cam shaft 506 with their respective faces 448 and 428 closely confronting one another. The torque protrusions 446 of the second downshift cam 440 overlap axially with the torque protrusions 426 on the second downshift driver 420. Thus, the torque protrusion 446 and 426 can rotationally engage with one another. A second downshift biasing element, such as a torsion spring, i.e., a second downshift spring 512 is disposed on the second cam shaft 506 and axially between the second downshift driver 420 and the second downshift cam 440. A first leg (not shown) of the second downshift spring 512 contacts or engages the first spring contact surface 434 on the second downshift driver 420. A second leg 514 of the second downshift spring 512 contacts or engages the second spring contact surface 454 on the second downshift cam 440. The second downshift spring 512 is disposed and arranged to rotationally bias the torque protrusions 426 on the second downshift driver 420 against the torque protrusions 446 on the second downshift cam 440, as shown in FIG. 40.

Referring to FIGS. 10-12, 14-16, and 40, the second downshift element 212b is positioned over the second downshift element recess 254b in the surface 226 of the big chain ring 152. The fulcrum 322 of the second downshift element 212b is received in the second downshift element recess 254b. A second downshift shaft 496b is received through the bores 262 of the supports 260 adjacent the second downshift element recess 254b. The second downshift shaft 494b is retained axially by a retaining element, such as a snap ring or retaining ring 498b at each end of the shaft. The second downshift shaft 496b is also received through the holes 324 at the fulcrum 322 to pivotally support the second downshift element 212b on the shaft and relative to the supports 260. A second downshifter biasing element, i.e., a second downshifter spring 500b, such as a torsion spring, may be disposed on the second downshift shaft 496b. A first leg (not shown) of the second downshifter spring 500b can engage the surface 226 of the big chain ring 152. A second leg 502 of the second downshifter spring 500b can engage a spring contact surface 504 between the holes 324 of the fulcrum 322 on the second downshift element 212b. The second downshift spring 500b is configured and arranged to bias the head 334 and contact face 338 of the second downshift element 212b in a direction away from the big chain ring 152, the direction being counterclockwise in FIG. 40.

The components of the front shifting system and the front shift unit 150 can vary in configuration and construction from the example shown and described herein. The specific components and component arrangement can also vary. More specifically, the characteristics, such as the shape, size, depth, height, width, length, and location of the features, including the various shaft supports, recesses, holes, and depressions, on the surface 226 of the big chain ring 152 can also vary. Some of the features and/or components may instead be part of or carried on the small chain ring 154 of the front shift unit 150. Also, the physical details, such as the location, size, shape, structure, and material of the various drivers, actuators, cams, and upshift and downshift elements can vary from the examples described above. The type, size, location, and arrangement of the various sub-components, including the cam shafts, pins, links, and biasing elements, can also vary from the examples shown and described herein. Also, details, such as the location, type, arrangement, size, physical input and output characteristics, electrical power consumption, and mechanical power output, of the electro-mechanical and electronic components, including the gearmotor unit and the control unit, can also vary from the examples disclosed and described herein. As will be evident to those having ordinary skill in the art upon reading this disclosure, the front shifting system disclosed and described herein can function as intended though changes are made to the component examples.

Figure 41:
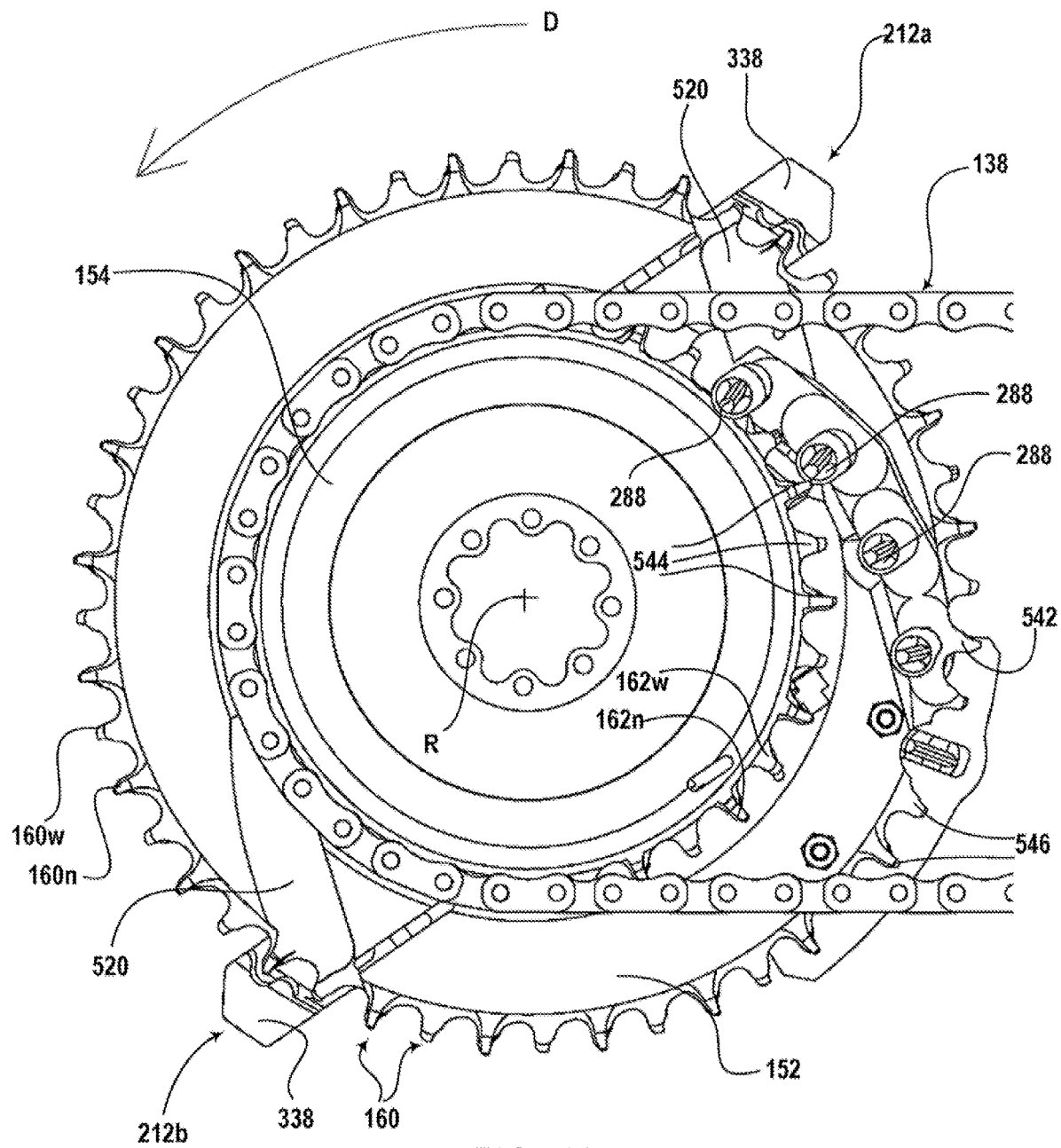
FIG. 41 shows a left or inboard side view of the front shift unit of FIGS. 10 and 11, but including the chain, and at the first stage of or just prior to an upshift operation.
Figure 42:
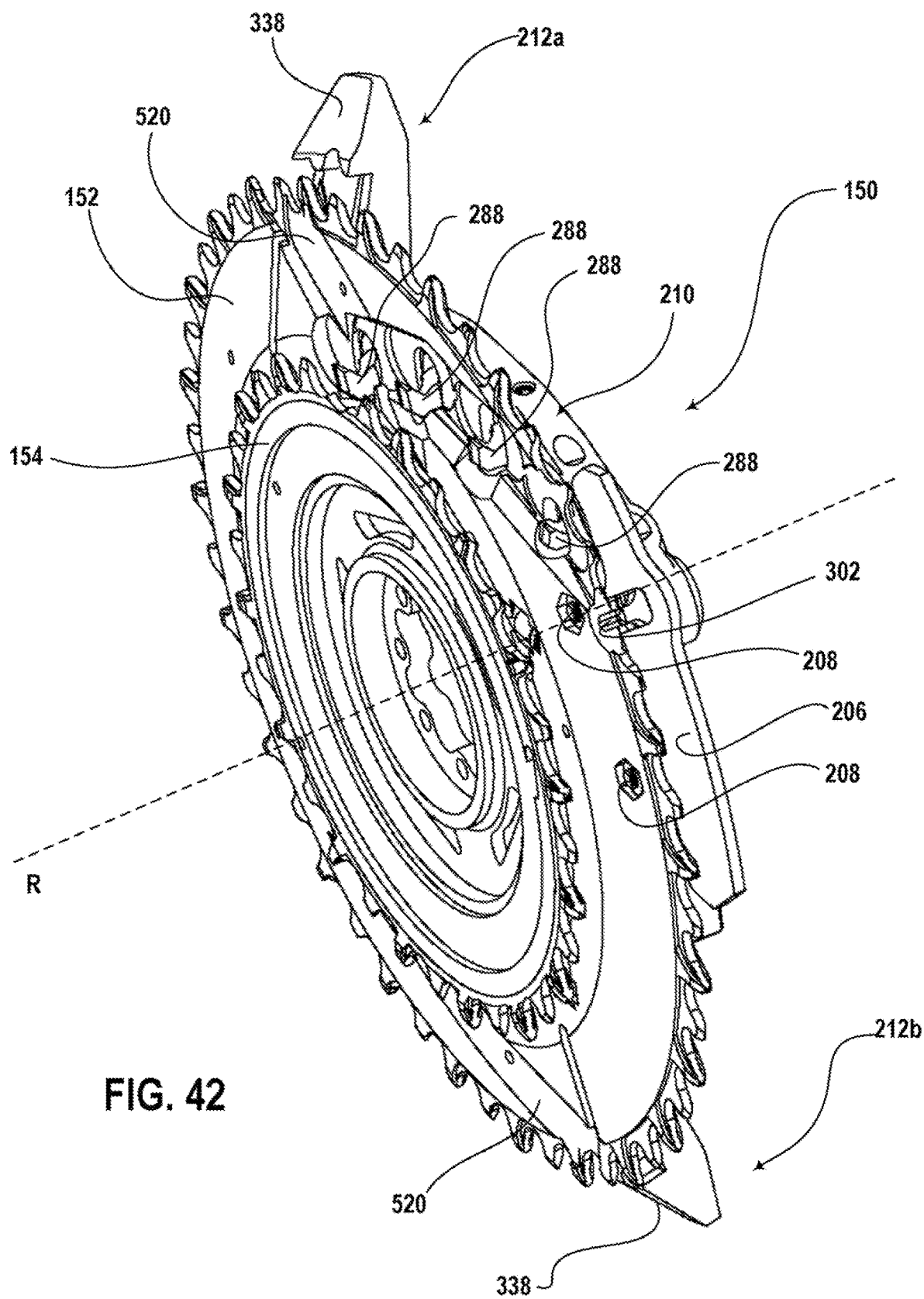
FIG. 42 shows a left or inboard side perspective view of the front shift unit of FIG. 10 and in the upshift state.
Figure 43:
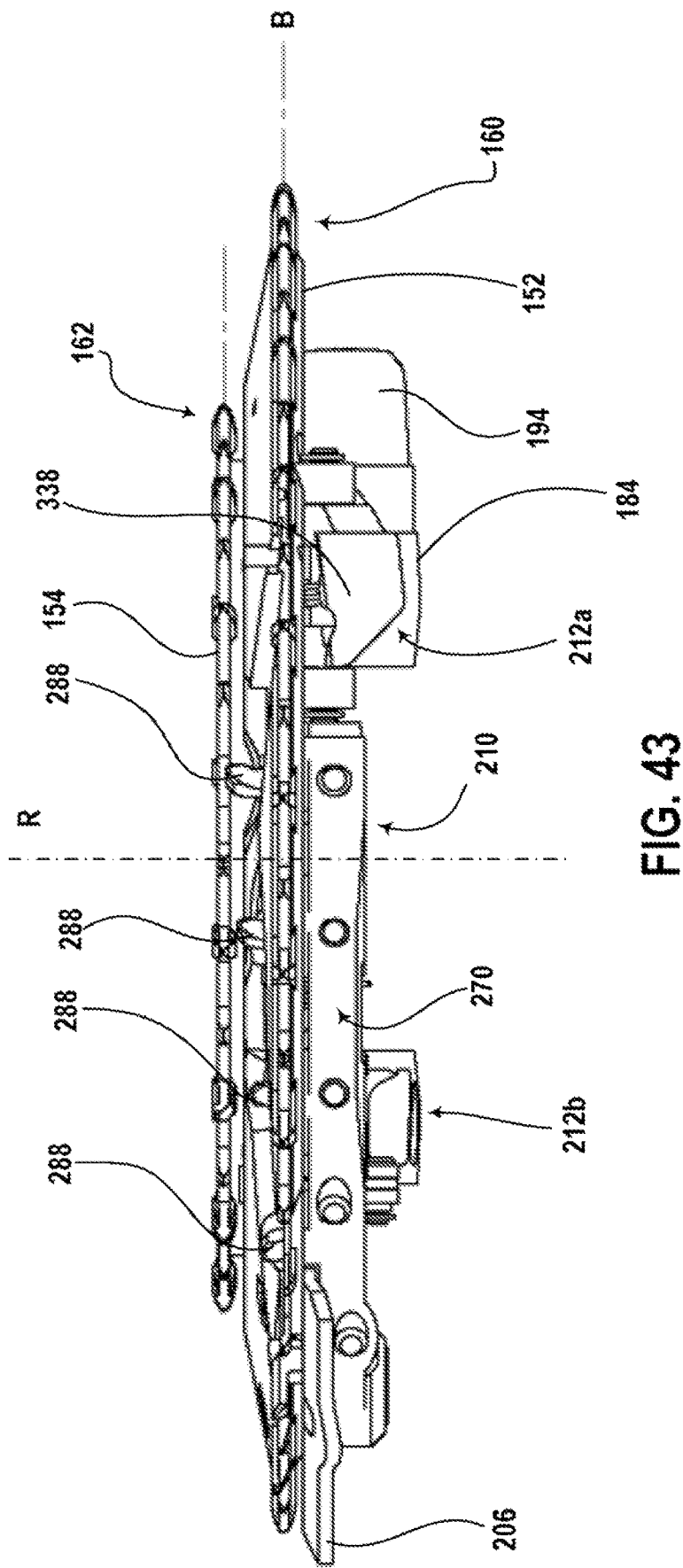
FIG. 43 shows a top view of the front shift unit of FIG. 42.
Figure 44:
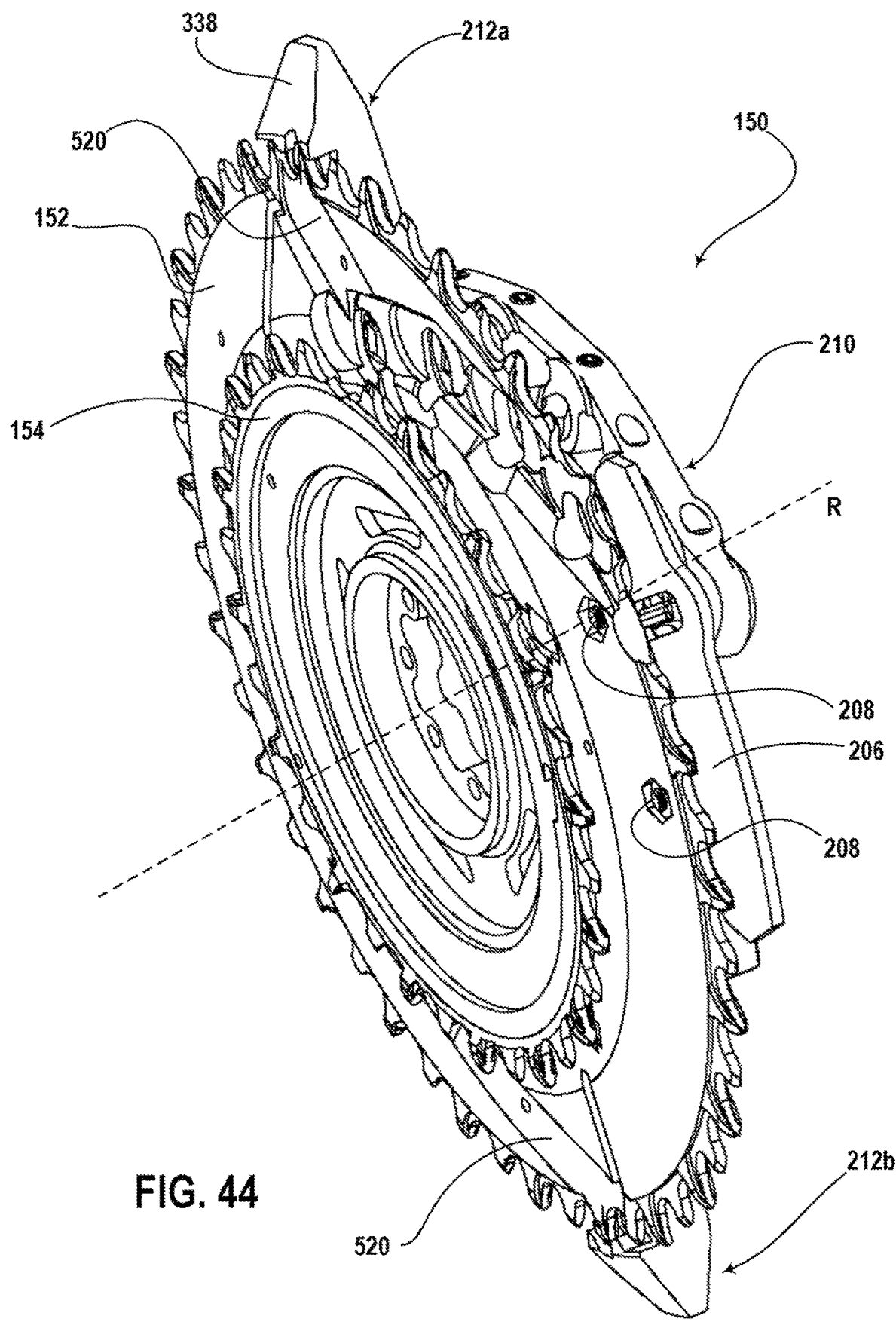
FIG. 44 shows the front shift unit of FIG. 42 but in the downshift state.
Figure 45:
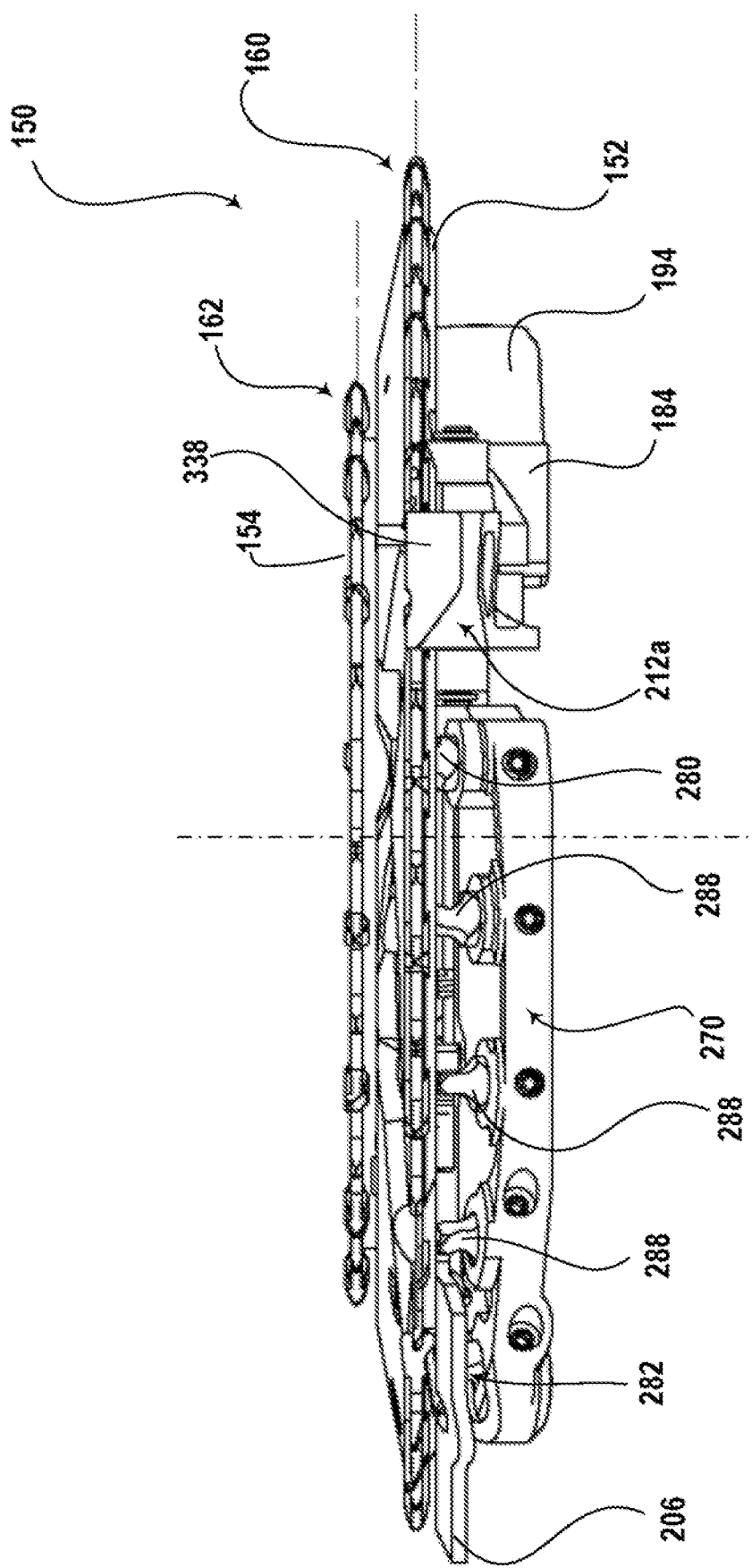
FIG. 45 shows the front shift unit of FIG. 43 but in the downshift state.

The operation of the front shifting system is now described with continued reference to the drawings, as noted below, and to the above description of the components. The disclosed front shifting system has two shifting states and has two operational states. The operational states in this example include a first operational state, i.e., a big chain ring state, and a second operational state, i.e., a small chain ring state. In the big chain ring state, as shown in FIG. 2, the chain 138 is on the big chain ring 152 and remains engaged with the sprocket teeth 160 on the big chain ring with the bicycle 100 in a corresponding gear and a rider pedaling the bicycle. In the small chain ring state, as shown in FIG. 41, the chain 138 is on the small chain ring 154 and remains engaged with the sprocket teeth 162 on the small chain ring with the bicycle 100 in a corresponding gear and the rider pedaling the bicycle. One, more, or all of the front shifting system components may be in certain positions and arrangements in the big chain ring state and in different positions and arrangements in the small chain ring state. Alternatively, one, more, or all of the front shifting system components may be in the same positions and arrangements in each of the big chain ring and small chain ring states. In such examples, the components of the front shifting system can move from the big and/or small chain ring states to different, shifting states and arrangements in order to shift the chain 138 between the big and small chain rings 152 and 154.

The front shifting states include a first state, i.e., an upshift state, and a second state, i.e., a downshift state. In the upshift state, the front shifting system and the components of the front shift unit 150 are operated, positioned or repositioned, and arranged to shift the chain 138 onto the big chain ring 152 and into engagement with the sprocket teeth 160 on the big chain ring. In the downshift state, the front shifting system and the components of the front shift unit 150 are operated, positioned or repositioned, and arranged to shift the chain 138 onto the small chain ring 154 and into engagement with the sprocket teeth 162 on the small chain ring. By operating the front shifting system, the chain 138 can be shifted or switched between the big and small chain rings to alter the gear rations of the drivetrain 124.

Referring first to FIGS. 2-6, 10, 11, 13, and 41-43, the upshift state of the front shift unit 150 is illustrated and the upshifting operation is now described. When a rider is riding the bicycle 100 in the small chain ring operational state, as depicted in FIG. 41, with the chain 138 on and engaged with the small chain ring 154, the rider may shift the bicycle using the shifter 128. The rider may press a button on the shifter 128 to execute a gear shift or a shift change that results in the chain 138 shifting from the small chain ring 154 to the big chain ring 152. This operation is defined herein as an upshift or an upshifting operation. Actuating the shifter 128 results in a wireless signal being sent by a radio transmitter or transceiver of the shifter to the front shift unit 150. More specifically, the wireless signal may be received by a radio receiver or transceiver on the PCB of the control unit 184. The wireless signal may be processed by the microprocessor of the PCB and then a signal and power is transmitted to the gearmotor unit 200.

The output portion 214 and hub 216 are driven by the gearmotor unit 200 to rotate counterclockwise as depicted in and to the position shown in FIG. 13. Rotation of the hub 216 in the counterclockwise direction moves the first link 220a down and the second link 220b up in FIG. 13 or, in other words, closer to the rotation axis R. This movement of the first link 220a causes the upshift driver 340 to rotate in a counterclockwise direction to the position shown in FIG. 13. This movement of the second link 220b causes the second downshift driver 420 to rotate in a clockwise direction to the position shown in FIG. 13.

As the upshift driver 340 rotates counterclockwise to the position shown in FIGS. 13 and 38, the torque protrusions 346 of the upshift driver engage the torque protrusions 366 of the upshift actuator 360 and rotate the upshift actuator in the counterclockwise direction in the figure. During the upshifting operation, unlike in the downshifting operation as described below, the upshift driver 340 directly drives rotation of the upshift actuator 360 without assistance or involvement of the upshift spring 480. The upshift actuator 360 is then rotated to the position shown in FIGS. 13 and 38. In the position shown, the actuator surface 372 on the actuator arm 370 of the upshift actuator 360 is clear and spaced from, and thus does not contact, the body 270 of the upshift element 210. The clearance between the actuator surface 372 on the actuator arm 370 and the body 270 of the upshift element 210 is sufficient to allow the upshift element to rotate in the counterclockwise direction toward the surface 226 of the big chain ring 152. The biasing force applied by the torsion spring 466 against the body 270 of the upshift element 210 drives rotation of the upshift element about the axis of the first cam shaft 460.

Figure 47:
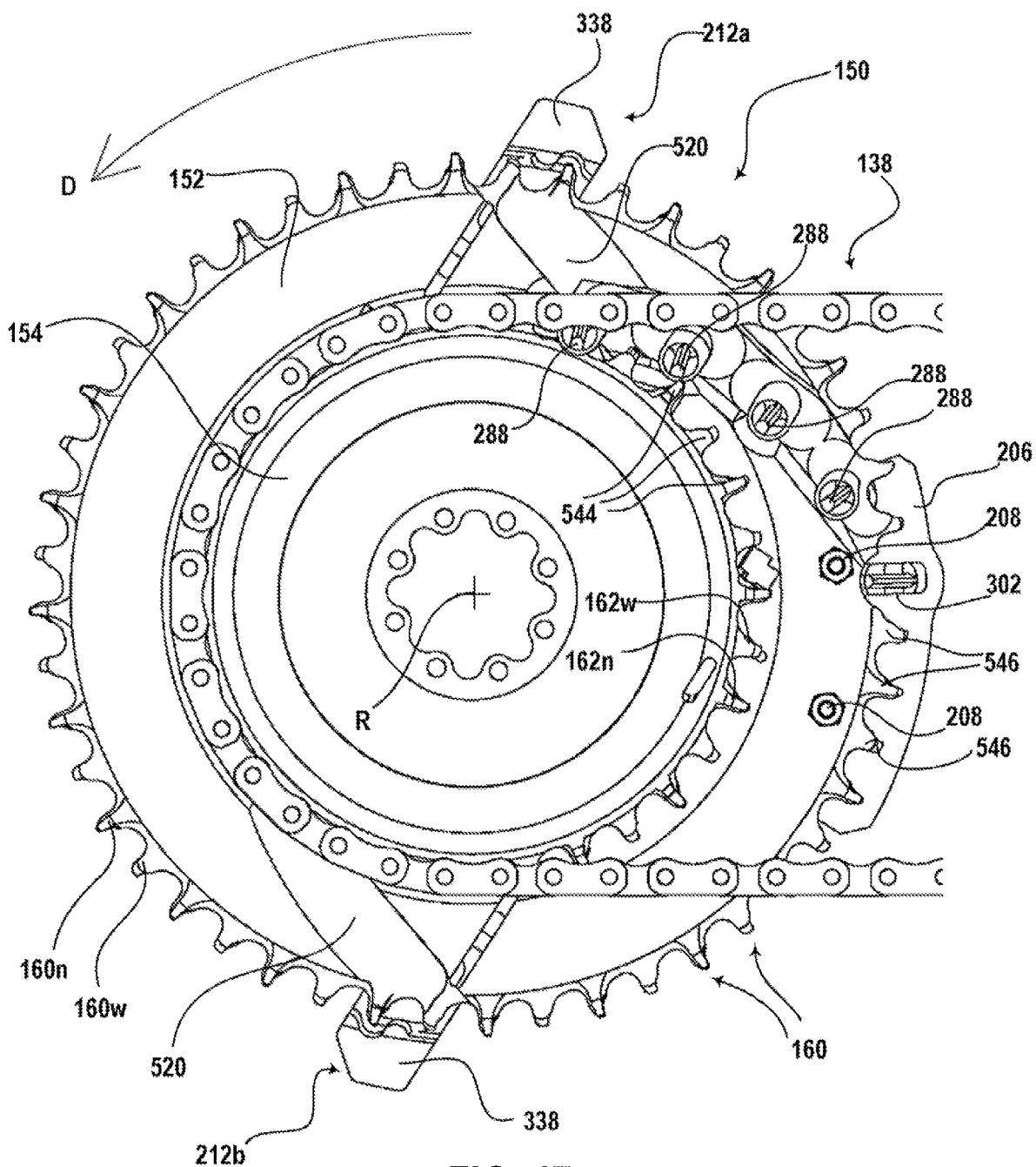
FIGS. 47-49 show the front shift unit and chain of FIG. 41 but with the chain guiding pegs of the upshift element sequentially further engaged with the chain and the chain shifting from the small chain ring of the chain ring component.

However, the upshift element 210 is only free to fully rotate into the position shown in FIGS. 13 and 38 when the chain 138, which is on the small chain ring 154 as depicted in FIG. 41, is not blocking any of the holes 264a-264d in the big chain ring 152 and the hole 264e in the guard rail 206. The drivetrain 124 is operated in the direction of the arrow D, which rotates the gear shift unit 150 about the axis R, as shown in FIGS. 2 and 47. The holes 264a-264e may be partially blocked by the chain 138 for at least a fraction of one drivetrain rotation. As shown in FIG. 41, the holes 264a-264e are clear of the chain 138 when the guard rail 206 and the upshift element 210 are positioned on a rear end or back end of the front shift unit 150 and between upper (forward moving direction) and lower (rearward return direction) segments of the chain. As soon as the holes 264a-264e are clear of the chain 138, the torsion spring 466 biases the upshift element 210 to the position shown in FIGS. 13 and 38 adjacent the surface 226 of the big chain ring 152.

As the upshift element 210 rotates further in the counterclockwise direction toward the surface 226 of the big chain ring 152, the chain guiding pegs 280 and the chain upshifting peg 282, each of which is carried on the upshifting element 210, move through the corresponding holes 264a-264e toward a plane S defined by the sprocket teeth 162 of the small chain ring 154. The upshift element 210 rotates in the counterclockwise direction until the contact surfaces 276 in the plane C on the body 270 abut or contact the surface 226 of the big chain ring 152. The fully rotated upshift state of the upshift element 210 is shown in FIGS. 13 and 38.

As described above, the upshift driver 340 and the first downshift driver 380 are both fixed, via the respective set screws 478 and 486, on and rotate in concert with the first cam shaft 460. Thus, rotation of the upshift driver 340 in the counterclockwise direction causes rotation of the first cam shaft 460, which in turn rotates the first downshift driver 380 in the same direction. This direction is counterclockwise in FIGS. 13 and 38 but is viewed as the clockwise direction in FIG. 39 because the cross-section through the first downshifting components in this figure is viewed from the opposite direction comparted to components shown in cross-section in FIGS. 13 and 38. As the first downshift driver 380 rotates in the clockwise direction in FIG. 39, the torque protrusions 386 on the first downshift driver engage the torque protrusions 406 on the first downshift cam 400, which then rotates the first downshift cam in the clockwise direction to the position shown in FIG. 39.

In this position, the first downshift cam 400 does not contact the first downshift element 212a. In the position shown, the cam surface 412 on the cam arm 410 of the first downshift cam 400 is clear and spaced from, and thus does not contact the notch 330 on the cam surface 328 of the body 320 of the first downshift element 212a. The clearance between the cam surface 412 on the cam arm 410 of the first downshift cam 400 and the cam surface 328 on the body 320 of the first downshift element 212a is sufficient to allow the first downshift element to rotate in the counterclockwise direction about the fulcrum axis P in FIG. 39. The first downshift element 212a is rotated by the biasing force of the first downshifter spring 500a. The first downshifter spring 500a biases the first downshift element 212a in the counterclockwise direction in FIG. 39 and thus moves the contact face 338 on the head 334 of the first downshift element 212a away from a plane B defined by the sprocket teeth 160 of the big chain ring 152. In this upshifting state, as shown in FIG. 39, the head 334 on the first downshift element 212a does not overlap the big chain ring 152, i.e., does not intersect the plane B. Again, during the upshifting operation, unlike in the downshifting operation as described below, the first downshift driver 380 directly drives rotation of the first downshift cam 400 without assistance or involvement of the first downshift spring 490.

Referring to FIGS. 2-6, 10, 11, 13, 40, and 41, movements of the second downshift element 212b and components for an upshifting operation and the upshift state are similar to those of the first downshift element 212a. As noted above, the output portion 214 and hub 216 are driven by the gearmotor unit 200 to rotate counterclockwise as depicted in and to the position shown in FIG. 13. Rotation of the hub 216 in the counterclockwise direction moves the second link 220b up in FIG. 13 or, in other words, closer to the rotation axis R. This movement of the second link 220b causes the second downshift driver 420 to rotate in a clockwise direction to the position shown in FIG. 13. This direction is clockwise in both of FIGS. 13 and 40. As the second downshift driver 420 rotates in the clockwise direction in FIG. 40, the torque protrusions 426 on the second downshift driver engage the torque protrusions 446 on the second downshift cam 440, which then rotates the second downshift cam in the clockwise direction to the position shown in FIG. 40.

In this position, the second downshift cam 440 does not contact the second downshift element 212b. In the position shown, the cam surface 452 on the cam arm 450 of the second downshift cam 440 is clear and spaced from, and thus does not contact the notch 330 on the cam surface 328 of the body 320 of the second downshift element 212b. The clearance between the cam surface 452 on the cam arm 450 of the second downshift cam 440 and the cam surface 328 on the body 320 of the second downshift element 212b is again sufficient to allow the second downshift element to rotate in the counterclockwise direction about the fulcrum axis P in FIG. 40. The second downshift element 212b is rotated by the biasing force of the second downshifter spring 500b. The second downshifter spring 500b biases the second downshift element 212b in the counterclockwise direction in FIG. 40 and thus moves the contact face 338 on the head 334 of the second downshift element 212b away from the plane B of the big chain ring 152. In this upshifting state, as shown in FIG. 40, the head 334 on the second downshift element 212b also does not overlap or intersect the plane B of the big chain ring 152. Again, during the upshifting operation, unlike in the downshifting operation as described below, the second downshift driver 420 directly drives rotation of the second downshift cam 440 without assistance or involvement of the second downshift spring 512.

In each of FIGS. 2-6, 10, 11, 13, 38-43, the front shifting system and the front shift unit 150 is depicted in the upshift state, as described above. However, the upshifting operation has not yet taken place. The angled contact surfaces 338 of the first and second downshift elements 212a and 212b are biased outward away from the plane B of the big chain ring 152. Thus, the downshift elements 212a and 212b are positioned so as not to interfere with the chain 138 as the drivetrain 124 is operated by a rider and as the chain upshifts. Likewise, the chain guiding pegs and the chain upshifting peg protrude through the holes 264a-264e in the big chain ring 152 and are positioned relatively close to the plane S of the small chain ring 154 and are ready to execute an upshift.

After the rider has actuated the shifter 128 to execute an upshift or upshifting operation, as the rider continues to pedal, the chain 138 is released from the small chain ring 154 and upshifts from the small chain ring 154 to the big chain ring 152, as shown sequentially in FIGS. 41 and 47-52. Referring to FIG. 41, the chain 138 is carried on the small chain ring 154 and the rider is pedaling the drivetrain 124, and the small chain ring, in the direction of the arrow D. The chain guiding pegs 280 and chain upshifting peg 282 are approaching from under, but have not yet reached, the chain 138. Referring to FIG. 47, a first or leading chain guiding peg 280, which is protruding through the hole 264a of the big chain ring 152, encounters the chain 138 and begins to engage the chain.

Figure 53:
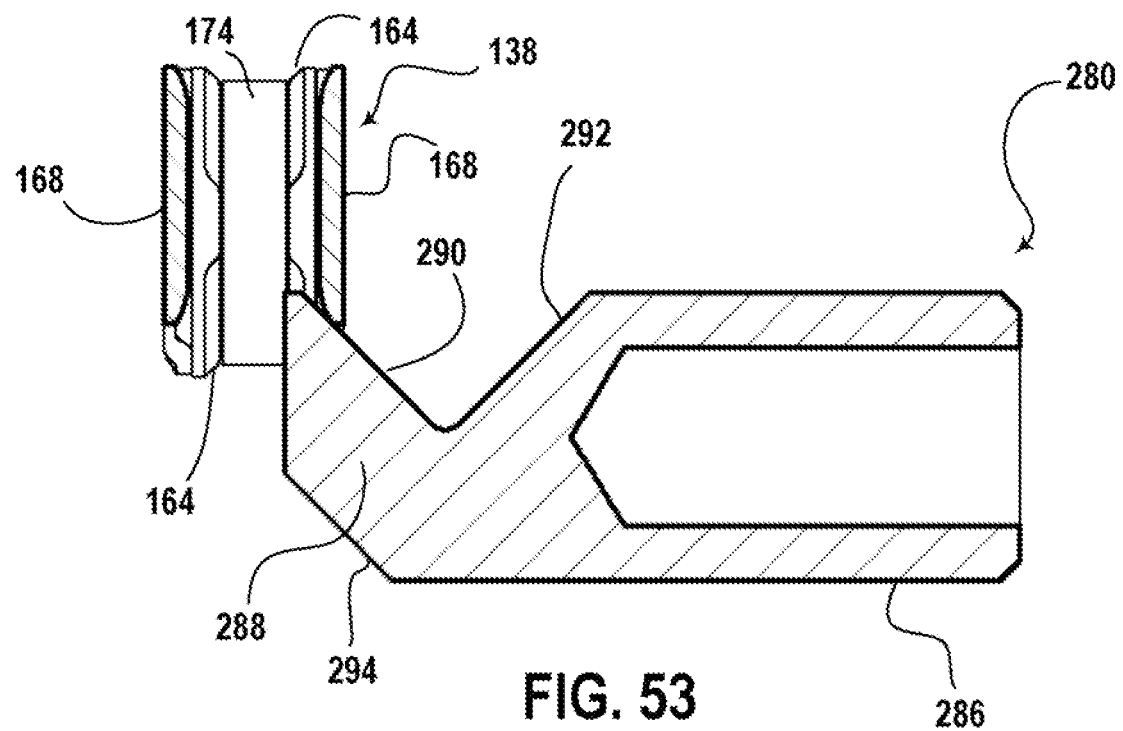
FIG. 53 shows a cross-section taken along line 53-53 of the leading chain guiding peg in FIG. 47 beginning to engage the chain.

FIGS. 7-9 depict various views of the chain 138 and FIG. 53 depicts a cross-section of the chain and the lead chain guiding peg 280 as the hook 288 engages the chain. The chain 138 and the sprocket teeth 162 on the small chain ring 154 are timed or synced such that the tip of the hook 288 on the chain guiding peg 280 rises into the tooth space 170 between a pair of the outer plates 168 of a chain link. As the rider continues to pedal and the front shift unit 150 continues to rotate in the arrow D direction, the chain link of the chain 138 is held by the hook 288 of the chain guiding peg 280 in a position that is further away in a radial direction from the rotation axis R of the front shift unit 150 compared to the position of the links of the chain forward of the chain guiding peg 280 and engaged with the small chain ring 154.

Figure 54:
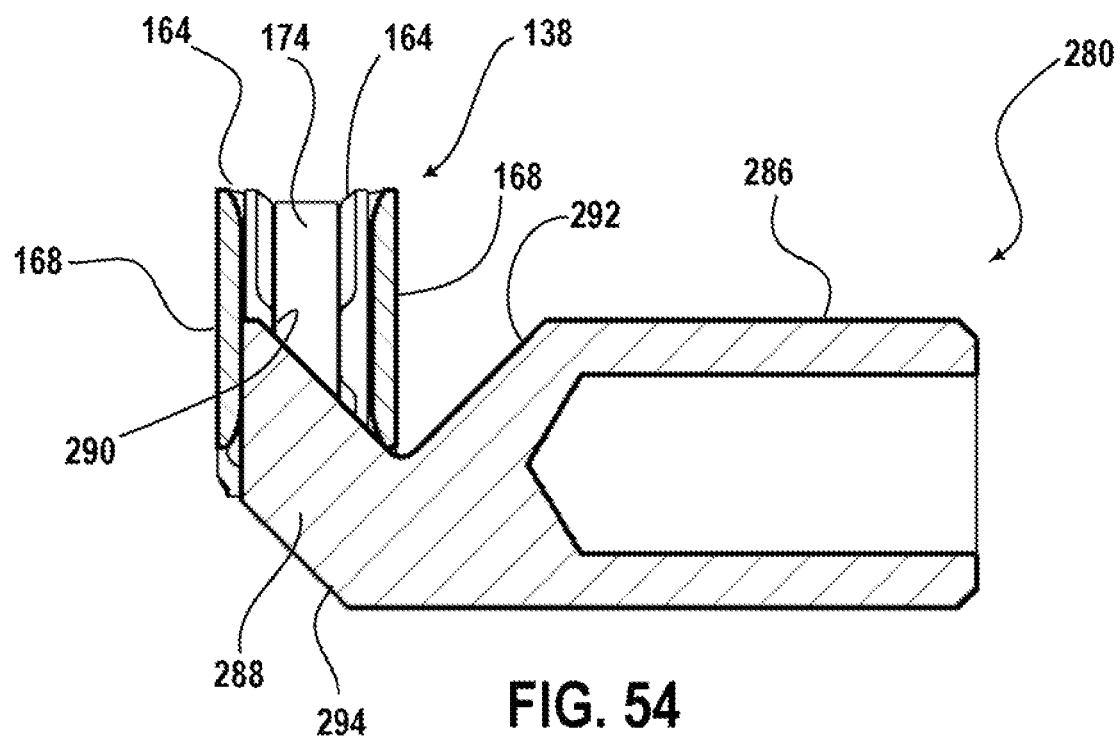
FIG. 54 shows the leading chain guiding peg of FIG. 53 but fully engaging the chain.

The outer plates 168 of the link on the hook 288 slide down from the tip of the hook along the angled top surface 290 (or the hook drives up into the tooth space 170) from the position shown in FIG. 53 to the position shown in FIG. 54. Thus, the chain 138 moves a relatively small distance to the right or the outboard direction away from the plane C of the small chain ring 154 toward the plane B of the big chain ring 152.

Figure 48:
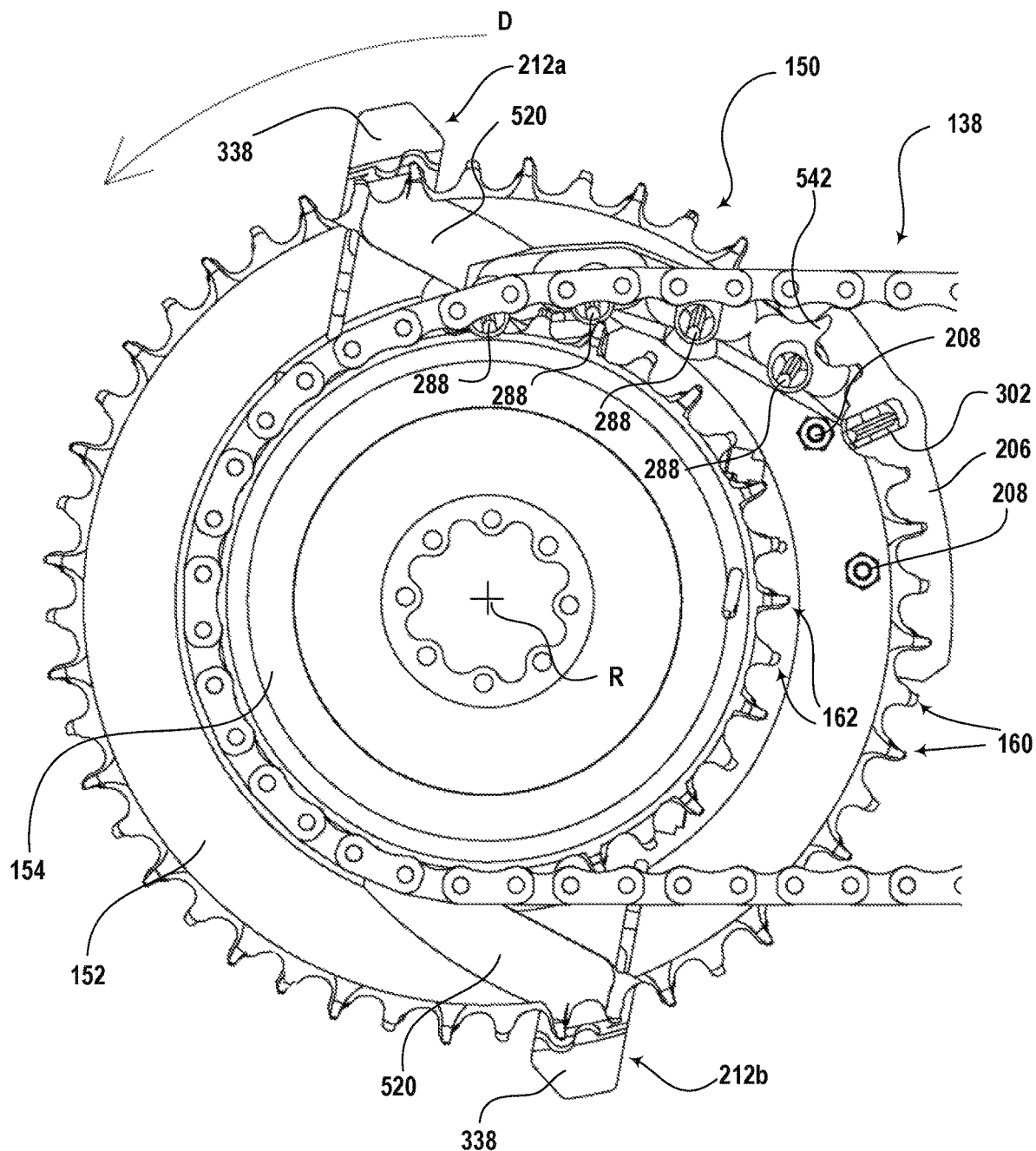
Figure 49:
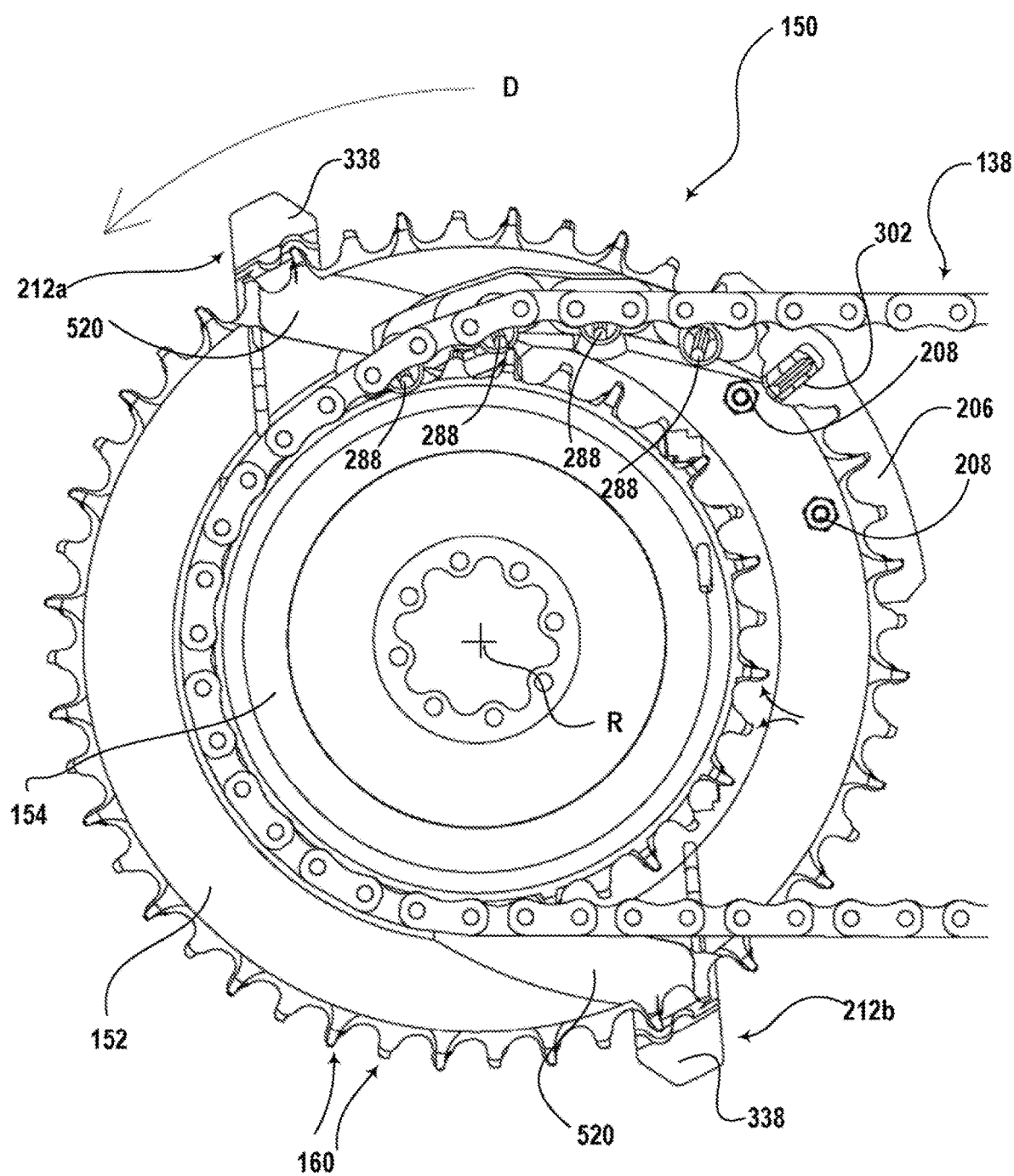
Figure 50:
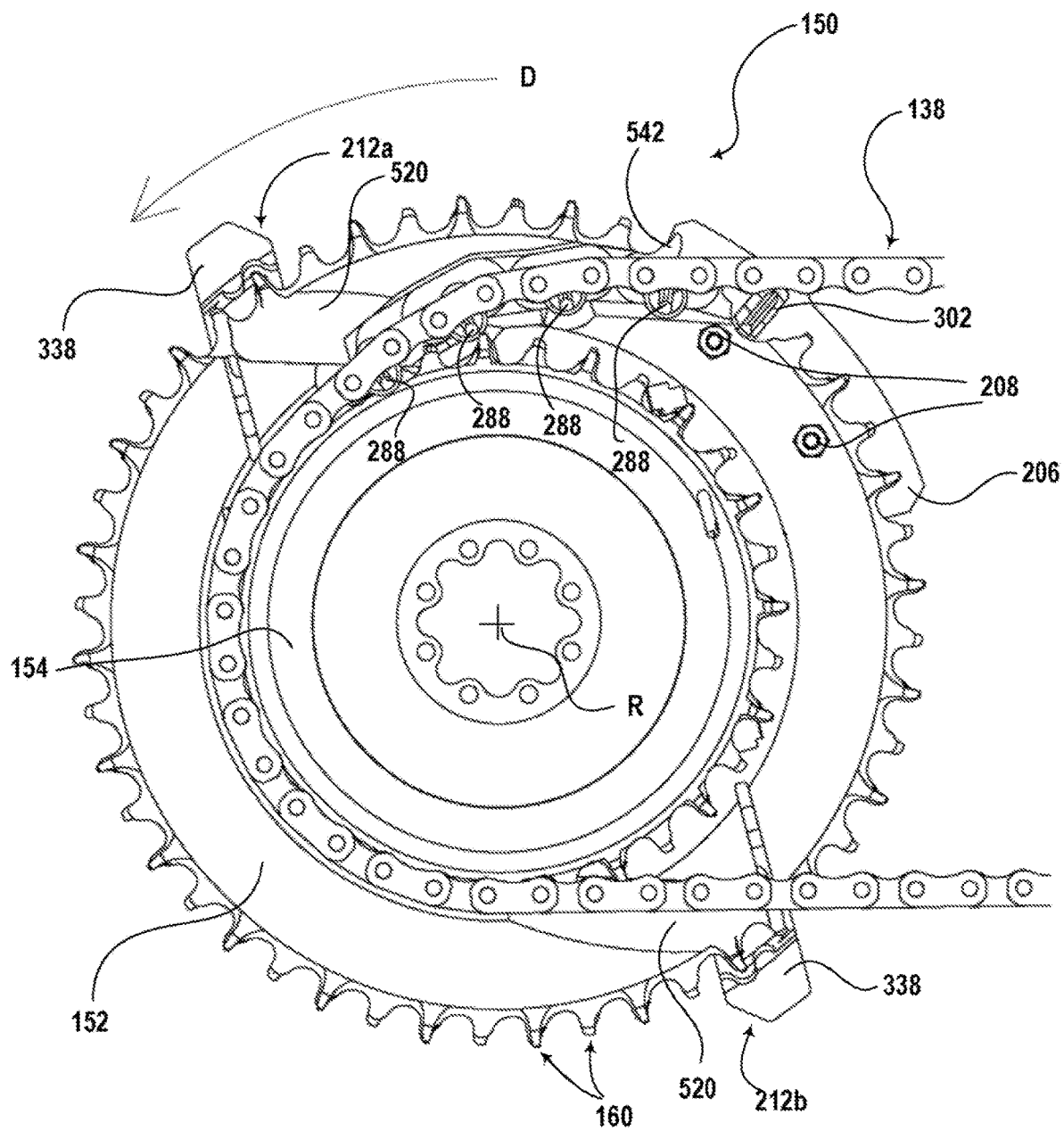
FIG. 50 shows the front shift unit and chain of FIG. 49 but with the chain upshifting peg of the upshift element engaging the chain and the chain shifted further from the small chain ring.

FIGS. 48-50 show the subsequent sequential engagement of the remainder of the chain guiding pegs 280 with the chain 138 as the rider continues to pedal. As noted above, the chain guiding pegs 280 and the chain upshifting peg 282 are positioned gradually further outward in a radial direction relative to the rotation axis R of the front shift unit 150. Likewise, each of the teeth 288 and 302 of the chain guiding pegs 280 and chain upshifting peg 282 is positioned axially further from the plane C of the small chain ring 154. As shown in FIG. 48, the next subsequent chain guiding peg 280, which protrudes through the hole 264*b* in the big chain ring 154, enters the tooth space 170 between and engages the outer plates 168 of a subsequent or trailing link of the chain 138. As the rider continues to pedal, the chain link of the chain 138 is held by the next subsequent hook 288 in a position that is further away in a radial direction from the rotation axis R compared to the position of the links of the chain engaged with the leading chain guiding element 280. Also, the tip of the next subsequent hook 288 enters the tooth space 170, as in FIG. 53. The outer plates 168 of the link on the hook 288 again slide down or move relative to the tip of the hook along the angled top surface 290 from the position shown in FIG. 53 to the position shown in FIG. 54. Thus, the chain 138 again moves a relatively small distance to the right or the outboard direction further away from the plane C of the small chain ring 154 toward the plane B of the big chain ring 152 and relative to the position of the chain on the leading chain guiding peg 280.

Referring to FIGS. 49 and 50, each of the next two subsequent chain guiding pegs 280, which protrude through the holes 264*c* and 264*d*, will function in the same manner as the leading chain guiding peg 280 and the next subsequent chain guiding peg. Thus, the chain 138 will be guided further outward in a radial direction away from the rotation axis R by the sequence of chain guiding pegs 280 because the teeth 288 are positioned sequentially further from the axis. The chain 138 will also be guided further outboard toward the plane B of the big chain ring 152 by the sequence of teeth 288 on the chain guiding pegs 280 because the teeth are positioned sequentially closer to the plane B.

Figure 51:
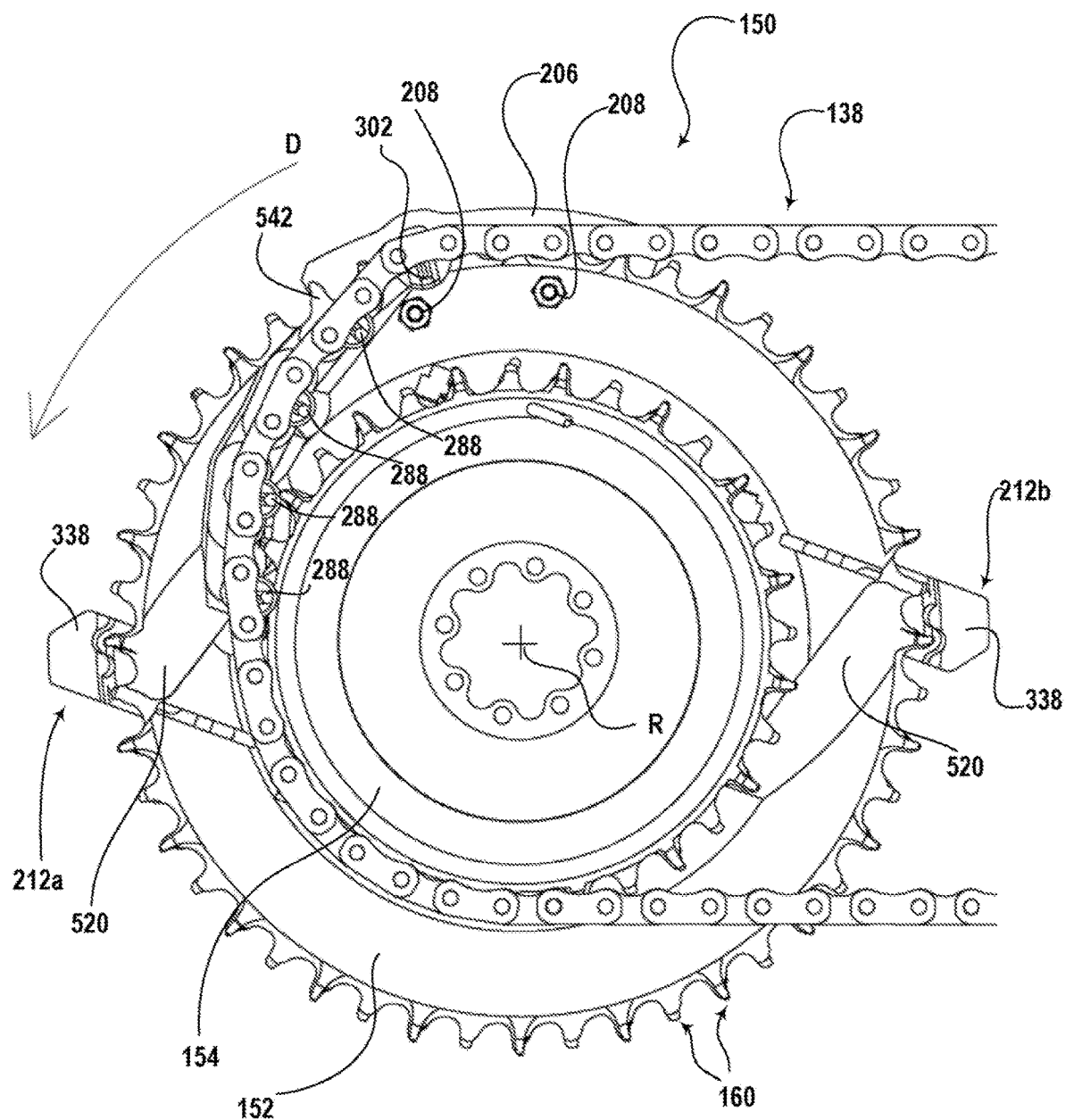
FIG. 51 shows the front shift unit and chain of FIG. 50 but with the chain beginning to engage the big chain ring.
Figure 52:
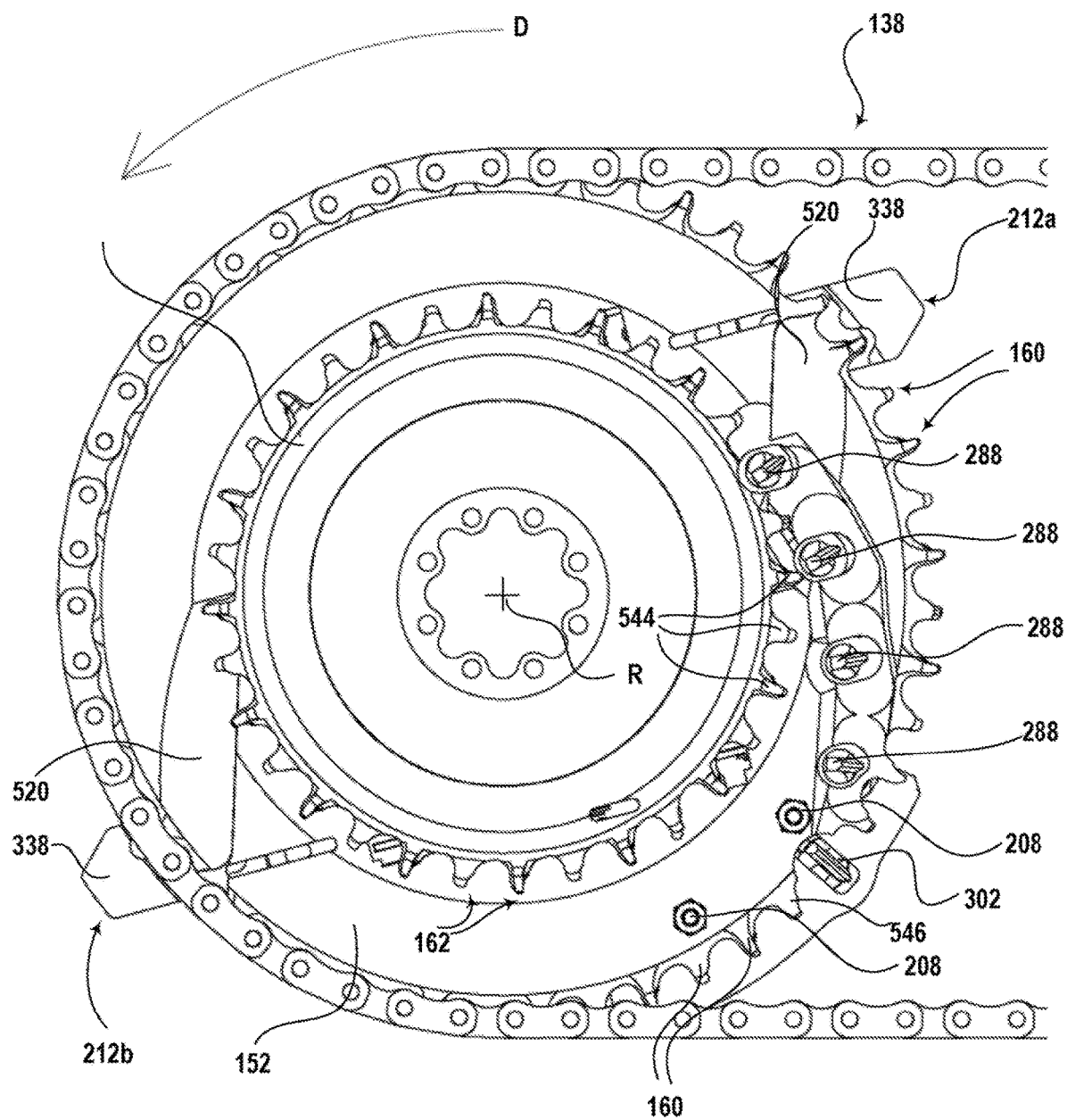
FIG. 52 shows the front shift unit and chain of FIG. 51 but with the chain shifted completely to the big chain ring.
Figure 55:
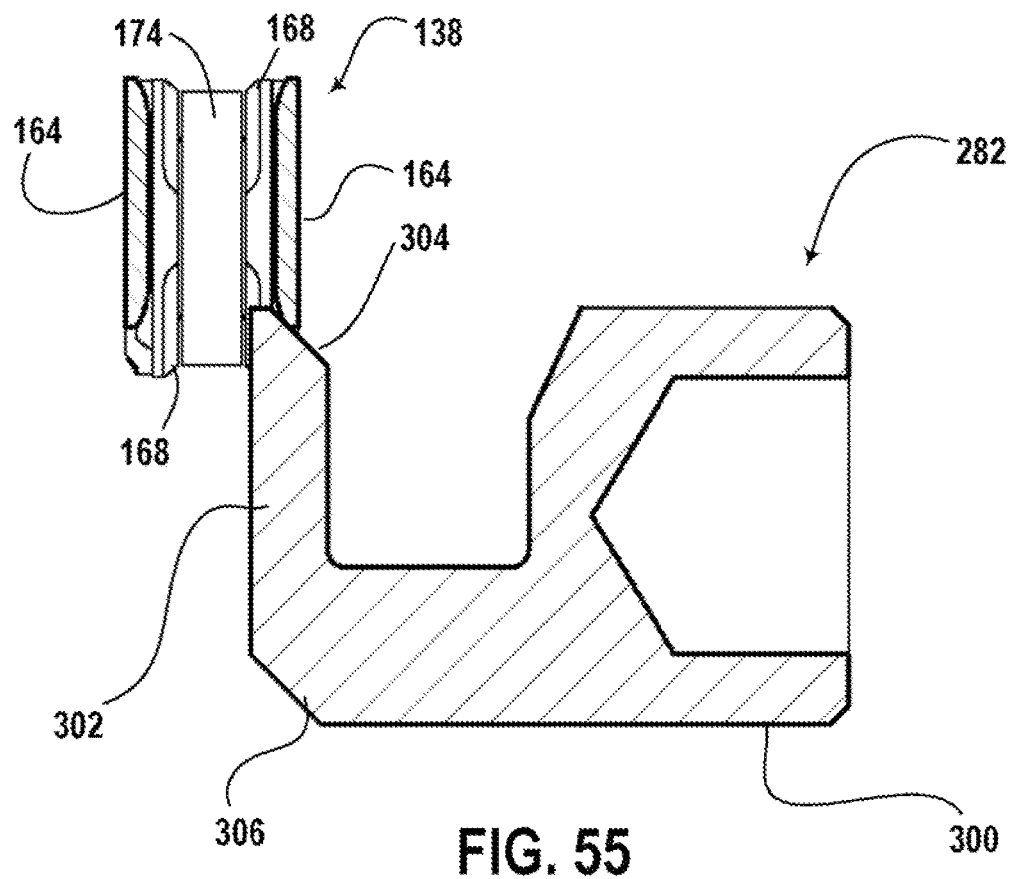
FIG. 55 shows a cross-section taken along line 55-55 of the chain upshifting peg in FIG. 50 beginning to engage the chain.
Figure 56:
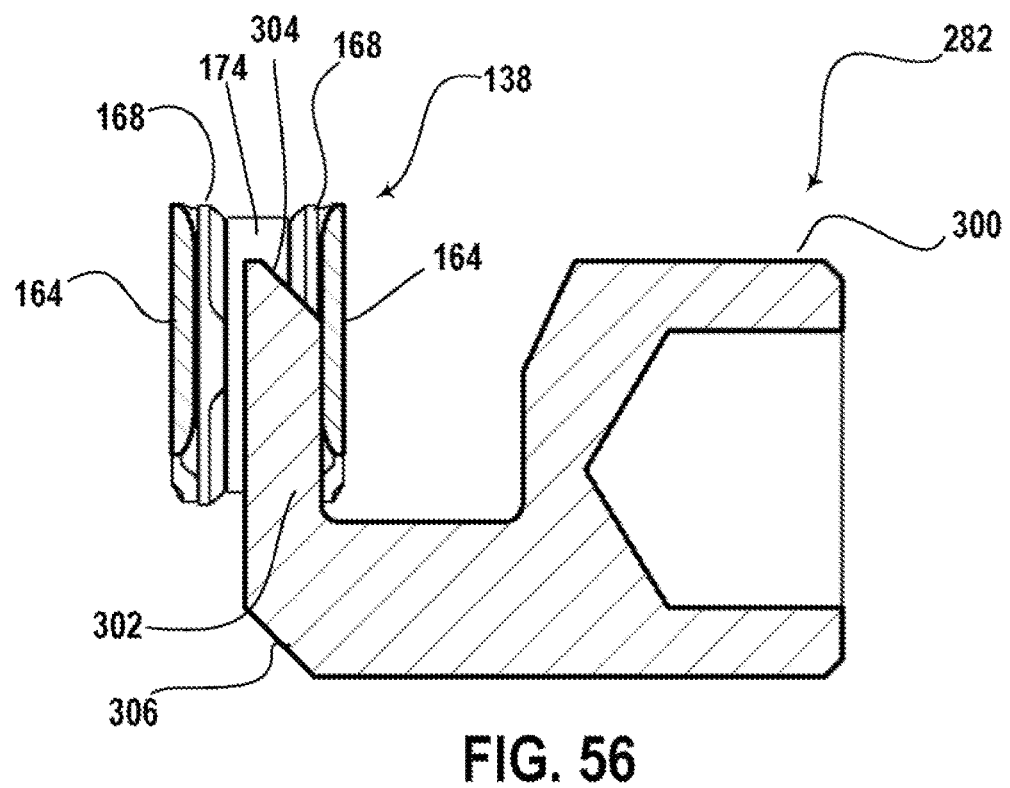
FIG. 56 shows the chain upshifting peg of FIG. 55 but fully engaging the chain.

Referring to FIG. 51, the chain upshifting peg 282 then subsequently engages a further trailing link of the chain 138. Referring to FIG. 55, a tip of the hook 302 of the chain upshifting peg 282 is positioned in the tooth space 170 between a pair of outer plates 168 of the link. As the rider continues to pedal, the link of the chain 138 is held by chain upshifting peg in a position that is again further outward in a radial direction from the rotation axis R compared to the preceding link on the preceding adjacent chain guiding peg 280. The link of the chain 138 also slides down along the chamfered top surface 304 of the hook 302 from the position shown in FIG. 55 to the position shown in FIG. 56. This moves the link of the chain 138 into alignment with plane B of the big chain ring 152. Subsequent links of the chain 138 will then engage with the sprocket teeth 160 on the big chain ring 152. As the rider continues to pedal and the front shift unit 150 continues to rotate about the rotation axis R, the chain will become fully engaged with the big chain ring 152, as shown in FIGS. 2 and 52.

As noted above, the sprocket teeth 160 on the big chain ring 152 can include alternating narrow teeth 160*n* and wide teeth 160*w*, which can respectively engage the narrow tooth spaces 166 between the inner plates 164 (i.e., narrow links) and the wide tooth spaces 170 between the outer links 168 (i.e., wide links) of the chain. The small chain ring 154 can also include such alternating narrow teeth 162*n* and wide teeth 162*w*. In this example, the chain guiding pegs 280 and chain upshifting peg 282 are timed or synced and spaced to engage the wide chain links and the teeth 288 and 302 are sized to engage the wide tooth spaces 170. However, the chain guiding pegs and chain upshifting peg, and the respective teeth, can be sized and spaced to engage alternating wide and narrow links and tooth spaces of the chain or to engage only the narrow links and tooth spaces of the chain.

The guard 206 may be configured to have a specific height to protrude a desired radial distance outward relative to the position of the sprocket teeth 160. The guard rail 206 may also be configured to have a specific length to cover a desired degree of arc of the big chain ring 152. Likewise, the guard rail 206 can be placed on the big chain ring 152 relative to the chain upshifting peg 282 and spaced a desired distance to the outboard side of the big chain ring in order to limit outboard travel of the chain 138 as it upshifts onto the big chain ring. In other words, the guard rail 206 can be sized, shaped, and positioned as necessary to allow the chain 138 to engage the sprocket teeth 160 while preventing the chain from derailing to the outboard side of big chain ring during the upshifting operation. As the rider continues to pedal with chain 138 engaged with the big chain ring 152, as shown in FIGS. 2 and 52, the chain upshifting peg 282 and hook 302 can remain aligned with the plane B of the big chain ring 152. Thus, the hook 302 may effectively act as an axial guide replacing or formed as a sprocket tooth of big chain ring 152. The front shifting system and the components of the front shift unit 150 remain in the upshift state in this example until the rider requests or executes a downshift.

Referring next to FIGS. 12 and 44-46, the downshift state of the front shift unit 150 is illustrated and the downshifting operation is now described. When the rider is riding the bicycle 100 and the chain 138 is engaged with the big chain ring 152 as in FIGS. 2 and 52, the rider may wish to change gears. The gear change may require a downshift operation of the front shift unit 150 that shifts the chain 138 from the big chain ring 152 to the small chain ring 154. The rider may press a button or operate an actuator of the shifter 128 on the handlebar assembly 114. A wireless signal is then sent to the front shift unit 150 and is again received by the radio or wireless receiver or transceiver on the PCB of the control unit 184. The processor or microprocessor of the control unit 184 then processes the signal and an appropriate signal and power is sent to the gearmotor unit 200.

Figure 46:
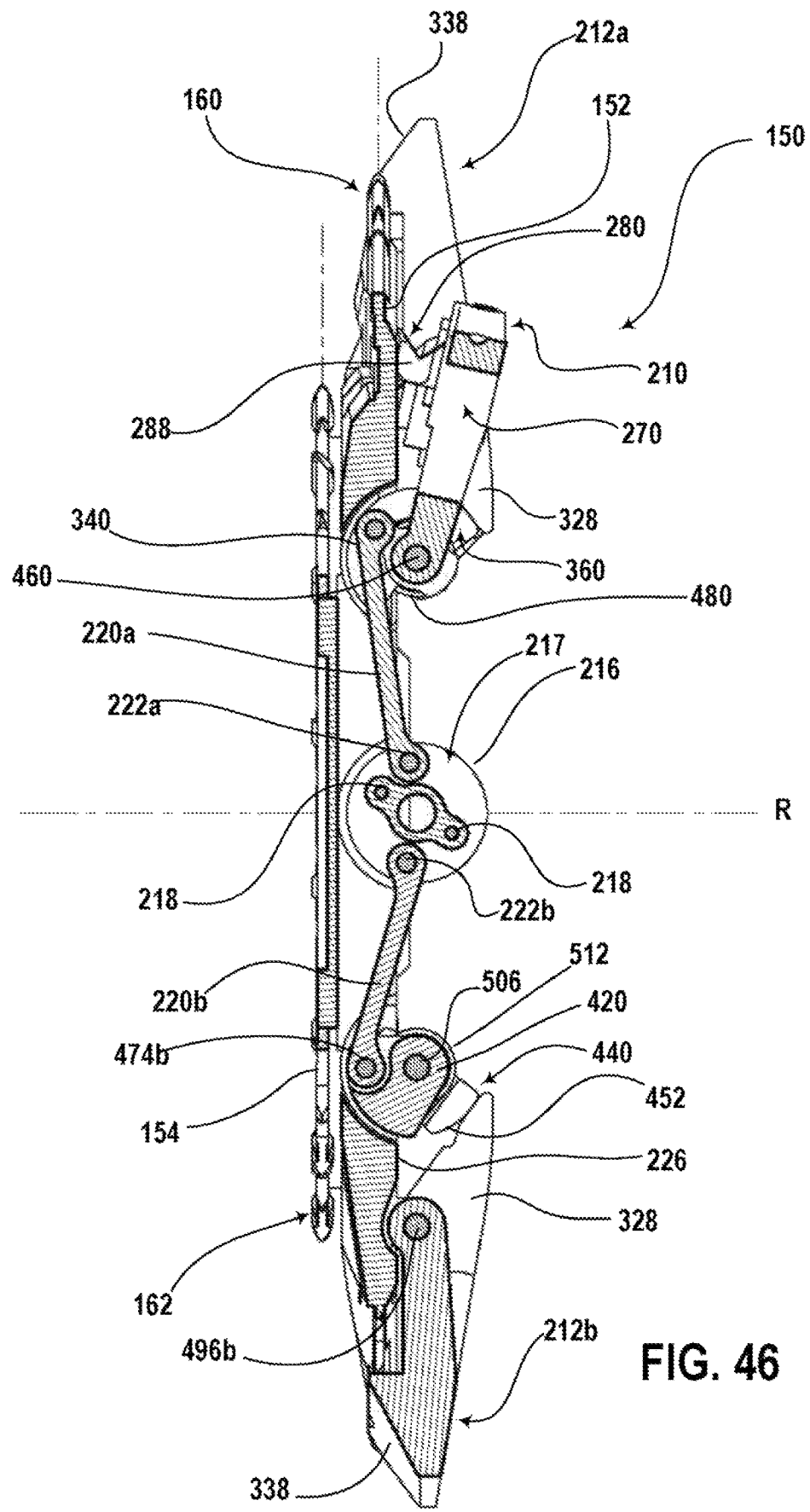
FIG. 46 shows the cross-section of the front shift unit of FIG. 13 but with the shift mechanism components in the downshift state.

During the downshift operation, the gearmotor unit 200 is operated to drive or rotate the output portion 214 in a clockwise direction referring to FIGS. 13 and 46. Operation of the gearmotor unit 200 and the output portion 214 in the clockwise direction causes the hub 216 to also rotate clockwise from the position shown in FIG. 13 to the position shown in FIG. 46. Rotation of the hub 216 in the clockwise direction drives movement of the first link 220*a* upward and the second link 220*b* downward to the positions shown in FIG. 46. Upward movement of the first link 220*a* rotates the upshift driver 340 in a clockwise direction.

Figure 57:
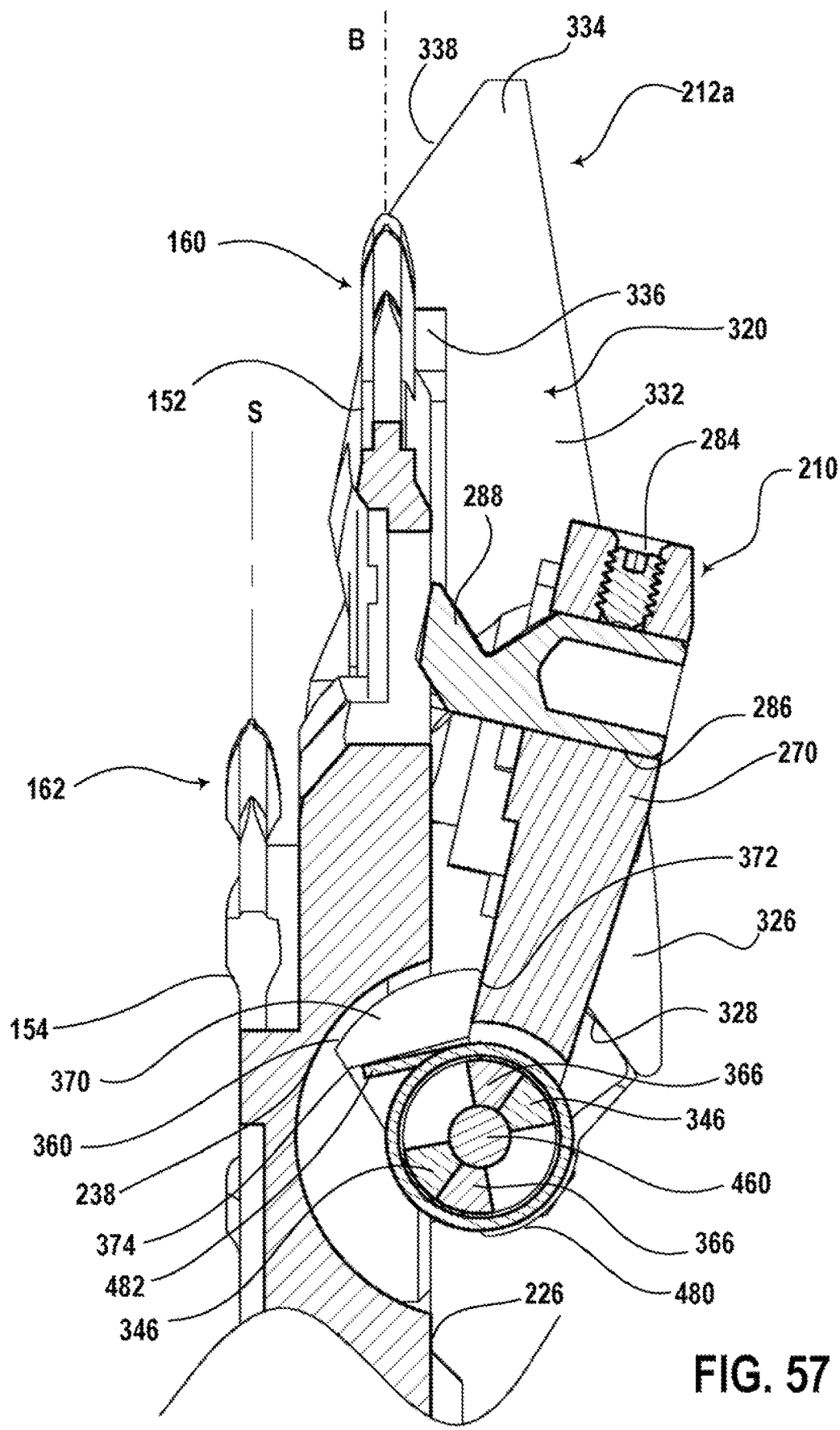
FIG. 57 shows the upshift element of FIG. 38 but in the downshift state, i.e., a neutral state for the upshift element.

Referring to FIGS. 38 and 57, as the upshift driver 340 rotates in the clockwise direction, the biasing force of the upshift spring 480 causes the upshift actuator 360 to also rotate in the clockwise direction in concert with the upshift driver 340. This rotation keeps the torque protrusions 366 of the upshift actuator 360 firmly biased against and in contact with the torque protrusions 346 of the upshift driver 340. As the upshift actuator 360 rotates in the clockwise direction, the actuator surface 372 of the upshift actuator 360 comes into contact and bears against the inboard side or face on the body 270 of the upshift element 210. This rotation of the upshift actuator 360 thus biases or rotates the upshift element 210 also in the clockwise direction away from the surface 226 of the big chain ring 152. Rotation of the upshift element 210 in the clockwise direction of FIGS. 38 and 57 will thus withdraw the chain guiding pegs 280 and chain upshifting peg 282, and their corresponding teeth 288 and 302, away from the plane S of the small chain ring 154 and thus from the holes 264a-264e.

It is possible that the rider may attempt to execute a downshift while the upshift element 210 is blocked from rotation in the clockwise direction away from the big chain ring 154. This may occur when the chain 138 is blocking rotation of the upshift element 210. For example, the chain 138 may block rotation of the upshift element 210 when the chain is on the big chain ring 152 as in FIG. 2 but is still engaged with the hook 302 of the chain upshifting peg 282 on the upshift element. When this occurs, the upshift element 210 and the upshift actuator 360 will remain stationary as the upshift driver 340 continues to rotate. As this occurs, the torque protrusions 346 of the upshift driver 340 will separate or move apart from the torque protrusions 366 of the upshift actuator 360. The upshift spring 480 will thus wind up and store energy. The upshift element 210 will eventually become free to rotate in the clockwise direction, such as when the crank assembly 132 rotates to a position where the hook 302 on the chain upshifting peg 282 becomes free of the chain 138. When the upshift element 210 is free to rotate, the upshift element and the upshift actuator 360 will rotate in the clockwise direction under the biasing force of the upshift spring 480 to the position shown in FIG. 57.

As the upshift element 210 rotates in the clockwise direction, the chain guiding pegs 280 and the chain upshifting peg 282, as noted above, move away from the plane S of the small chain ring 154 and clear the holes 264a-264e. When the upshift element 210 is in the state as shown in FIGS. 38 and 57, the direction or orientation of any force vector that might be transmitted through the first link 220a passes substantially along the lengthwise axis of the first link and through the rotation axis of the gearmotor unit, i.e., the center of rotation of the hub 216. In other words, if the upshift element 210 is subjected to an external force in the inboard or counterclockwise rotation direction (or even in the opposite direction), such as if the upshift element is struck by an object or is accidentally bumped by the rider, the force will not cause the hub 216 or the gearmotor unit 200 to be back driven or reverse rotated. This is because any such force vector is applied via the body 270 of the upshift element 210, through the upshift actuator 360 and upshift driver 340, and through the first link 220a and will this not tend to cause any rotation of the hub 216.

The set screw 314 along the lower edge of the body 270 on the upshift element 210, which may be threadably received through the body, may be rotated or adjusted to fine tune or adjust the position of the upshift element 210. The set screw 314 may be located on the body 270 of the upshift element 210 such that the actuator surface 372 on the upshift actuator contacts the free end of the set screw protruding from the body, instead of the upshift actuator directly contacting the upshift element 210. Alternatively, the free end of the set screw 314 may be positioned to contact the surface 226 of the big chain ring 152. In either case, the adjusted position of the set screw 314 can be used to determine the furthest inboard rotation position of the upshift element 210, which is biased toward the surface 226 of the big chain ring 152 by the torsion spring 466.

Figure 58:
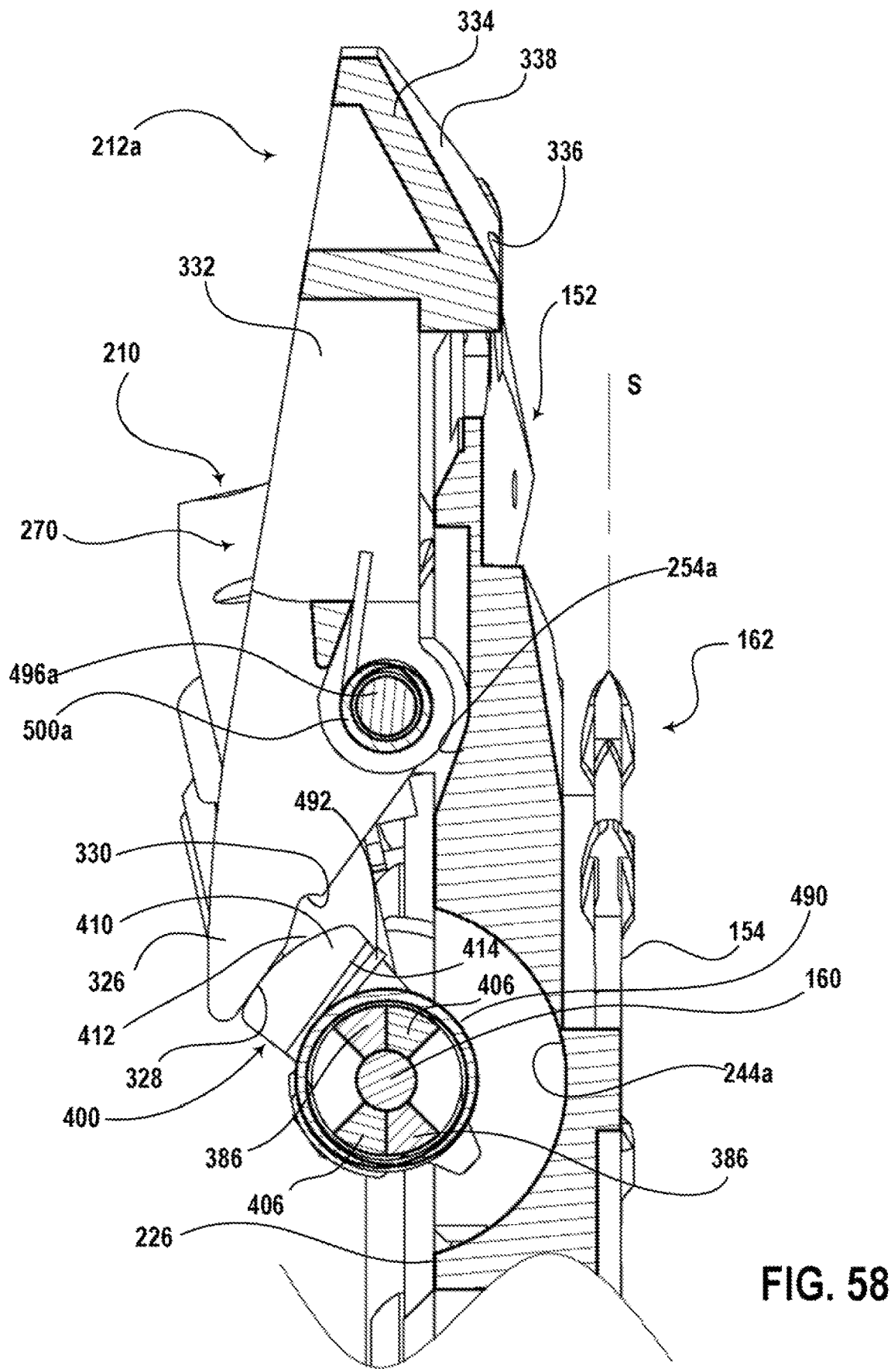
FIG. 58 shows the first downshift element in FIG. 39 but in the downshift state.

As described above, the upshift driver 340 and the first downshift driver 380 are both fixed to the first cam shaft 460 via the previously described set screws 478 and 486. Thus, rotation of the upshift driver 340 in the clockwise direction of FIGS. 38 and 57 also drives rotation of the first cam shaft 460, and thus the first downshift driver 380, in the same clockwise direction. Referring to FIGS. 39 and 58, the first downshift element 212a is shown from the opposite side compared to FIGS. 38 and 57. Thus, the aforementioned clockwise rotation of the first downshift driver 380 in FIGS. 38 and 57 is shown in reverse or counterclockwise in FIGS. 39 and 58. As the first downshift driver 380 rotates in the counterclockwise direction in FIGS. 39 and 58, the biasing force of the first downshift spring 490 drives the first downshift cam 400 to rotate in the counterclockwise direction in concert with the first downshift driver 380. The torque protrusions 406 of the first downshift cam 400 contact and are firmly biased against the torque protrusions 386 of the first downshift driver 380. As the first downshift cam 400 rotates in the counterclockwise direction in FIG. 58, the cam surface 412 on the cam arm 410 of the first downshift cam comes into contact with the cam surface 328 on the drive arm 326 of the first downshift element 212a. This rotates the first downshift element 212a in the clockwise direction in FIGS. 39 and 58 about the first downshift shaft 496a. The first downshift element 212a is rotated by this action from the position shown in FIG. 39 to the position shown in FIG. 58.

Similar to the circumstance described above for the upshift element 210, the first downshift element 212a may be unable to immediately rotate in the clockwise direction upon an attempted execution of a downshift. For example, the chain 138 will block movement of the first downshift element 212a if the first downshift element tries to move toward the plane B of the big chain ring 152 while the chain 138 is on the sprocket teeth 160 of the big chain ring. The head 334 on the body 320 of the first downshift element 212a will instead contact the side of the chain 138. If this occurs, the first downshift element 212a and the first downshift cam 400 will remain stationary as the first downshift driver 380 continues to rotate, being driven by rotation of the first cam shaft 460. The torque protrusions 386 on the first downshift driver 380 will rotate away and come out of contact with the torque protrusions 406 on the first downshift cam 400. As a result, the first downshift spring 490 will wind up and store energy. As the crank assembly 132 continues to rotate, the first downshift element 212a will eventually become free to rotate toward the plane B of the big chain ring 152. This occurs when the first downshift element 212a is positioned on the rear of the big chain ring 152 where the chain 138 is not engaged with the sprocket teeth 160 on the big chain ring. This position is shown in FIG. 52 where the first downshift element 212a is rising upward toward the chain 138 but is adjacent a rear portion of the big chain ring 152 that is not engaged with the chain.

When the first downshift element 212a is free to rotate, the first downshift cam 400 will rotate in the counterclockwise direction in FIGS. 39 and 58 under the biasing force of the first downshift spring 490. Rotation of the first downshift cam 400 will drive rotation of the first downshift element 212a in the clockwise direction of FIGS. 39 and 58 about the first downshift shaft 496a. As the first downshift element 212a rotates in the clockwise direction, the angled contact face 338 on the head 334 of the first downshift element moves toward the plane B of the big chain ring 152 until the head overlaps the plane and the sprocket teeth 160, as shown in FIGS. 46 and 58. In this state, first downshifter spring 500a biases the first downshift element 212a in the counterclockwise direction in FIG. 58 away from the plane B of the big chain ring 152. Thus, the first downshifter spring 500a biases the cam surface 328 on the drive arm 326 of the first downshift element 212a against the curved cam surface 412 of the first downshift cam 400, which holds the first downshift element 212a in the downshift state overlapping the plane B of the big chain ring 152.

If the first downshift element 212a experiences an external force that would otherwise move the first downshift element in the counterclockwise direction in FIG. 58, the first downshift element would remain stationary in this state. For example, as the first downshift element 212a rises from under the chain 138 in FIG. 52 into contact with the chain, the force of the chain, and the force of the first downshifter spring 500a, would tend to rotate the first downshift element about the first downshift shaft 496a in the counterclockwise direction, pushing the head 334 outboard away from the plane B. However, the first downshift element 212a in this downshift state is unable to move in the counterclockwise direction in FIG. 58 because the drive arm 326 on the body 320 of the first downshift element 212a is borne against and blocked by the cam surface 412 of the first downshift cam 400. In one example, the curvature of the cam surface 412 may be cylindrically shaped and concentric with the axis of the first cam shaft 460. Thus, any force vector exerted by the cam surface 328 on the drive arm 326 of the first downshift element 212a against the cam surface 412 of the first downshift cam 400 in the downshift state of FIG. 58 would pass through the axis of the first cam shaft 460. As a result, no amount of external force exerted by the chain 138 on the head 334 of the first downshift element 212a in this downshift state would tend to cause rotation of first downshift cam 400 about the first cam shaft 460. The force of the chain 38 thus will not cause the first downshift cam 400 or the first downshift element 212a to be back driven or reverse rotated away from the plane B of the big chain ring 152.

Figure 59:
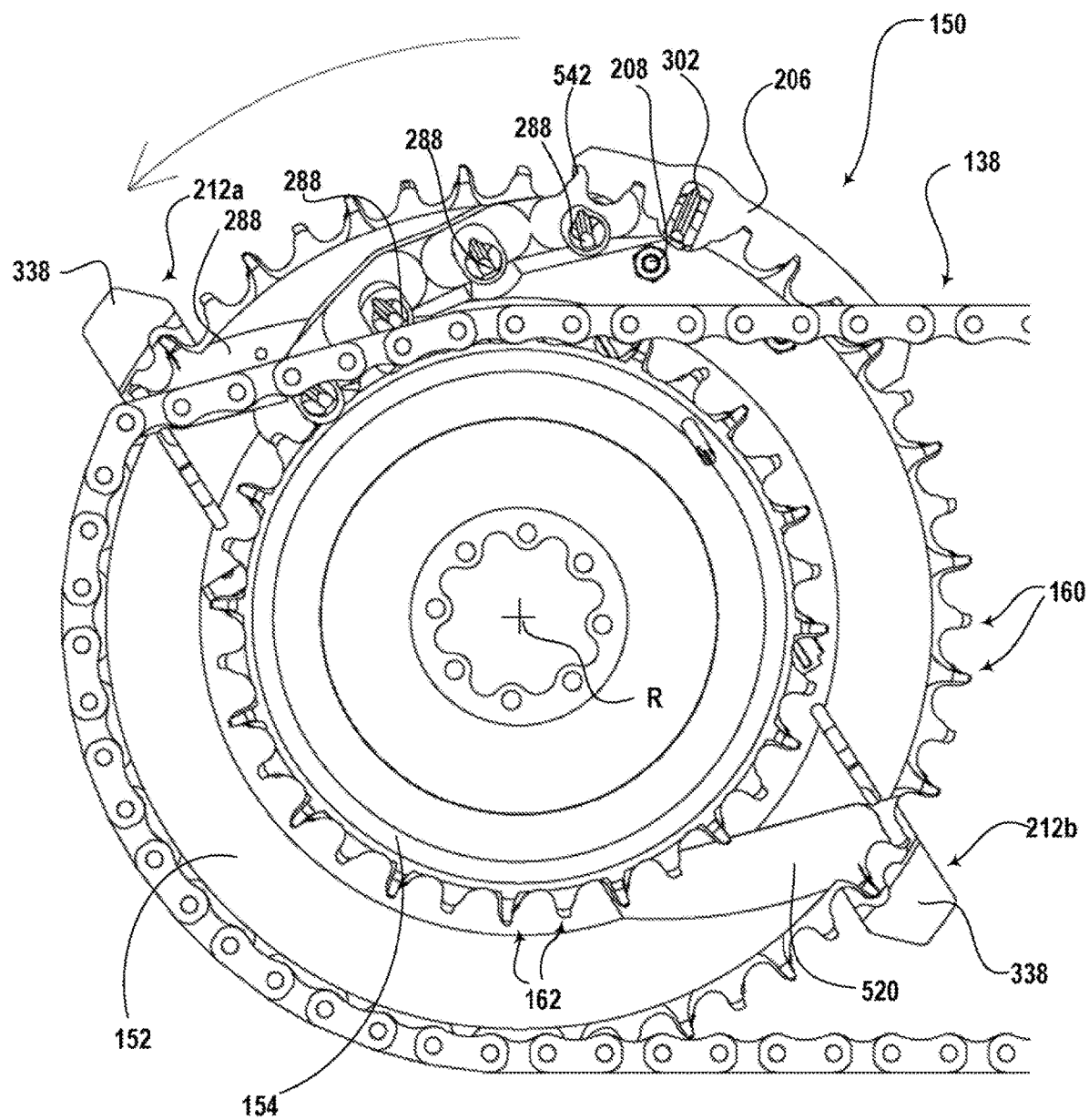
FIG. 59 shows the front shift unit and chain of FIG. 52 but with the chain beginning to shift from the big chain ring to the small chain ring.

At this point, the front shifting system is in the downshift state, but a downshift has not yet been described or completed. Referring to FIGS. 46, 52, 57, and 58, the angled contact face 338 on the head 334 of the first downshift element 212a is biased to overlap the plane B of the big chain ring 152. Likewise, the upshift element 210 including the chain guiding pegs 280 and the chain upshifting peg 282 are biased in a direction away from the plane S of the small chain ring 154. As the rider continues to pedal from the position of the front shift unit in FIG. 52, the chain 138 downshifts from the sprocket teeth 160 of the big chain ring 152 to the small chain ring 154 as shown in FIG. 59. More specifically, as the first downshift element 212a rises into contact with the chain 138, the angled contact face 338 on the first downshift element blocks the chain from engaging the sprocket teeth 160 on the big chain ring 152. Instead, the angled contact face 338 forces the chain 138 to redirect or deflect out of alignment with the plane B of the big chain ring in the inboard direction toward the plane S of the small chain ring 154. As the rider continues to pedal the front shift unit 150 in the rotation direction R, the chain 138 will continue to wrap around and engage the sprocket teeth 162 of the small chain ring 154 as depicted in FIGS. 41 and 47. After the downshift operation is complete, the front shifting system in this example remains in the downshift state until the rider requests or executes an upshift, as described above.

In one example, the outboard side surface 226 on the big chain ring 152 may include an elongate recess 520 associated with the position of each of the downshift elements, which includes the first and second downshift elements 212a and 212b in this example. These recesses 520 can extend from the outermost radius of the big chain ring 152 where the head 334 of each downshift element is positioned adjacent the sprocket teeth 160. The recesses 520 can extend in a gradual spiral direction inward toward the sprocket teeth 162 of the small chain ring 154. The recesses 520 can aid the chain 138, by providing sufficient clearance between the chain and the surface 226, when downshifting to the sprocket teeth 162 on the small chain ring 154, as depicted in FIG. 59 with respect to the first downshift element 212a.

In the disclosed example, the front shifting unit 150 has another, i.e., the second downshift element 212b as noted earlier, not just the one or first downshift element 212a, which is described above in detail. Referring again to FIGS. 12 and 44-46, the downshift state of the front shift unit 150 is illustrated. During the above described downshift operation, when the rider presses a button or operates an actuator of the shifter 128 on the handlebar assembly 114, a wireless signal is sent to the front shift unit 150. The wireless signal is again received by the radio or wireless receiver or transceiver on the PCB of the control unit 184. The processor or microprocessor of the control unit 184 then processes the signal and an appropriate signal and power is sent to the gearmotor unit 200. When the first downshift element 212a is actuated or moved to the downshift state, the second downshift element 212b is also moved or actuated to the downshift state Referring to the assembled front shift unit of FIGS. 10-12, the cross-section views of FIGS. 13 and 46, and the enlarged cross-section views of FIGS. 40 and 60, the movements of the second downshift element 212b and the corresponding components are now described during the downshift operation. During the downshift operation, the gearmotor unit 200 drives or rotates the output portion 214 and thus the hub 216 in the clockwise direction from the position shown in FIG. 13 to the position shown in FIG. 46. Rotation of the hub 216 in the clockwise direction drives movement of the second link 220b downward from the position shown in FIG. 13 to the position shown in FIG. 46. Downward movement of the second link 220b rotates the second downshift driver 420 in the counterclockwise direction from the position shown in FIG. 13 to the position shown in FIG. 46 about the second cam shaft 506.

Figure 60:
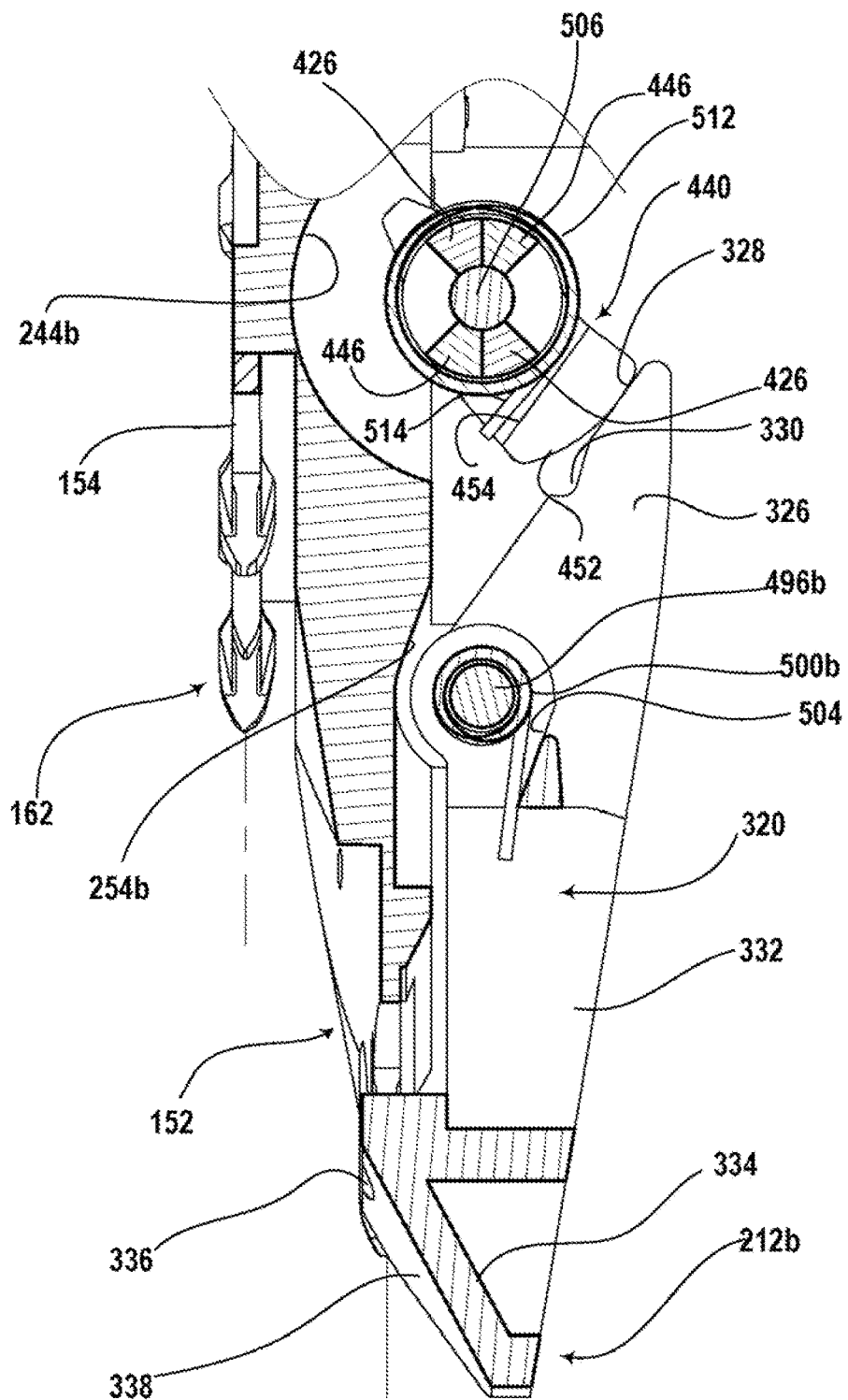
FIG. 60 shows the second downshift element in FIG. 40 but in the downshift state.

As the second downshift driver 420 rotates in the counterclockwise direction in FIGS. 40 and 60, the biasing force of the second downshift spring 512 drives the second downshift cam 440 to rotate in the counterclockwise direction in concert with the second downshift driver 420. The torque protrusions 446 of the second downshift cam 440 contact and are firmly biased against the torque protrusions 426 of the second downshift driver 420. As the second downshift cam 440 rotates in the counterclockwise direction in FIG. 60, the cam surface 452 on the cam arm 450 of the second downshift cam comes into contact with the cam surface 328 on the drive arm 326 of the second downshift element 212b. This rotates the second downshift element 212b in the clockwise direction in FIGS. 40 and 60 about the second downshift shaft 496b. The second downshift element 212b is rotated by this action from the position shown in FIG. 40 to the position shown in FIG. 60.

Similar to the circumstance described above for the first downshift element 212a, the second downshift element 212b may be unable to immediately rotate in the clockwise direction toward the plane B of the big chain ring 152 upon an attempted execution of a downshift. For example, the chain 138 will again block movement of the second downshift element 212b if the second downshift element tries to move toward the plane B of the big chain ring 152 while the chain 138 is on the sprocket teeth 160. The head 334 on the body 320 of the second downshift element 212b will instead contact the side of the chain 138. If this occurs, the second downshift element 212b and the second downshift cam 440 will remain stationary as the second downshift driver 420 continues to rotate, being driven by rotation of the hub 216 and the second link 220b. The torque protrusions 426 on the second downshift driver 420 will rotate away and come out of contact with the torque protrusions 446 on the second downshift cam 440. As a result, the second downshift spring 512 will wind up and store energy. As the crank assembly 132 continues to rotate, the second downshift element 212b will eventually become free to rotate toward the plane B of the big chain ring 152. Again, this occurs when the second downshift element 212b is positioned on the rear of the big chain ring 152 where the chain 138 is not engaged with the sprocket teeth 160 on the big chain ring. This position is not shown (though it would be similar to the position of the first downshift element 212a in FIG. 52) but would occur when the second downshift element 212b is rising upward toward the chain 138 but is adjacent a rear portion of the big chain ring 152 that is not engaged with the chain.

When the second downshift element 212b is free to rotate, the second downshift cam 440 will rotate in the counterclockwise direction in FIGS. 40 and 60 under the biasing force of the second downshift spring 512. Rotation of the second downshift cam 440 will drive rotation of the second downshift element 212b in the clockwise direction of FIGS. 40 and 60 about the second downshift shaft 496b. As the second downshift element 212b rotates in the clockwise direction, the angled contact face 338 on the head 334 of the second downshift element moves toward the plane B of the big chain ring 152 until the head overlaps the plane and the sprocket teeth 160, as shown in FIGS. 46 and 60. In this state, second downshifter spring 500b biases the second downshift element 212b in the counterclockwise direction in FIG. 60 away from the plane B of the big chain ring 152. Thus, the second downshifter spring 500b biases the cam surface 328 on the drive arm 326 of the second downshift element 212b against the curved cam surface 452 of the second downshift cam 440, which holds the second downshift element 212b in the downshift state overlapping the plane B of the big chain ring 152.

As with the first downshift element 212a described above, if the second downshift element 212b experiences an external force that would otherwise move the second downshift element in the counterclockwise direction in FIG. 60, the second downshift element would remain stationary in this state. For example, as the second downshift element 212b rises from under the chain 138 (not shown) into contact with the chain, the force of the chain, and the force of the second downshifter spring 500b, would tend to rotate the second downshift element about the second downshift shaft 496b in the counterclockwise direction, pushing the head 334 outboard away from the plane B. However, the second downshift element 212b in this downshift state is unable to move in the counterclockwise direction in FIG. 60 because the drive arm 326 on the body 320 of the second downshift element 212b is borne against and blocked by the cam surface 452 of the second downshift cam 440. Again, the curvature of the cam surface 452 may be cylindrically shaped and concentric with the axis of the second cam shaft 506. Thus, any force vector exerted by the cam surface 328 on the drive arm 326 of the second downshift element 212b against the cam surface 452 of the second downshift cam 440 in the downshift state of FIG. 60 would pass through the axis of the second cam shaft 506. As a result, no amount of external force exerted by the chain 138 on the head 334 of the second downshift element 212b in this downshift state would tend to cause rotation of second downshift cam 440 about the second cam shaft 506. The force of the chain 38 thus will not cause the second downshift cam 440 or the second downshift element 212b to be back driven or reverse rotated away from the plane B of the big chain ring 152.

As with the first downshift element 212a, at this point, the front shifting system is in the downshift state, but a downshift has not yet been completed. Referring to FIGS. 46, 52 (for general reference), and 60, the angled contact face 338 on the head 334 of the second downshift element 212b is biased to overlap the plane B of the big chain ring 152. The upshift element 210 including the chain guiding pegs 280 and the chain upshifting peg 282 are biased in a direction away from the plane S of the small chain ring 154. As the rider continues to pedal from a position of the front shift unit 150 that is 180 degrees rotated from the position in FIG. 52, the chain 138 downshifts from the sprocket teeth 160 of the big chain ring 152 to the small chain ring 154 as shown in FIG. 59. More specifically, as the second downshift element 212b rises into contact with the chain 138, the angled contact face 338 on the second downshift element blocks the chain from engaging the sprocket teeth 160 on the big chain ring 152. Instead, the angled contact face 338 forces the chain 138 to redirect or deflect out of alignment with the plane B of the big chain ring in the inboard direction toward the plane S of the small chain ring 154. As the rider continues to pedal the front shift unit 150 in the rotation direction R, the chain 138 will continue to wrap around and engage the sprocket teeth 162 of the small chain ring 154 as depicted in FIGS. 41 and 47. After the downshift operation is complete, the front shifting system in this example remains in the downshift state until the rider requests or executes an upshift, as described above.

In the disclosed example, the upshift element 210 is in the upshift state rotated to the position adjacent the big chain ring 152 when executing an upshift operation and thereafter, until being moved for the next downshift. At the same time, the downshift elements 212a and 212b are rotated to the position not overlapping the sprocket teeth 160 of the big chain ring 152. In this position, the downshift elements 212a and 212b are positioned so as not to engage the chain 138. This downshift element position may be described as a neutral state, though the system as a whole is in the upshift state. Likewise, the downshift elements 212a and 212b in the downshift state are rotated to the position overlapping the sprocket teeth 160 of the big chain ring 152 when executing a downshift operation and thereafter, until being moved for the next upshift. At the same time, the upshift element 210 is rotated to the position away from the big chain ring 152. In this position, the upshift element 210 is positioned so as not to engage the chain 138. This position may also be described as a neutral state herein, though the system as a whole is in a downshift state.

As noted above, the front shift unit 150 in this example includes two downshift elements 212a and 212b. The two downshift elements are oriented about 180 degrees opposite one another on the big chain ring 152. Thus, the downshift elements provide two opportunities to execute or perform a downshift per each revolution of the crank assembly 132. As a result, a downshift operation can be executed faster than if the front shift unit 150 had only one downshift element. However, the front shifting system can be provided in an alternate example with only one downshifting element or can be provided with more than two downshifting elements. In this example, the front shift unit 150 includes only one upshift element 210, along with the two downshift elements 212a and 212b. In an alternate example, the front shift unit may include a second or more upshift elements as well. The front shifting system may include any number of upshift elements and/or downshift elements within the sprit and scope of the disclosure. Increasing the number of upshift and downshift elements will decrease the average time that it takes to complete a shift by placing a next available shift element that much closer to the upper working side of the chain when a shift is requested or executed.

Referring to FIGS. 19-26, a rider sometimes may pedal the crank assembly backwards opposite to the rotation direction R. In the event that the rider pedals backwards and while the upshift element 210 is in the upshift state, the position and shape of the teeth 288 on the chain guiding pegs 280 and the position and shape of the hook 302 on the chain upshifting peg 282 can be configured and arranged to deflect or reject the chain 138. More specifically, the angled bottom surface 294 and the chamfered surfaces or chamfers 296a, 296b, and 296c on the teeth 288 and the angled bottom surface 306 and the chamfered surfaces or chamfers 308a, 308b, 308c on the hook 302 are configured so that the chain 138 does not engage with the chain guiding pegs 280 or the chain upshifting peg 282. These angled surfaces and chamfers protect against a chain derailment that could occur if the chain 138 were to engage the chain guiding pegs 280 or the chain upshifting pegs while the rider is pedaling backwards. The angled bottom surface 294 and chamfers 296a, 296b, and 296c on the teeth 288 and the angled bottom surface 306 and chamfers 308a, 308b, and 308c on the hook 302 may also function to deflect or reject the chain 138 when the chain guiding pegs 280 and the chain upshifting peg 282 cross over or rotate past the bottom or slack side of the chain after the upshift element 210 is biased or positioned in the upshift state, but before an upshift operation has occurred.

Figure 61:
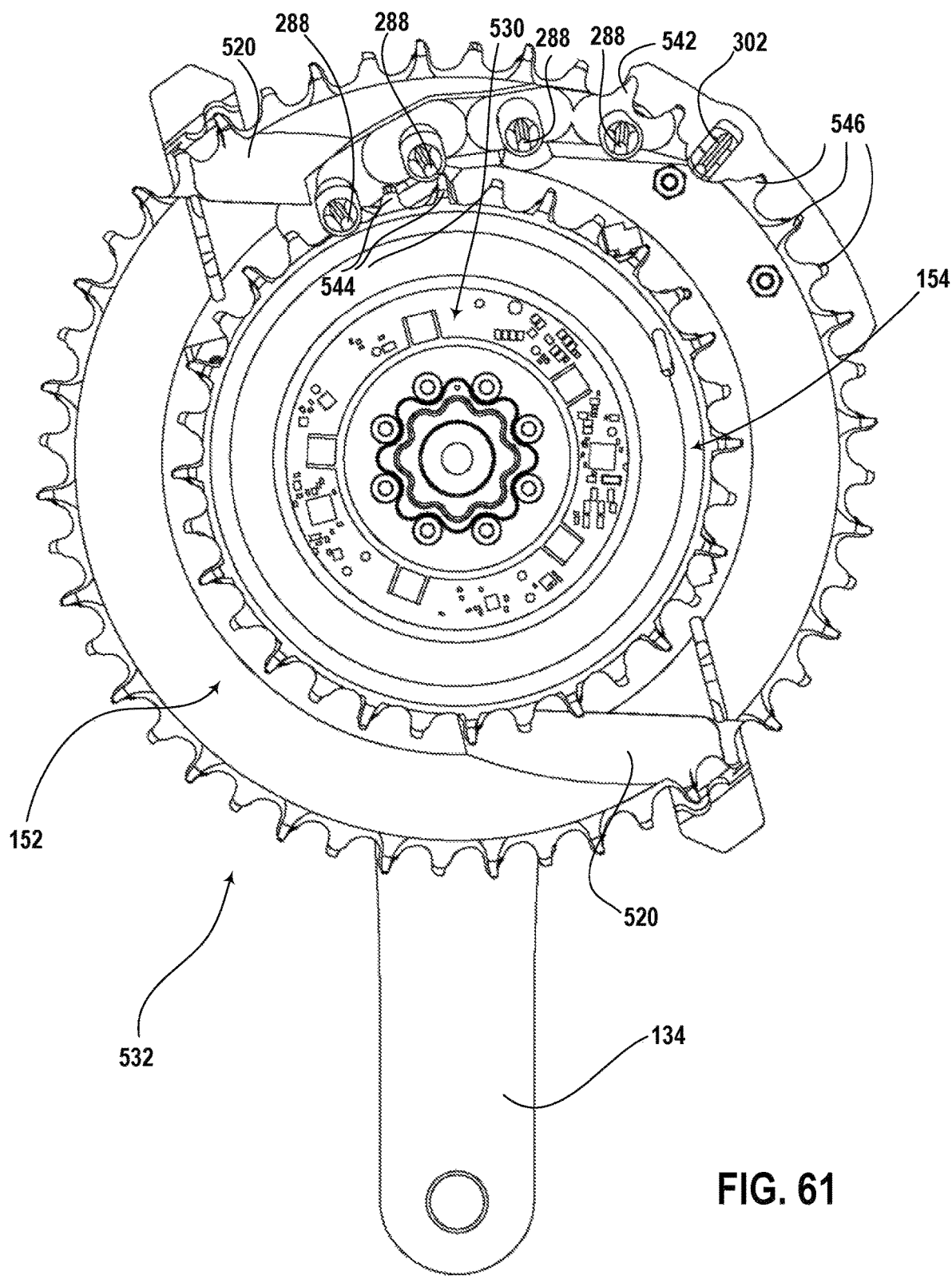
FIG. 61 shows a left or inboard side plan view of an alternate example of a crank assembly and front shifting system in accordance with the teachings of the present disclosure.

In another example, with reference to FIG. 61, the front shifting system may include an optional power meter 530 that is deployed and configured to measure the rider's power output while pedaling the bicycle 100. In this example, the power meter 530 is provided as a part of a modified front shift unit 532. The power meter 530 may include strain measurement devices attached to the material of the chainring structure between a torque input and output section so as to measure power transmitted therethrough. The power meter 530 may include an independent PCB including appropriate circuitry to determine, and/or transmit signals indicative of, power transmitted through the chainring structure. Electrical power to operate the power meter 530 may be supplied by the power supply 194 via a cable (not shown) extending from the power supply to the power meter. In another embodiment, the power meter 530 and the front shift unit 532 may share PCB within the control unit 184, rather than having a separate PCB for the power meter and the front shift unit. In this embodiment strain measurement devices may still be attached to the chainring structure and configured to measure strain of the chainring structure.

In one example, the big chain ring 152 may have forty-eight (48) sprocket teeth 160 and the small chain ring 154 may have thirty-two (32) sprocket teeth 162. In such an example, both the number of sprocket teeth 160 on the big chain ring 152 and the number of sprocket teeth 162 on the small chain ring 154 are multiples of four. Such an arrangement allows the downshift elements 212a and 212b to be positioned 180 degrees offset or apart from each other around the circumference of the front shift unit 150. Also, for each of the two downshift element locations, the spatial relationship or timing between the relevant teeth 160 on the big chain ring 152 and the relevant teeth 162 on the small chain ring 154 will be the same. In this way, the front shift unit 150 can be designed such that the rotational timing between the big chain ring and the small chain ring provides a high quality upshift component geometry and a high quality first downshift component geometry, while also assuring the second downshift component geometry will be identical to the first downshift component geometry. Thus, in the disclosed example, the number of teeth 160 on the big chain ring 152 and the number of teeth 162 on the small chain ring 154 are both multiples of four. However, the disclosed front shifting system and front shift unit are not limited to such a chain ring design. Any number of teeth can be provided on either of the chain rings.

As described above, the position of the upshift element 210 is adjustable by manipulating the set screw 314. In the disclosed example, there is no device or mechanism disclosed to adjust the position of the downshift elements 212a and 212b. However, a device or mechanism associated with these elements may be included that allows adjustment. For example, the downshift element 212a could be provided in two parts. One part may include the contact face 338 on the head 334 and a second part may include the cam surface 328 and the drive arm 326. Both of the parts may then be independently rotatable about the first downshift shaft 496a. A set screw may be threadably engaged with one of the two parts and may have an exposed end in contact with the other of the two parts. The set screw may then be used to adjust the position of the contact face 338 of the head 334 relative to the cam surface 328 on the drive arm 326. The specific construction of such an adjustable downshift element construction is not described further herein.

Referring to FIGS. 14, 15, 36, and 37, some teeth 160 of the big chain ring 152 and some teeth 162 of the small chain ring 154 may be provided having a special or different shape than other of the teeth. For example, two of the teeth 160 of the big chain ring 152 that immediately precede the location of the downshift elements 212a and 212b may have an outboard face 540 with material that has been removed from the outboard surface of the teeth. This tooth shape may be provided on these two specific teeth 160 to allow the chain 138 to more easily deflect inboard during a downshift operation. In another example, one specific tooth 160 of the big chain ring 152 that immediately precedes the position of the chain upshifting peg 282 and the hole 264e may have an inboard face 542 with material that has been removed from the inboard surface of the tooth. This tooth shape may be provided to allow the chain 138 to deflect or move slightly farther outboard before engaging the hook 302 of the chain upshifting peg 282 during an upshifting operation. In another example, a series of the teeth 162 of the small chain ring 154 are the first teeth to engage the chain 138 during a downshift operation. These teeth may have special chamfers 544 on the tooth surfaces to optimize chain management during a downshift operation. In still another example, a series of the teeth 160 of the big chain ring 152 are the first teeth to engage the chain 138 after an upshift operation.

These teeth may also have special chamfers 546 on the tooth surfaces to optimize chain management during an upshift operation.

In an alternate example, the front shifting system may be configured for what is termed "synchro shifting." In synchro shifting, when a rider requests or executes an upshift or a downshift, the front shifting system automatically determines the combination of which front chain ring, i.e., the big chain ring 152 or the small chain ring 154, and which sprocket of the rear cassette 140 should engage the chain 138. The front shifting system and rear derailleur then shift the chain to the desired front chain ring and rear sprocket accordingly. The "synchro shift" system can be configured to shift through every available gear combination in sequence, from the highest gear to the lowest gear, and vice versa.

In another alternate example, the front shifting system, and the rear shifting system as well, can be configured for automatic shifting. In an automatic shifting system, the bicycle can be configured with sensors that sense various drive train operational characteristics, which are used to shift gears automatically. Any one or more of the sensed operational characteristics may be sensed and used to determine when the system should shift gears. For example, such operational characteristics can include pedaling torque, pedaling cadence, speed, and changes in such characteristics over time. The front shifting system and rear shifting system can be configured to automatically shift gears on the bicycle, without direct input from the rider, when a predetermined combination of one or more of these characteristics is sensed or determined.

In another alternate example, the front shifting system, as well as the rear shifting system, can be configured as what is known as a half-step system. Half-step shifting is a known shifting technique where the gear ratio change between successive rear sprockets is approximately double the gear ratio change between the front chain rings. When shifting the chain either up or down on the sprockets of the rear cassette, the half-step system can shift the chain on the front chain ring component between the front chain rings during every shift and can shift the chain between the rear sprockets every other shift. In this type of half-step system, very small, sequential gear ratio changes can be achieved.

The disclosed front shifting system and front shift unit 150 is a two-state system. The disclosed two state system has only two states, which include a downshift state and an upshift state. In the downshift state, the parts or components are arranged to downshift the chain from a big chain ring to a smaller chain ring and then remain in that state until asked to execute an upshift operation. In the upshift state, the parts or components are arranged to upshift the chain from a small chain ring to a bigger chain ring and then remain in that state until asked to execute a downshift operation. In an alternate example, the front shifting system and the front shift unit may be configured as having three states. The three states can include an upshifting state, a downshifting state, and a different, neutral state for the upshifting and downshifting elements. The parts or components can be arranged in the upshifting state only when executing an upshift of the chain and can be arranged in the downshifting state only when executing a downshift of the chain. The part or components can be configured to return to and be arranged in a neutral state when not executing an upshift or a downshift of the chain. In other words, the front shifting system can be in the neutral state when neither the upshift element or elements nor the downshift element or elements are engaged or arranged to upshift or downshift, respectively, the chain. The parts or components of the front shifting system and front shift unit 150 can thus be configured to be in the neutral state when the rider is riding the bicycle and no shifting occurs.

In another alternate example, the gearmotor unit 200 and the electronic control unit 184 may be contained or housed within the same housing or enclosure, rather than having separate housings, as in the above-described example. The gearmotor unit and electronic control unit can be provided as a single controller, which provides the functions of both the gearmotor unit and the electronic control unit.

In one example, the big chain ring 152 and the small chain ring 154 may be integrally formed as one single part or chain ring component 228, as in the disclosed example. In an alternate example, the big chain ring and the small chain ring may instead be separately formed components that are then either directly fixed to one another to form the chain ring component indirectly joined to one another via a third component, such as a chain ring hub.

In one example, the various shifting mechanisms, parts, or components of the front shift unit 150 are all directly mounted to the chain ring component. In the disclosed example, virtually all of the shifting mechanisms, parts, or components are formed as an integrated part of, or mounted to, the big chain ring 152. In an alternate example, one, more than one, or all of the various shifting mechanisms, parts, or components may be formed as an integrated part of, or mounted to, the small chain ring 154. In yet another alternate example, one, more than one, or all of the various shifting mechanism, parts, or components of the front shifting system and front shift unit may be mounted to a different, separate part (not shown) of the unit. That separate part may then in turn be mounted to the front shift unit. For example, one, more than one, or all of the various shifting mechanisms, parts, and components may be mounted to the cowling of the front shift unit.

It is well known in the bicycle field that, during a pedal stroke, the torque that a rider inputs to the crank assembly 132 varies as a function of the angular position of the crank arms 134. In the disclosed example, the crank arms 134 of the crank assembly 132 are angularly positioned relative to the upshift element 210 and the downshift elements 212a and 212b such that the pedal torque input by the rider is not near a maximum torque during an upshift operation or a downshift operation. In an alternate example, the crank arms 134 of the crank assembly 132 may be located at a different angular position relative to the position of the upshift element 210 and the downshift elements 212a and 212b.

Specific materials are disclosed above for some of the shifting mechanisms, parts, or components. The disclosed front shifting system and front shift unit 150 is not limited to only those specific materials, or to any specific materials for any of the mechanisms, parts, or components. Other suitable materials may certainly be utilized. In just one alternate example, the upshift element 210 may be made from an injection molded nylon material or a long fiber reinforced thermoplastic material. In another example, the chain guiding pegs 280 and the chain upshifting peg 282 may insert molded in place on the body 270 of the upshift element 210. This would eliminate the need for individually adjusting the position of each peg relative to the plane C of the contact surfaces 276 on the body 270. Other such modifications may certainly be made to the upshift element and to other of the various shifting mechanisms, parts, or components as well.

In another alternate example, the front shift unit 150 may be configured to include additional sensors, such as a three-axis gyroscope and/or a three-axis accelerometer. Such components may be disposed on the PCB of the electronic control unit 184 or on another suitable part of the front shift unit. These additional sensors may be employed to determine the angular position and/or the angular velocity of the front shift unit 150 during pedaling. Such positional and velocity information may be used to improve performance of the front shifting system, as discussed in more detail below. Other types of additional sensors may also be used to obtain additional data and information, as desired.

In one example, the front shifting system, as well as the rear shifting system, may be configured to disallow or prohibit shifting of the gears when a rider is not pedaling the bicycle 100 forward or, in other words, when the angular velocity of the front shift unit 150 is not greater than zero in the rotation direction R. The front shifting system, as well as the rea shifting system, may alternatively be configured to disallow or prohibit shifting when the rider is not pedaling the bicycle faster than a predetermined threshold value or, in other words, when the angular velocity of the front shift unit 150 is not greater than the predetermined threshold value. This feature may be added to aid in preventing a chain derailment or other undesired system behavior.

In another example, the front shifting system, as well as the rear shifting system, may be configured to abort a shift that is in progress if a rider pedals backwards during a shifting operation. If the rider pedals backwards during the execution of a shift, the front shifting system, as well as the rear shifting system, may revert to the previous state, prior to the beginning the shift, rather than continue the shifting operation. This feature may also be added to aid in preventing a chain derailment or other undesired system behavior.

In another example, the front shifting system, as well as the rear shifting system, may be configured to delay shifting until a desired angular position of the front shift unit 150 has been achieved. This feature can be achieved by employing one or more sensors to obtain two axes of accelerometer data. The collected data can be used to determine the near real time angular position of the front shift unit 150 relative to the gravity vector. For example, a sensor, such as an accelerometer, may be mounted to the bicycle frame 102 and may be used to determine the orientation of the bicycle 100 relative to the gravity vector. The orientation of the front shift unit 150 relative to the bicycle 100 can then be determined. Shifting of the front shift unit 150 can be delayed until a desired angular position of the front shift unit has been achieved. The frame-mounted sensor may be eliminated if the errors associated with its absence are small.

In another example, the front shifting system may be configured to move the upshift element 210 and/or the downshift elements 212a and 212b to an intermediate position until a shift is completed. After the shift is completed, the upshift element 210 and the downshift elements 212a and 212b can be moved to a final, steady-state position. In one example, this feature may be used to optimize the positions of the upshift element 210 and/or the downshift elements 212a and 212b based on a position of the rear sprocket or cog of the rear cassette 140 that is engaged with the chain 138, i.e. based on the chain line or chain angle.

FIGS. 62-74 show an embodiment in which the power supply, PCB, motor, shift mechanism and associated parts are attached to and supported by a mechanism support bracket 661, rather than being directly attached to and supported by a chain ring component 655. The power supply, PCB, motor, shift mechanism and associated parts, together with the mechanism support bracket 661 are included in a mechanism module 660 that attaches to the chain ring in a way that will be described further herein. A first advantage of the embodiment is that it allows the mechanism module and chain ring component to be replaced independently of each other. For example, if the chain rings are worn, they can be easily replaced by the end user without replacing the mechanism module. A second advantage of the embodiment is that it may simplify and reduce the costs involved in the manufacture of the chain ring component. A third advantage of the embodiment is that the housing of the mechanism module covers the mechanism, protecting it from dirt and debris. A fourth advantage of the embodiment is that it may improve aerodynamics without the need of a separate cowling.

Figure 62:
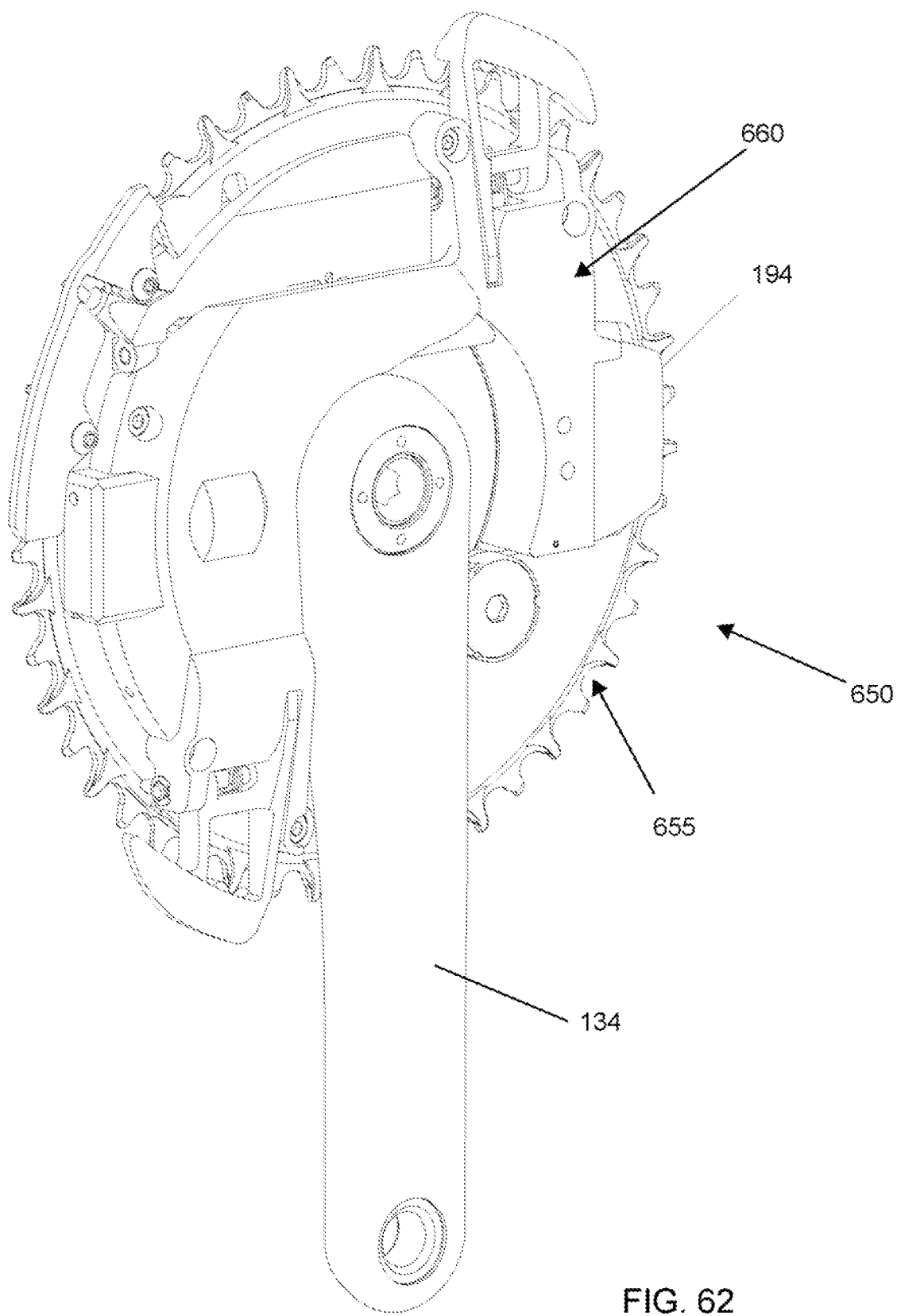
FIGS. 62-74 show an embodiment of a front shifting system including a mechanism support bracket and the elements thereof.
Figure 63:
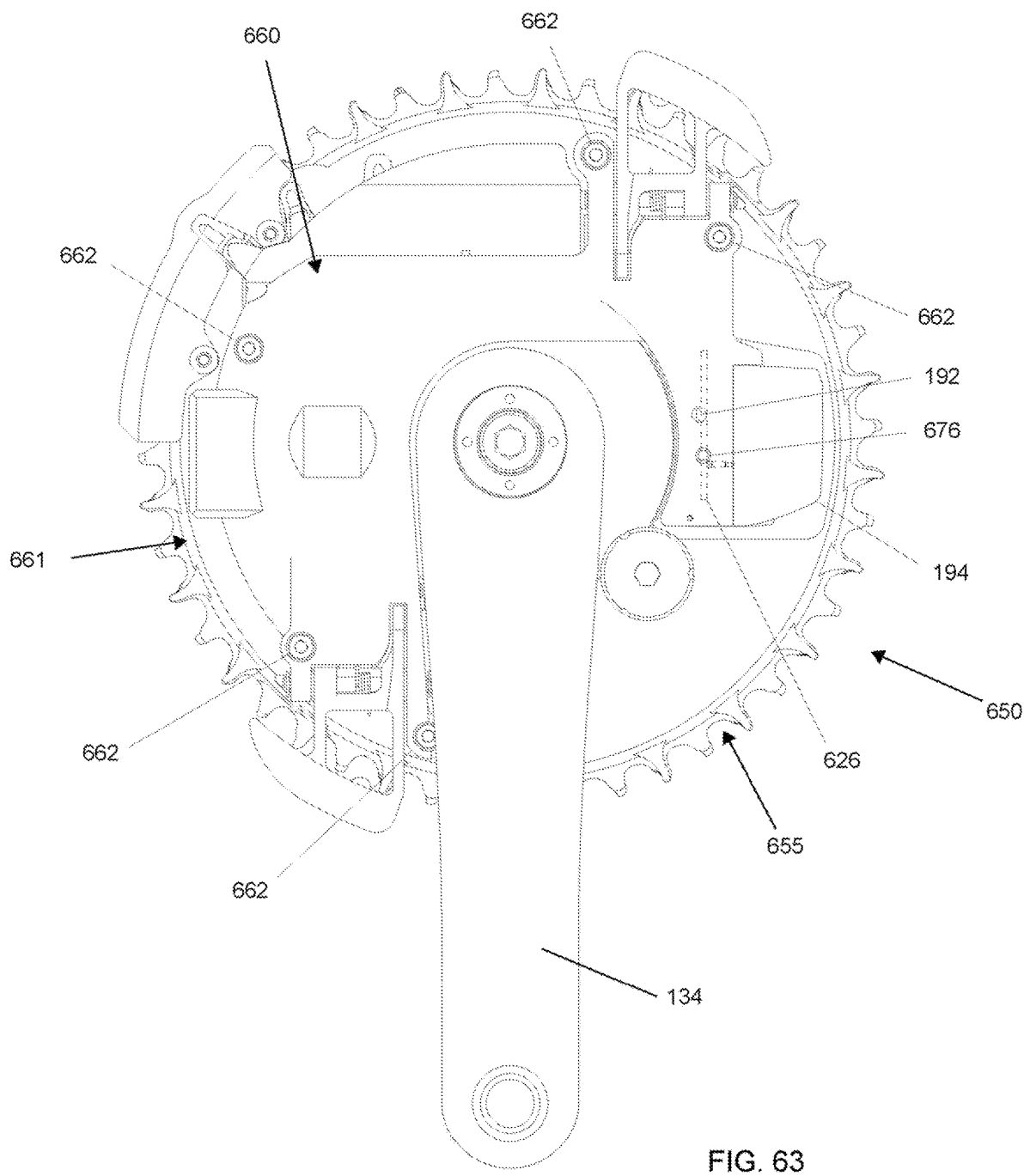

Referring to FIGS. 62 and 63, mechanism module 660 attaches to front shifting unit 650 with a plurality of fasteners, for example five screws 662 that thread into corresponding threaded holes in front shifting unit 650. Other attachment techniques may be used. For example, rivets or other fasteners may be used to attach corresponding features of the parts.

Figure 67:
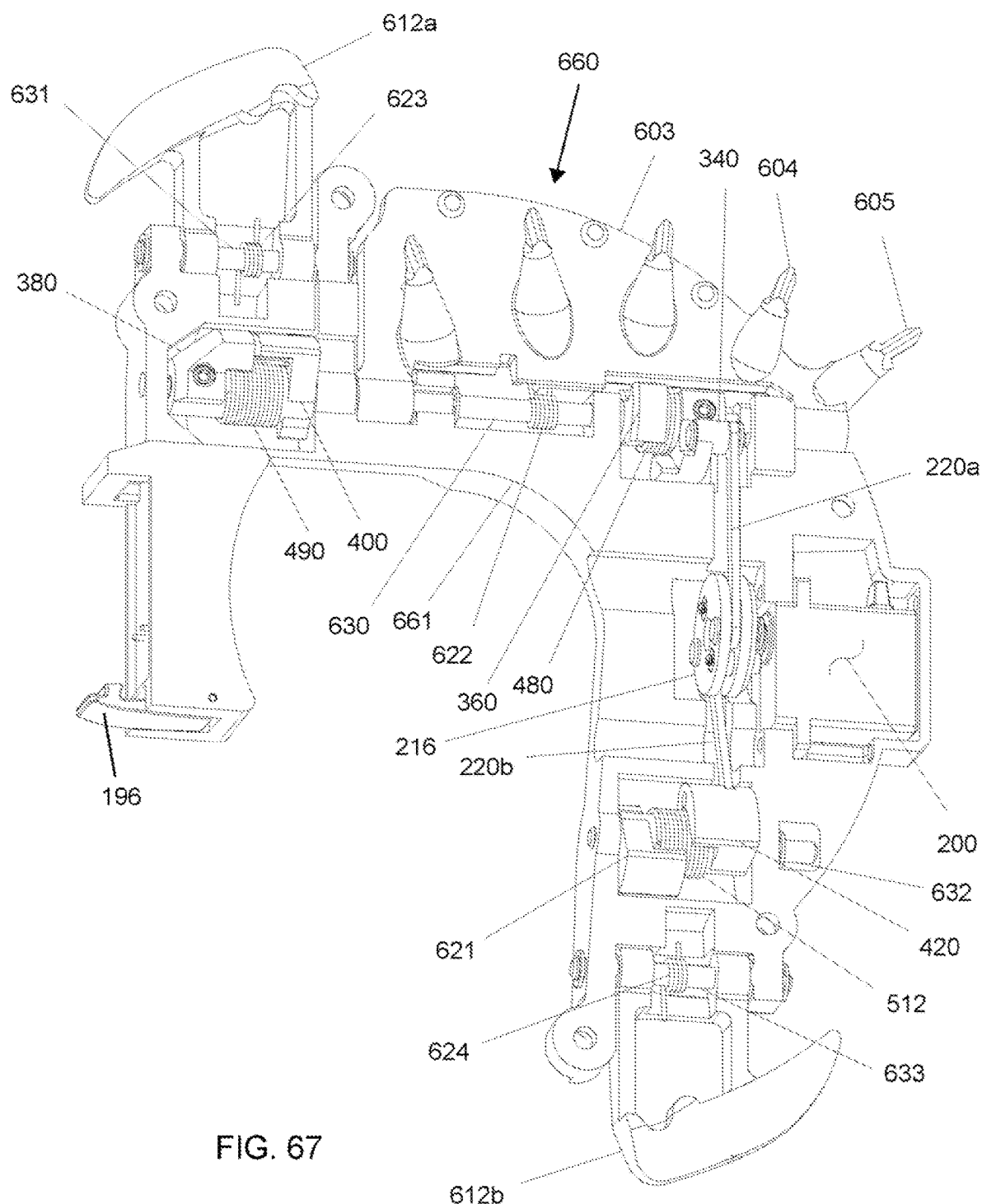
Figure 68:
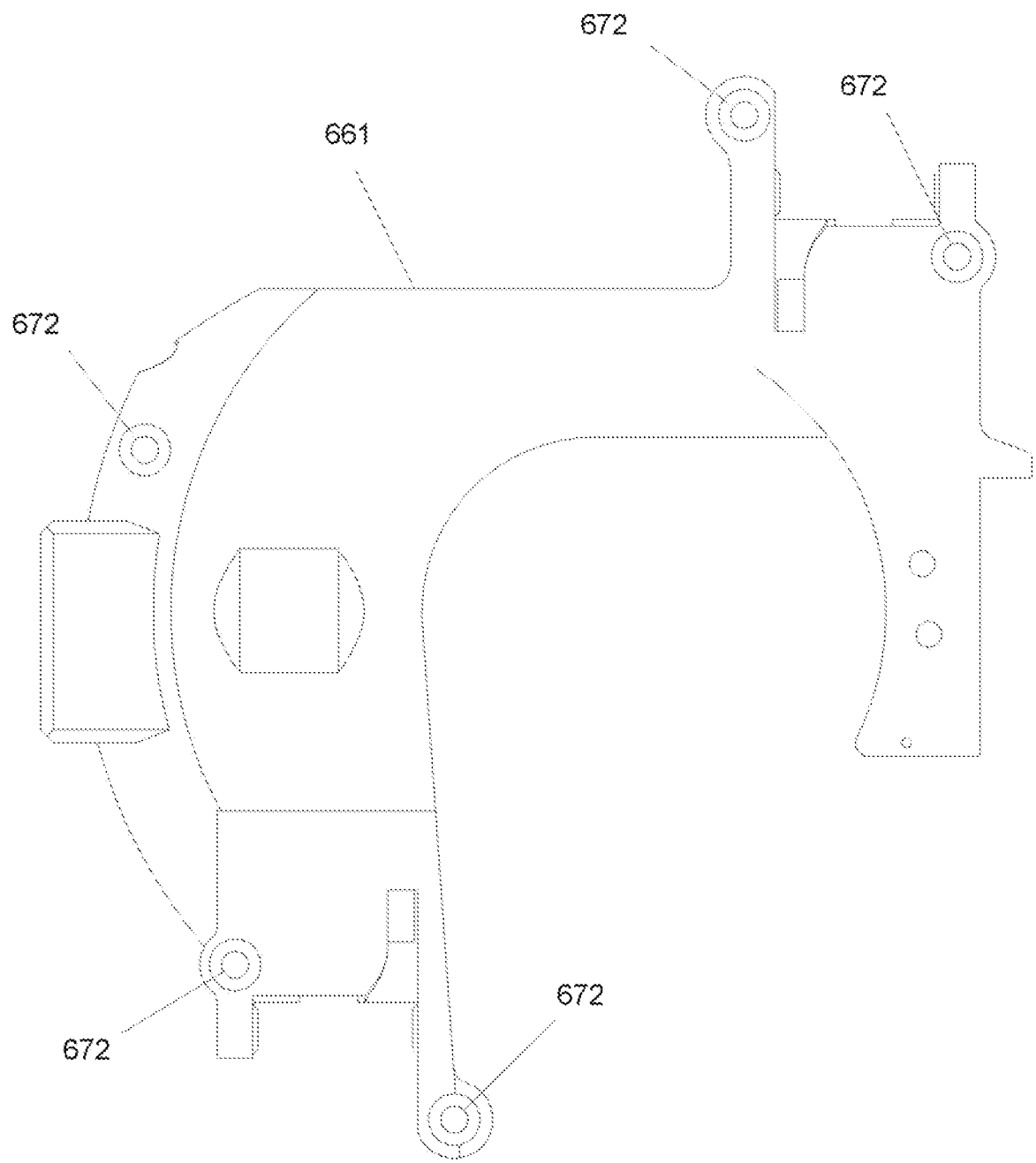
Figure 69:
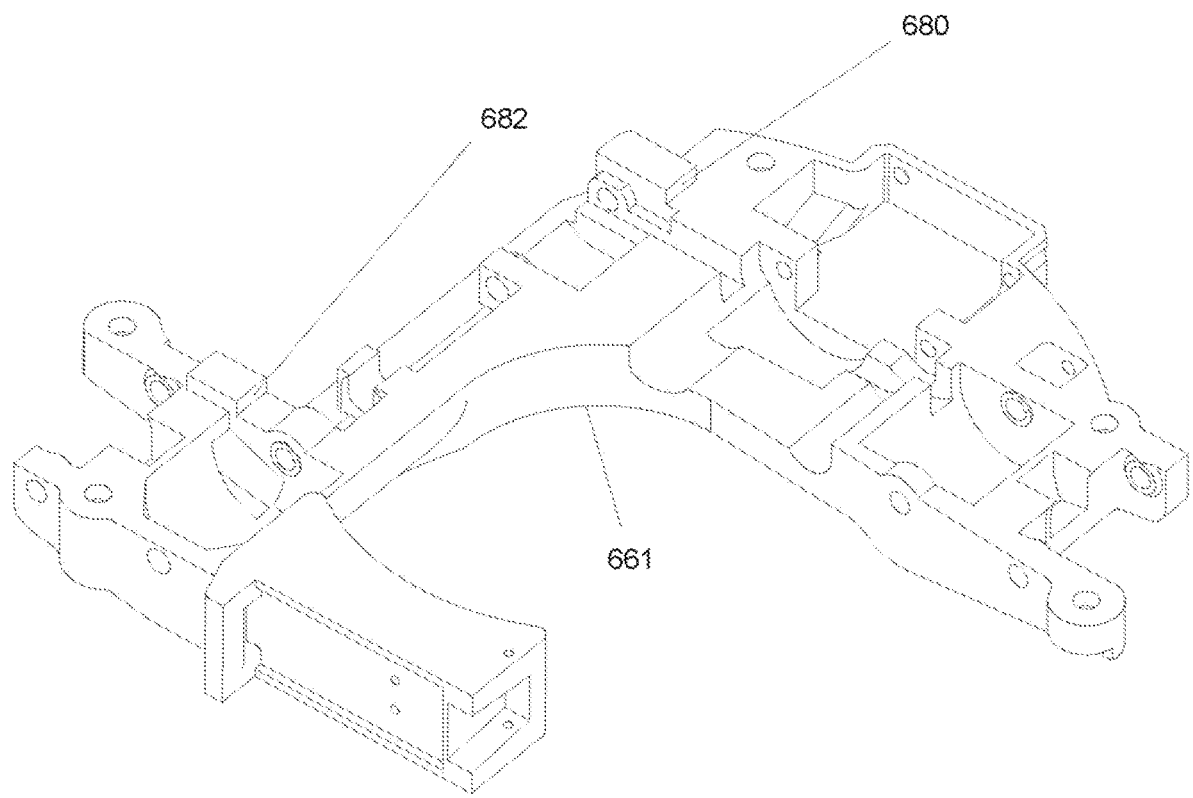

FIGS. 63-66 show the mechanism module 660, and FIGS. 67-69 show the mechanism support bracket 661 of mechanism module 660. Referring to FIGS. 67-69, mechanism support bracket 661 has a plurality of holes 672, five in this embodiment, configured to receive the aforementioned plurality of screws to attach mechanism module 660 to front shifting unit 650.

Figure 65:
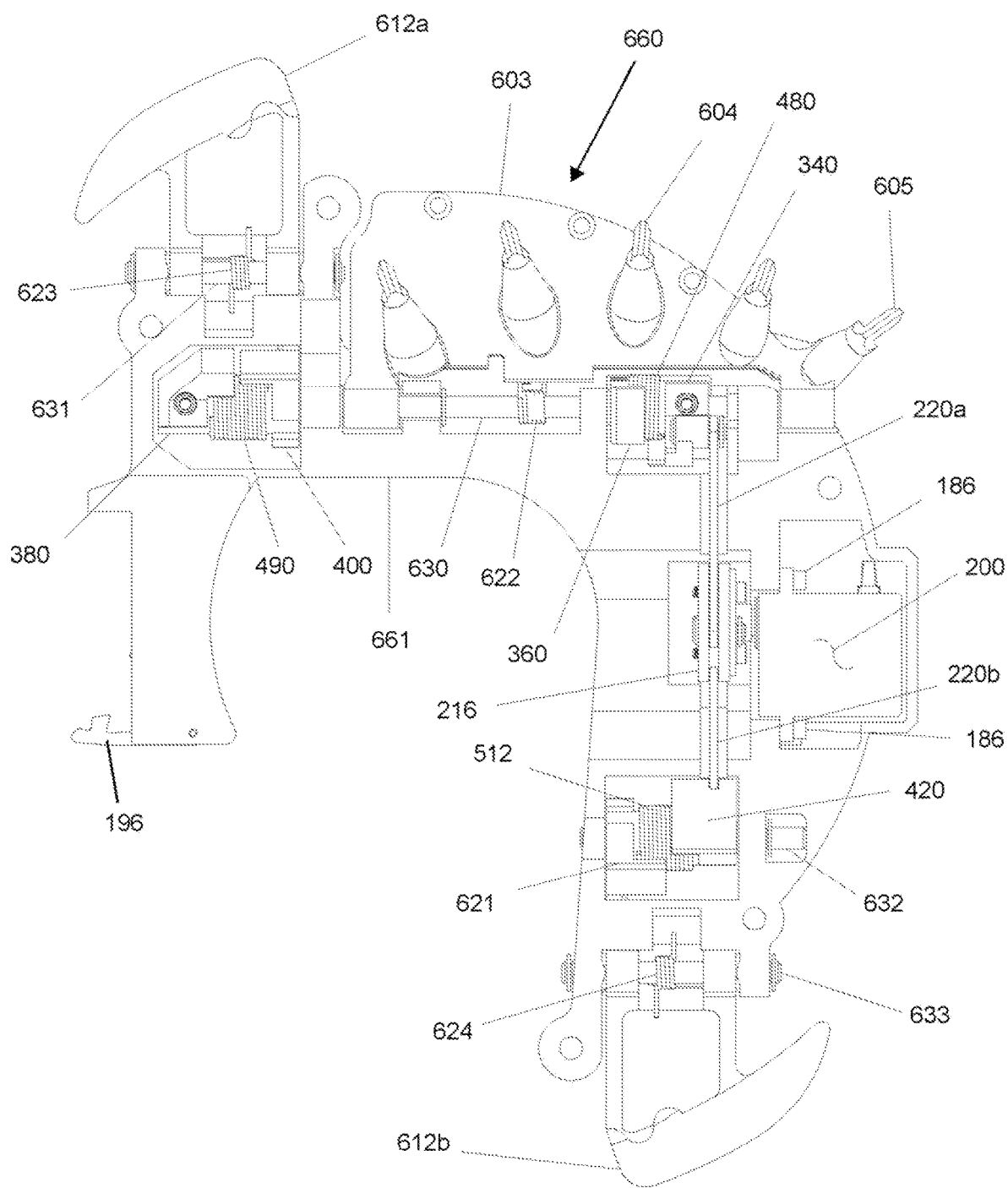
Figure 66:
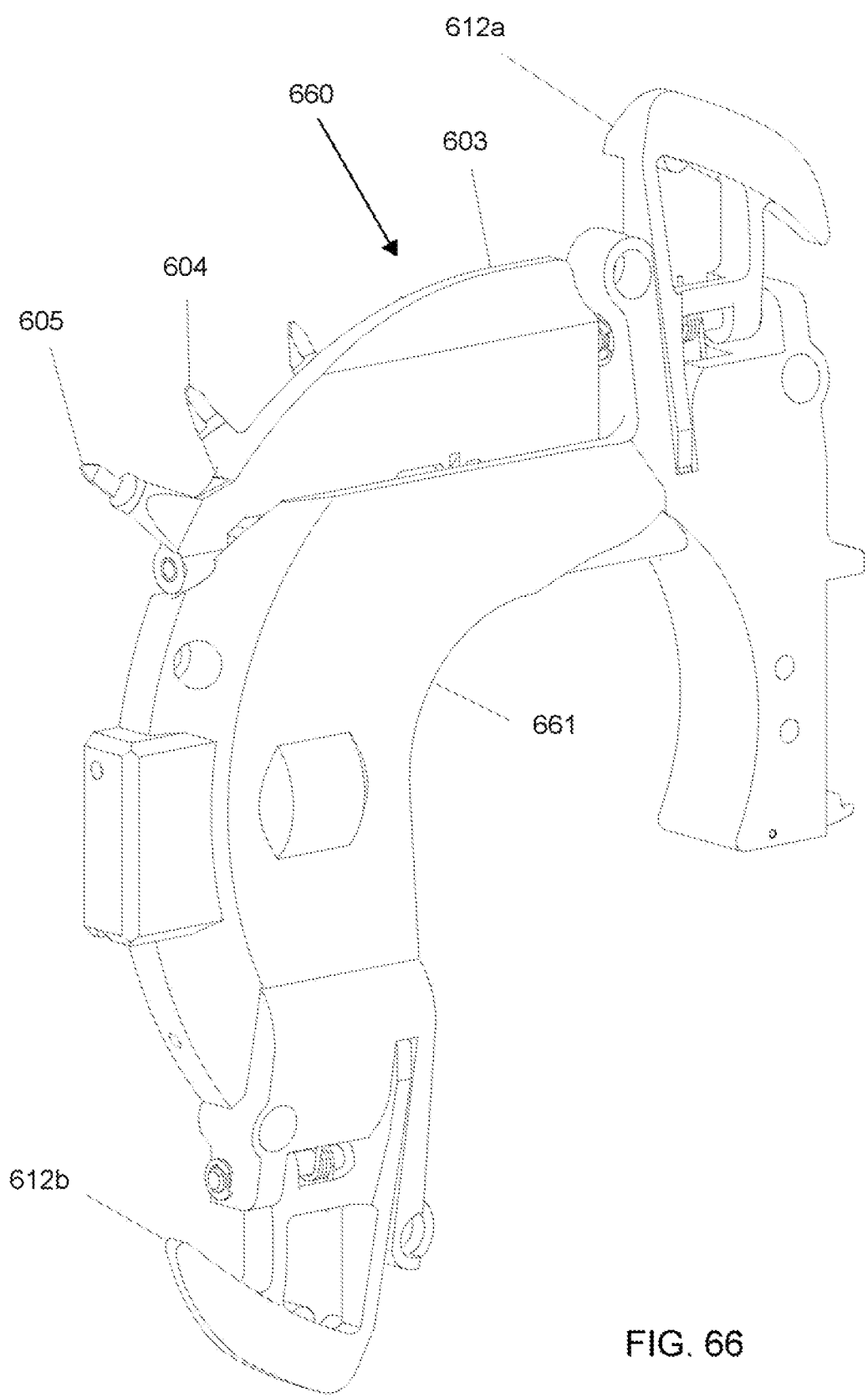

Referring to FIGS. 67 and 69, shafts 630, 631, 632, 633 are located in and supported by corresponding holes in mechanism support bracket 661, and perform the same functions as shafts 460, 496a, 496b, 506 of previous embodiments. Referring to FIG. 65, gearmotor unit 200 is screwed to mechanism support bracket 661 with two screws 186 that are threaded into threads in mechanism support bracket 661. First and second downshift elements 612a, 612b are pivotably received on and supported by first and second downshift pivot shafts 631, 633, respectively. First and second downshift element biasing springs 623, 624 are received on and supported by first and second downshift pivot shafts 631, 633, respectively. First legs of first and second downshift element biasing springs 623, 624 engage first and second downshift elements 612a, 612b, respectively, and second legs of first and second downshift element biasing springs 623, 624 engage mechanism support bracket 661. First and second downshift element biasing springs 623, 624 bias first and second downshift elements 612a, 612b in the same way as in previous embodiments.

Figure 70:
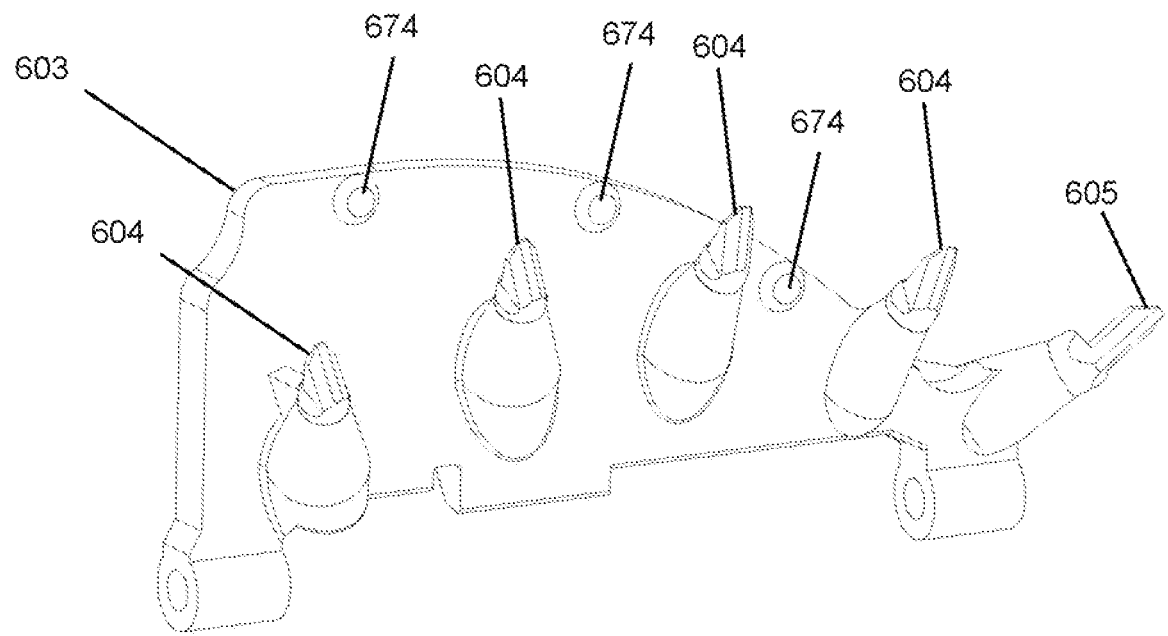
Figure 71:
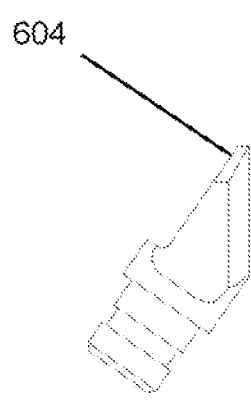
Figure 72:
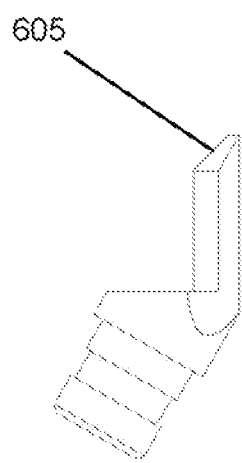

Referring to FIGS. 70-72 upshift element 603 may be made of long fiber reinforced thermoplastic ("LFRT"), glass-filled nylon, or other appropriate materials such as some metallic materials, and chain guiding elements 604 and chain upshifting element 605 may be made of hardened steel or other material operable to carry the appropriate chain upshifting and/or guiding loads and that may provide appropriate chain interaction and wear characteristics. Chain guiding elements 604 and chain upshifting element 605 are preferably insert molded into upshift element 603. Thus, upshift element 603, chain guiding elements 604 and chain upshifting element 605 all may behave as one unitary member. In other embodiments, the upshift elements and/or chain guiding elements may operate independently. Stop surfaces 674 project from upshift element 603 and stop against front shifting unit 650 when upshift element 603 is in the upshift position, preventing further rotation of upshift element 603.

Referring to FIG. 65, upshift element 603 is pivotably received on and supported by first cam shaft 630. Upshift element biasing spring 622 is also received on and supported by first cam shaft 630. A first leg of upshift element biasing spring 622 engages upshift element 603, and a second leg of upshift element biasing spring 622 engages mechanism support bracket 661. Upshift element biasing spring 622 biases upshift element 603 in the same way as in previous embodiments.

The remaining parts associated with the mechanism (cams, drive elements, springs, links, hub, etc.) may be supported and attached as described in previous embodiments.

Figure 64:
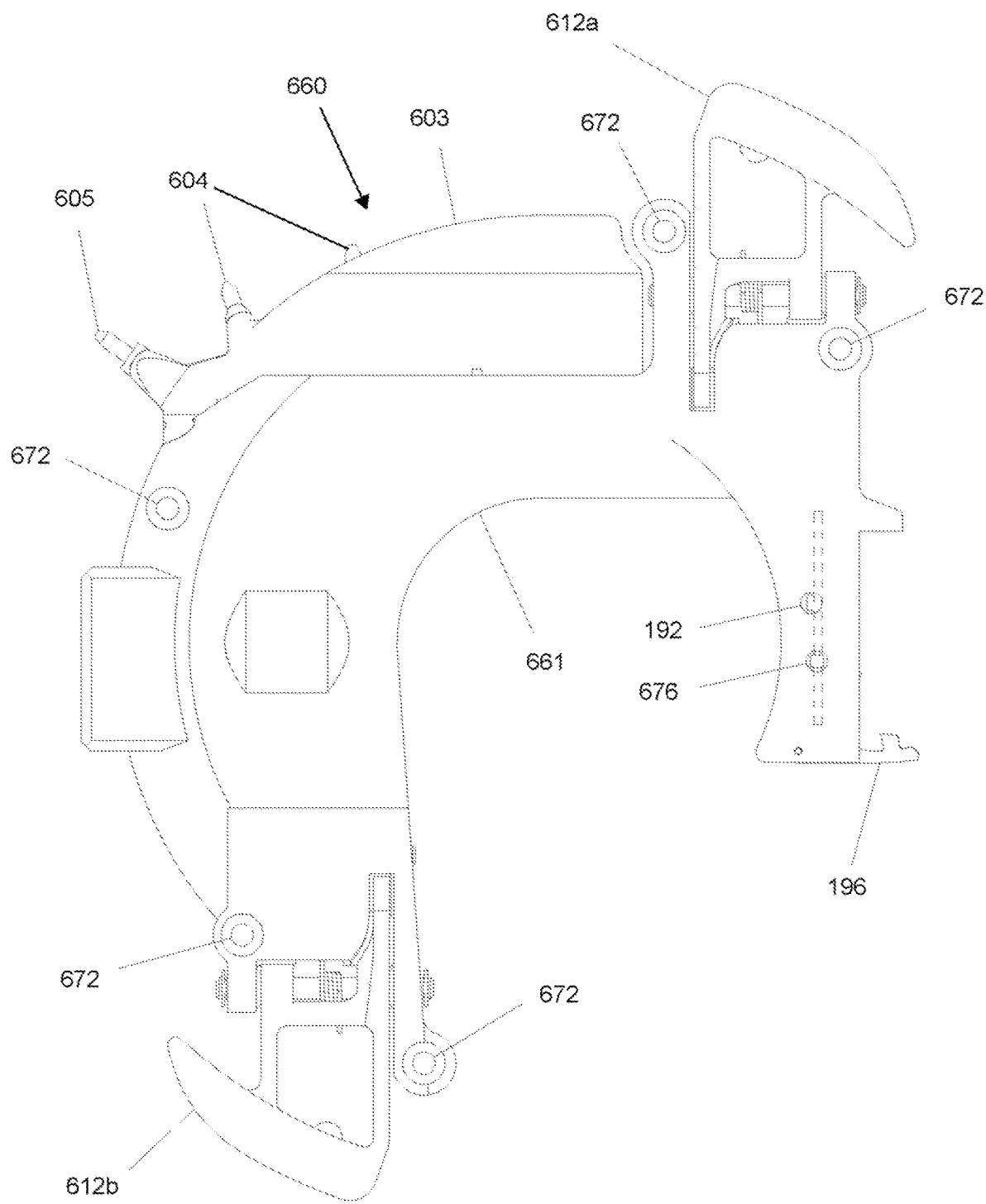

Referring to FIG. 64, power supply latch 196 is pivotably attached to an axle fixed to mechanism support bracket 661. Printed circuit board (or PCB, see FIG. 63) 626 is housed inside a waterproof chamber in mechanism support bracket 661. Button 676 of PCB 626 is accessible through a hole in mechanism support bracket 661, and LED 192 of PCB 626 is visible through a clear lens in mechanism support bracket 661. Electrically conductive pogo pins of PCB 626 protrude from holes in mechanism support bracket 661, and electrically connect to terminals of power supply 194, which is attachable to (and removable from) mechanism module 660 by operation of latch 196. Wires (not shown) carry electrical power and signals from PCB 626 to gearmotor unit 200.

Figure 73:
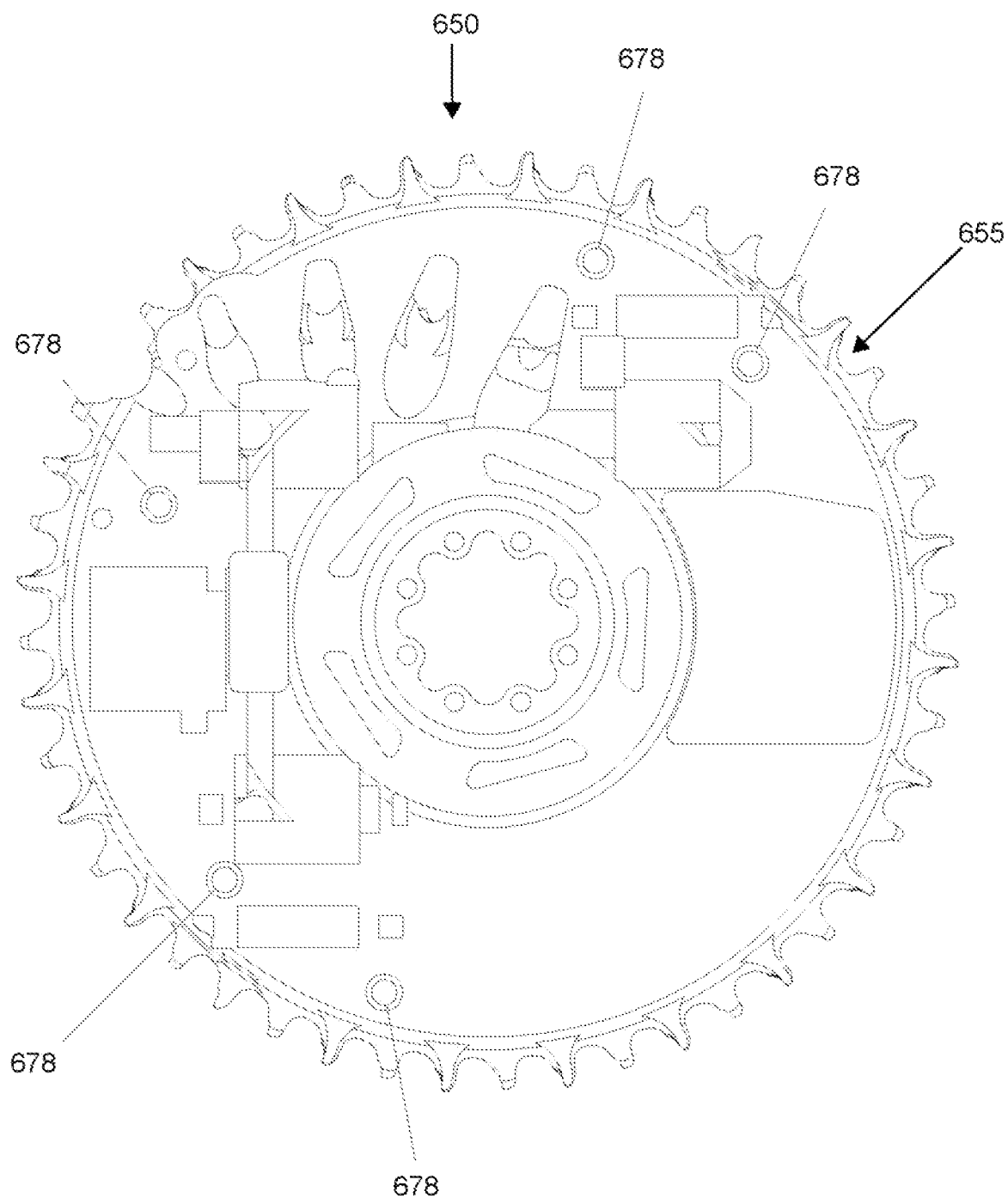
Figure 74:
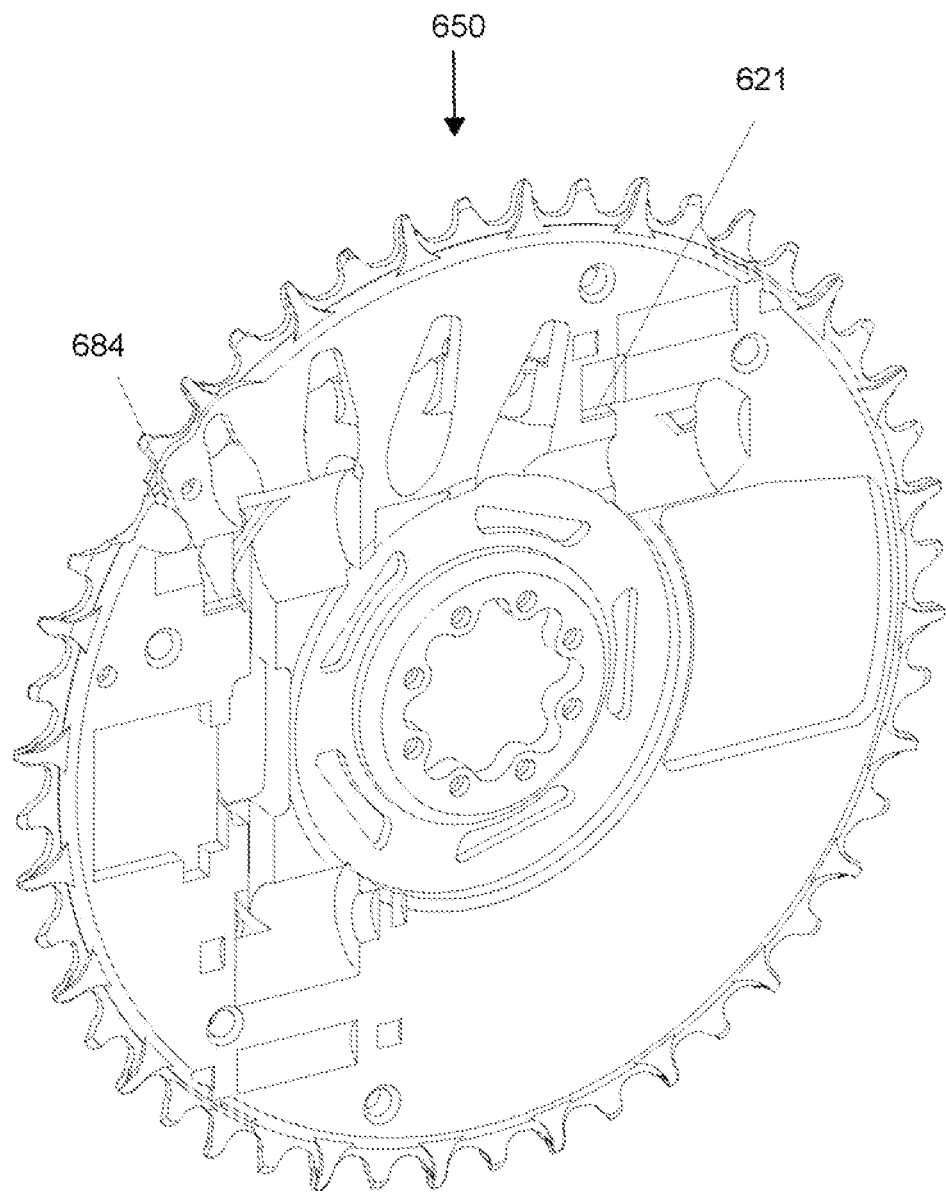

Referring to FIGS. 73 and 74, front shifting unit 650 has a plurality of holes 678, which may be the five threaded holes described in this example, that receive the aforementioned fasteners (e.g. the five screws) that attach mechanism module 660 to front shifting unit 650. Machining of the front shifting unit 650 is simplified compared to other embodiments, since difficult-to-machine cross-drilled holes of other embodiments are omitted, and are replaced with threaded holes 678 which are machined from the same direction as other features in front shifting unit 650. Further, the omission of the bosses on which the cross-drilled holes were located results in a machining "blank" that is thinner, greatly reducing the amount of material that must be removed during the machining operation.

Referring to FIGS. 69 and 74, mechanism support bracket 661 has two surfaces 680, 682 that engage and abut corresponding surfaces 684, 621 in front shifting unit 650 to transfer chain loads from the chain to front shifting unit 650 as follows. During an upshift operation, the chain load is carried by chain guiding elements 604 and chain upshifting element 605. The chain load is transferred through chain guiding elements 604 and chain upshifting element 605, through upshift element 603, through first cam shaft 630, through mechanism support bracket 661, through surfaces 680, 682 of mechanism support bracket 661, to surfaces 684, 621 of front shifting unit 650. In this manner, screws 662 are not required to carry the chain load during an upshift operation.

Figure 75:
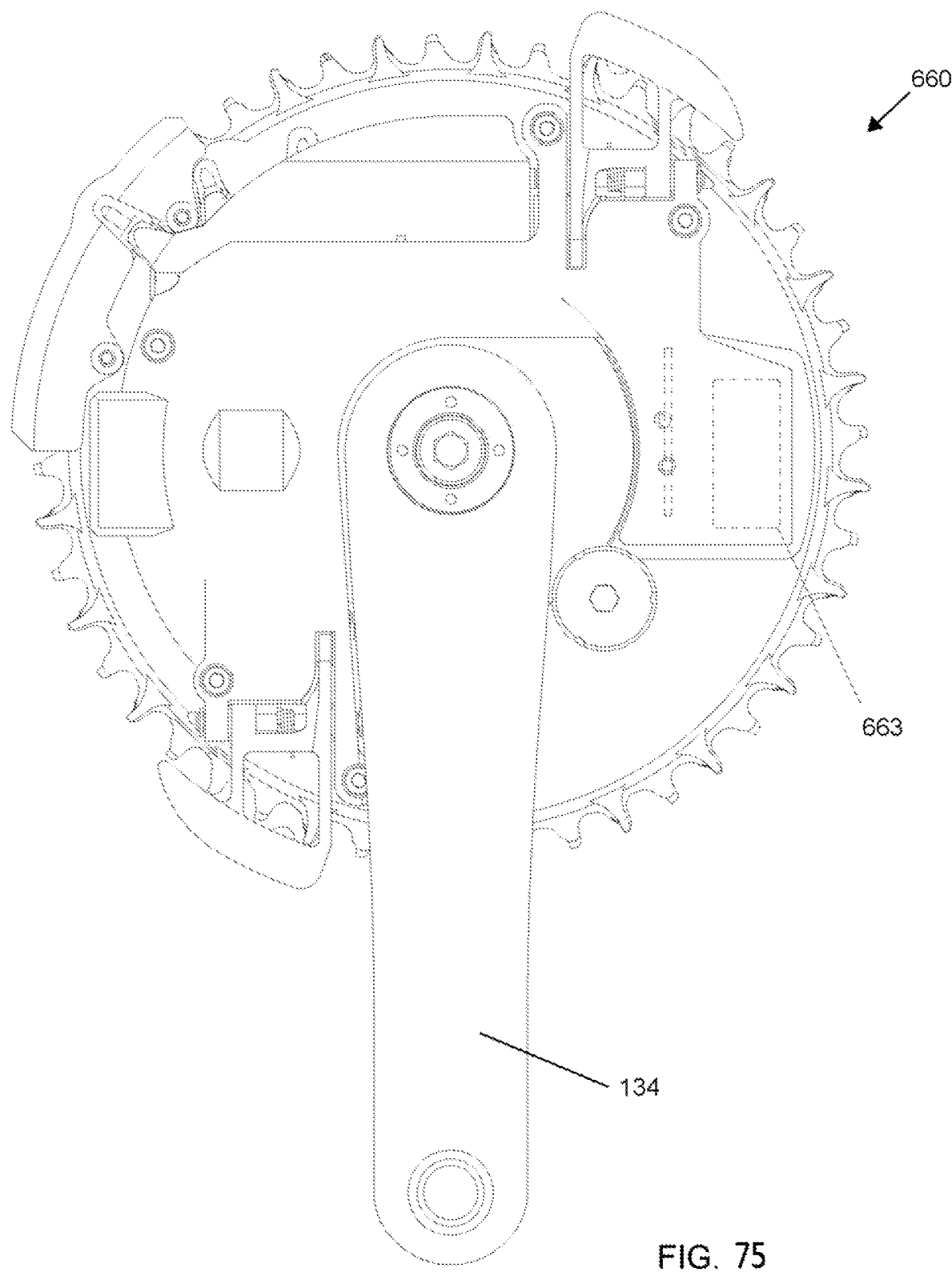
FIG. 75 shows an alternate embodiment of the front shifting system of FIGS. 62-74.

FIG. 75 shows an alternate embodiment in which removable power supply 194 is omitted, and instead, non-removable power supply 663 is permanently installed inside mechanism module 660. Non-removable power supply 663 performs the same function as removable power supply 194, and preferably includes circuitry and structure providing the power supply 663 as rechargeable. Non-removable power supply 663 is electrically connected to PCB 626.

Figure 76:
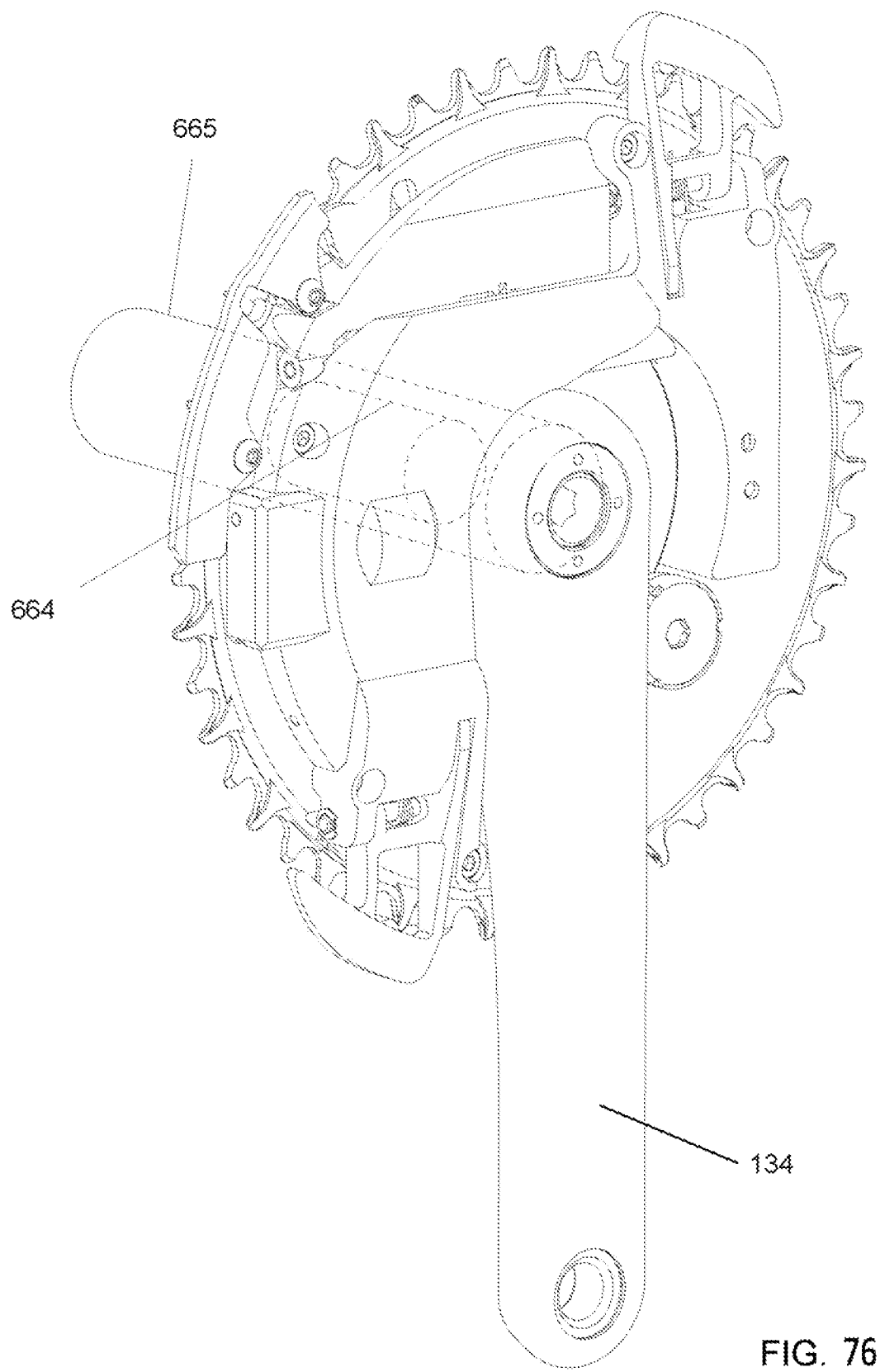
FIG. 76 shows an alternate embodiment of the front shifting system of FIGS. 62-74.

FIG. 76 shows an alternate embodiment in which power supply 194 is again omitted, and power supply 664 is received inside the hollow space formed inside spindle 665. Power supply 664 is preferably connected by conductive cables and/or wires (not shown) to PCB 626. Power supply 664 performs the same function as power supply 194, and is preferably rechargeable. Power supply 664 may be removable, or may be permanently installed.

Figure 77:
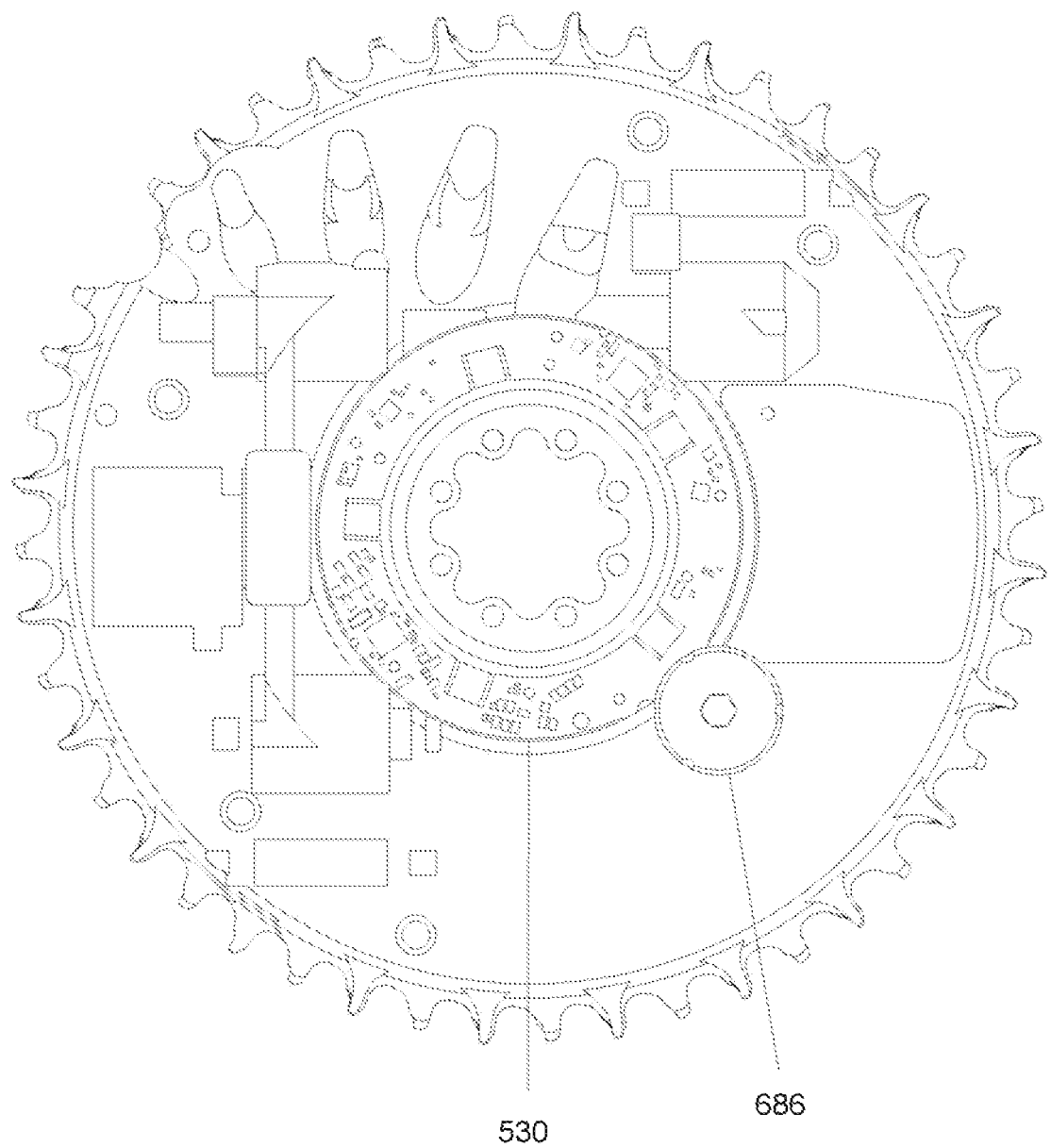
FIG. 77 shows an alternate embodiment of the front shifting system of FIGS. 62-74.
Figure 78:
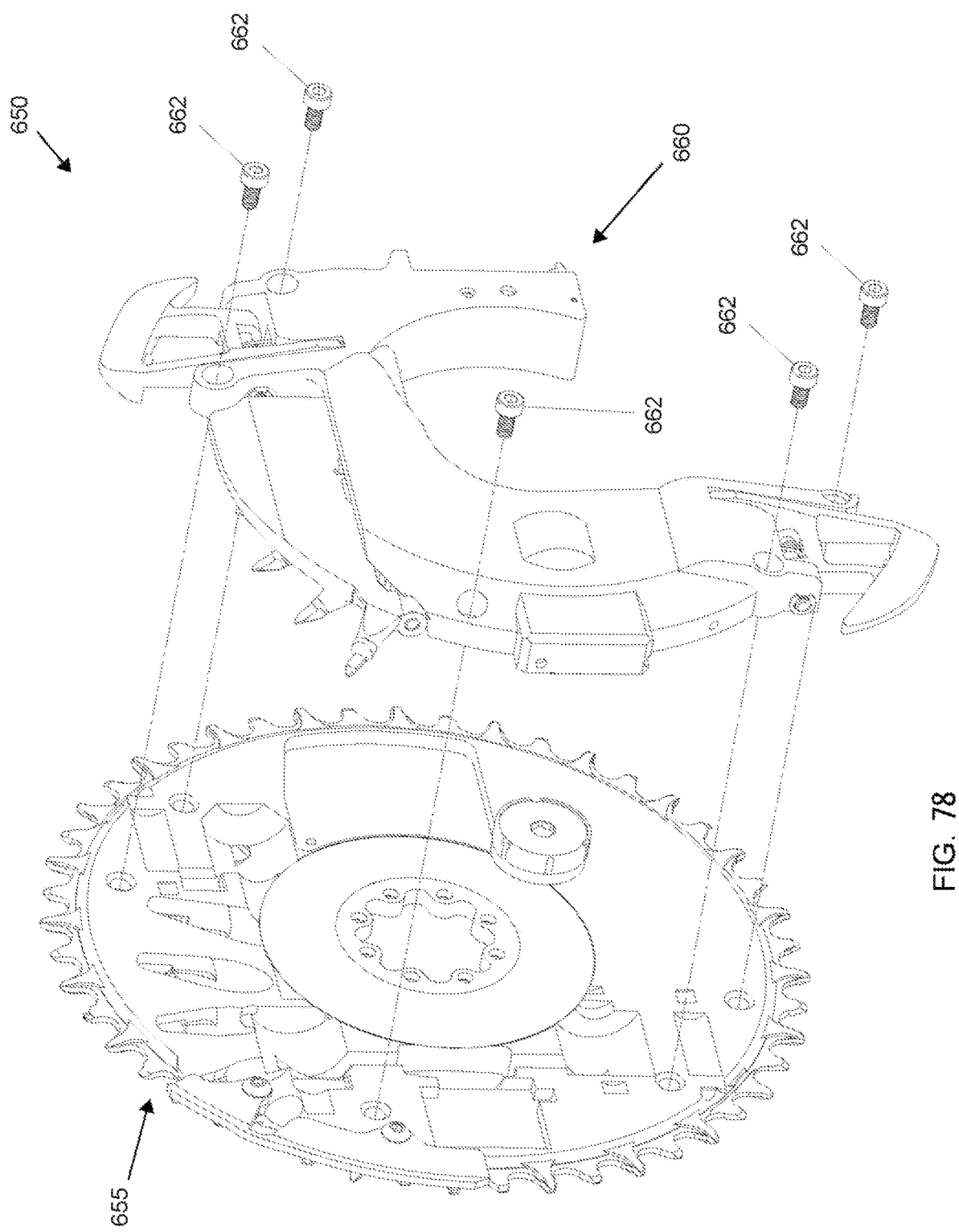
FIG. 78 shows an alternate embodiment of the front shifting system of FIGS. 62-74.

FIG. 77 shows a power meter 530 that is incorporated into all of these embodiments. The power meter embodiment shown is well known in the art, and uses strain gauges that are attached to front shifting unit 650 in order to measure the rider's torque output. The power meter 530 also may include sensors to measure the rider's cadence. Using this torque and cadence data, the power meter 530 calculates the power output of the rider. The power meter 530 may receive electrical power from the same batteries 194, 663, and/or 664 that power the shift mechanism, or the power meter may receive electrical power from a separate power meter power supply 686 as shown in FIG. 77. The power meter 530 may be covered by a waterproof cover (cover removed in FIG. 77 for clarity).

Figure 5B:
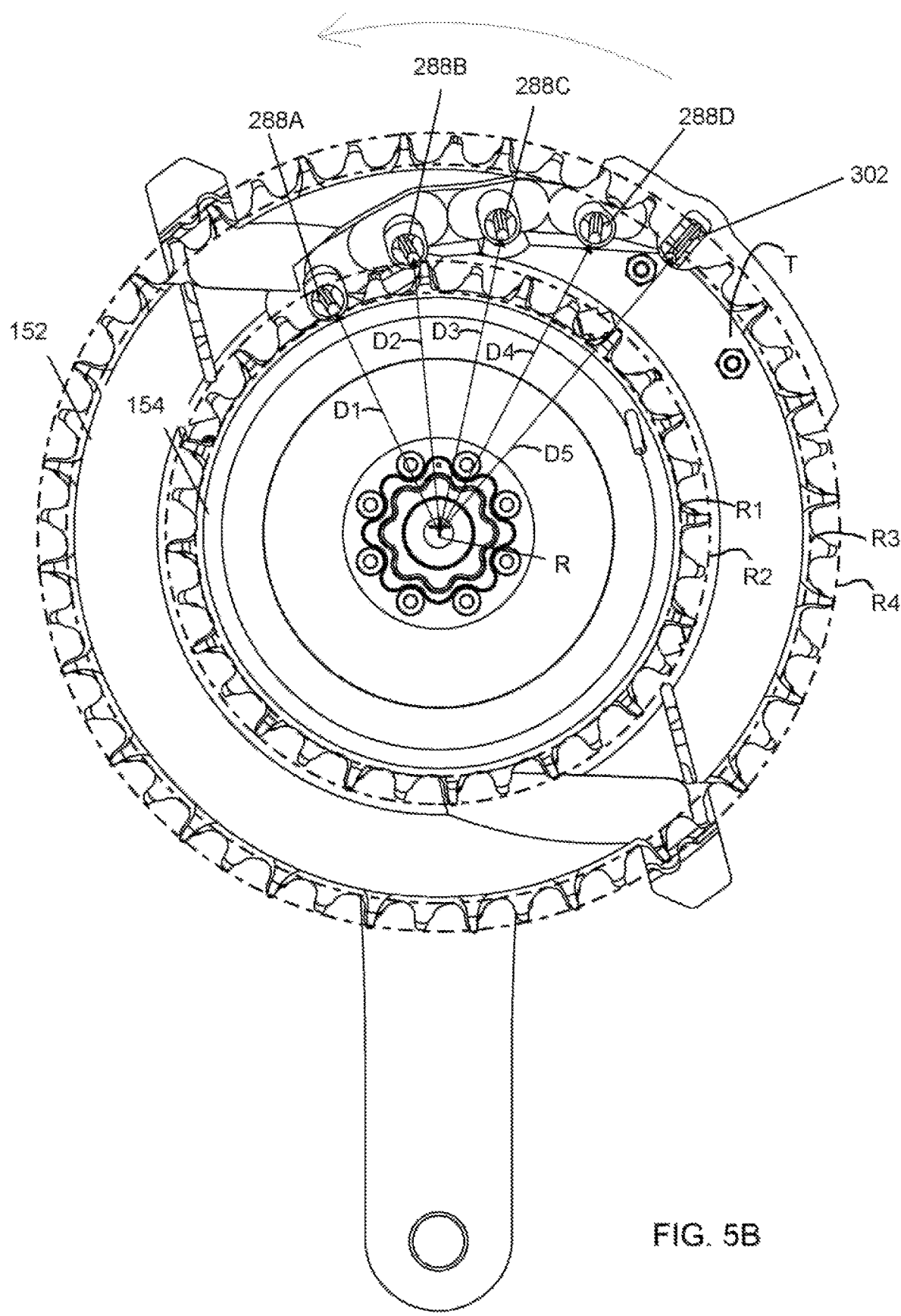

As previously indicated, and as will be discussed with reference to FIG. 5B, exchanging, or shifting, a chain between two or more sprockets 152, 154 may be accomplished with at least one ("1") shift element 288 being moved into a chainline of a drive system. Shift elements 288, 302 are chain engaging elements such as pegs, hooks, or other elements as described herein. Shift elements are configured to engage a link or plate of a chain. In the described embodiments, a single shift element engages a singular link or link plate. The shift elements may be protruding shift elements that move in an axial direction relative to a rotational axis R of the sprockets. The protruding shift elements may be configured to extend and/or retract in the axial direction for moving into and/or out of the chainline to engage the chain. The at least one moving shift element may be disposed radially between a root circle R3 of a larger sprocket and a tooth tip circle of a smaller sprocket R2. The at least one moving shift element may include an array or plurality of protruding shift elements. In FIG. 5B the plurality of protruding shift elements 288 are designated individually as 288A, 288B, 288C, 288D designating different orientations on the chainring structure.

The protruding shift elements 288A 288B, 288C, 288D, 302 of the array may be disposed at different radial distances D1, D2, D3, D4, D5 from a rotational axis R of the structure. These distances may also be different relative to the larger and/or smaller sprockets. As illustrated, a first protruding shift element 288A may be disposed between a root circle R1 and a tooth tip circle R2 of the smaller sprocket 154. A second protruding shift element 302 may be disposed between the root circle and the tooth tip circle R4 of the larger sprocket 152. A plurality of protruding shift elements 288B, 288C, 288D may be disposed radially and/or circumferentially between the first protruding shift element 288A and the second protruding shift element 302. The plurality of protruding shift elements may have each have a tip configured to engage the chain. The respective tips each disposed at different axial distances relative to the larger and smaller chain rings 152, 154.

The plurality of protruding shift elements may cause the chain to be shifted through a transition zone T between the smaller chain ring teeth and the larger chain ring teeth. For example, the transition zone may be defined as the radial area between the tooth tip circle R2 and the larger chain ring root circle R3. A plurality of protruding shift elements 288B, 288C, 288D may be disposed in the transition zone T.

Exchanging, or shifting, a change between two or more sprockets may be accomplished from a larger sprocket 152 to a smaller sprocket 154 using downshifting element, which may be formed as a slide or slanted planar surface that may be moved into, and/or out of, the chainline at the larger sprocket to cause the chain to slide or shift towards the smaller sprocket. The downshifting elements may be disposed outside of the transition zone T, but cause the chain to move through the transition zone T.

In the disclosed examples, the front shift unit is generally described as including the chain ring unit, including the big and small chain rings, and the front shift mechanism, including all of the various shift components. However, more or fewer of the parts and components of the bicycle may be included or considered as a part of the so-called front shift unit within the scope of the present disclosure. Further, the front shifting system is generally described herein as including the front shift unit, the shifter, the chain, and the crank assembly components. Again, more or fewer of the parts and components of the bicycle may be included or considered as a part of the so-called front shifting system within the scope of present disclosure. In the disclosed example, the drive wheel that is driven by the drive train is the rear wheel, though the disclosure is not limited thereto.

In one example, according to the teachings of the present disclosure, a bicycle includes a frame, wheels for supporting the frame on a surface, a drive train operable to drive rotation of a drive wheel of the wheels, the drive train including a cassette carried adjacent the drive wheel and a chain coupled to the cassette. A front shifting assembly is carried on the bicycle and includes a shifter operable to transmit a wireless signal and a crank assembly having two crank arms and a pedal associated with each of the two crank arms. The crank assembly is rotatable about a rotation axis. A front shift unit is coupled to the crank assembly for rotation therewith about the rotation axis. The front shift unit has a chain ring component and a shift mechanism coupled to the chain ring component. The chain ring component has a big chain ring and a small chain ring. The small chain ring has a small diameter and the big chain ring has a big diameter that is larger than the small diameter. The chain extends between the cassette and the chain ring component. The shift mechanism is configured to receive the wireless signal from the shifter and to shift the chain between the big chain ring and the small chain ring according to the wireless signal.

In one example, the shift mechanism can be on the big chain ring.

In one example, the shift mechanism can include at least one upshift element movable relative to the front shift unit to selectively engage the chain to execute an upshift of the chain from the small chain ring to the big chain ring.

In one example, at least one upshift element of the shift mechanism can be mounted to the big chain ring.

In one example, the shift mechanism can include at least one downshift element movable relative to the front shift unit to selectively engage the chain to execute a downshift of the chain from the big chain ring to the small chain ring.

In one example, at least one downshift element of the shift mechanism can be mounted to the big chain ring.

In one example, the shift mechanism can include a first downshift element and a second downshift element. The second downshift element can be positioned opposite or 180 degrees offset relative to the first downshift element around a circumference of the chain ring component.

In one example, the shift mechanism can include at least one downshift element movable relative to the chain ring component to selectively engage the chain to execute a downshift of the chain from the big chain ring to the small chain ring.

In one example according to the teachings of the present disclosure, a front shift unit for a bicycle includes a chain ring component having a big chain ring and a small chain ring joined for co-rotation with one another about a rotation axis. The big chain ring has a big diameter and a plurality of big ring sprocket teeth and the small chain ring has a small diameter and a plurality of small ring sprocket teeth. The big diameter is larger than the small diameter. The front shift unit also includes a shift mechanism coupled to the chain ring component. The shift mechanism includes an electronic control unit, a gearmotor unit, at least one upshift element, at least one downshift element, and a power supply. The power supply is arranged to provide power for the electronic control unit and the gearmotor unit to operate the at least one upshift element and the at least one downshift element. According to a wireless upshift signal, the at least one upshift element is operable by the electronic control unit and the gearmotor unit to shift a chain from the plurality of small ring sprocket teeth on the small chain ring to the plurality of big ring sprocket teeth on the big chain ring. According to a wireless downshift signal, the at least one downshift element is operable by the electronic control unit and the gearmotor unit to shift a chain from the plurality of big ring sprocket teeth on the big chain ring to the plurality of small ring sprocket teeth on the small chain ring.

In one example, the chain ring component can be formed as one integrated component from the same material.

In one example, each of the electronic control unit, the gearmotor unit, the at least one upshift element, the at least one downshift element, and the power supply can be carried on the big chain ring of the chain ring component.

In one example, each of the electronic control unit, the gearmotor unit, the at least one upshift element, the at least one downshift element, and the power supply can be carried on an outboard surface of the big chain ring.

In one example, the at least one downshift element can include a first downshift element and a second downshift element positioned opposite the first downshift element around a circumference of the chain ring component In one example, a first downshift element of the shift mechanism and an upshift element of the shift mechanism can be operable by a first link coupled to the gearmotor unit.

In one example, the shift mechanism can include a first cam shaft coupled to the gearmotor unit and rotatable about a first cam axis. An upshift driver can be rotatable about the first cam axis and configured to move an upshift element of the shift mechanism between an upshift state capable of engaging a chain on the small ring sprocket teeth of the small chain ring and a neutral state not capable of engaging a chain on the chain ring component. A first downshift driver can be rotatable about the first cam axis and configured to move a first downshift element of the shift mechanism between a downshift state capable of engaging a chain on the big ring sprocket teeth of the big chain ring and a neutral state not capable of engaging a chain on the chain ring component.

In one example, when an upshift element of the shift mechanism moves to an upshift state to engage a chain, a first downshift element of the shift mechanism can be in a neutral state to not engage the chain. When the first downshift element moves to a downshift state to engage the chain, the upshift element can be in a neutral state to not engage the chain.

In one example, the shift mechanism can include a second cam shaft coupled to the gearmotor unit and rotatable about a second cam axis. A second downshift driver can be rotatable about the second cam axis and configured to move a second downshift element of the shift mechanism between a downshift state capable of engaging a chain on the big ring sprocket teeth of the big chain ring and a neutral state not capable of engaging a chain on the chain ring component.

In one example, when an upshift element of the shift mechanism moves to an upshift state to engage a chain, a first downshift element and a second downshift element of the shift mechanism can be in a neutral state to not engage the chain. When the first and second downshift elements move to a downshift state to engage the chain, the upshift element can be in the neutral state to not engage the chain.

In one example, a first downshift element and a second downshift element of the shift mechanism can move in concert with one another between a downshift state and a neutral state.

In one example, a second downshift element of the shift mechanism can be operable by a second link coupled to the gearmotor unit.

In one example according to the teachings of the present disclosure, a front shifting system for a bicycle includes a shifter mountable on the bicycle. The shifter is operable to transmit a wireless signal. The front shifting system includes a crank assembly having two crank arms and a pedal associated with each of the two crank arms. The crank assembly is rotatable about a rotation axis. The front shifting system includes a chain and a front shift unit coupled to the crank assembly and rotatable about the rotation axis. The front shift unit includes a chain ring component with a big chain ring and a small chain ring. The small chain ring has a small diameter and the big chain ring has a big diameter that is larger than the small diameter. The front shift unit also includes a shift mechanism coupled to and rotatable with the chain ring component about the rotation axis. The shift mechanism is configured to receive the wireless signal from the shifter and to shift the chain between the big chain ring and the small chain ring according to the wireless signal.

In one example, the shifter can be mountable on a bicycle remote from the front shift unit.

In one example, the shift mechanism can include an electronic control unit, a gearmotor unit in communication with the electronic control unit, at least one upshift element coupled to the gearmotor unit, at least one downshift element coupled to the gearmotor unit, and a power supply arranged to provide power for the electronic control unit and the gearmotor unit to operate the at least one upshift element and the at least one downshift element.

In one example, according to a wireless upshift signal received by the electronic control unit, the at least one upshift element can be operable by the gearmotor unit to shift the chain from the small chain ring to the big chain ring. According to a wireless downshift signal received by the electronic control unit, the at least one downshift element can be operable by the gearmotor unit to shift the chain from the big chain ring to the small chain ring.

In one example, each of the electronic control unit, the gearmotor unit, the at least one upshift element, the at least one downshift element, and the power supply can be carried on the big chain ring of the chain ring component.

In one example, at least one downshift element of the shift mechanism can include a first downshift element and a second downshift element, which can be positioned opposite the first downshift element around a circumference of the chain ring component.

In one example, a first downshift element and an upshift element of the shift mechanism can be operable by a first link coupled to the gearmotor unit.

In one example, a second downshift element of the shift mechanism can be operable by a second link coupled to the gearmotor unit.

In one example, the shift mechanism can include a first cam shaft coupled to the gearmotor unit and rotatable about a first cam axis. The shift mechanism can also include an upshift driver rotatable about the first cam axis and configured to move an upshift element of the shift mechanism between an upshift state engaging the chain on the small chain ring and a neutral state not engaging the chain on the chain ring component. The shift mechanism can also include a first downshift driver rotatable about the first cam axis and configured to move a first downshift element of the shift mechanism between a downshift state engaging the chain on the big chain ring and a neutral state not engaging the chain on the chain ring component.

In one example, when an upshift element of the shift mechanism moves to an upshift state, a first downshift element can be in a neutral state. When the first downshift element moves to a downshift state, the upshift element can be in the neutral state.

In one example, the shift mechanism can include a second cam shaft coupled to the gearmotor unit and rotatable about a second cam axis. The shift mechanism can also include a second downshift driver rotatable about the second cam axis and configured to move a second downshift element of the shift mechanism between a downshift state engaging the chain on the big chain ring and a neutral state not engaging the chain on the chain ring component.

In one example, when an upshift element of the shift mechanism moves to an upshift state, a first downshift element and a second downshift element of the shift mechanism can be in a neutral state. When the first and second downshift elements move to a downshift state, the upshift element can be in the neutral state.

In one example, first and second downshift elements of the shift mechanism can move in concert with one another between a downshift state and a neutral state.

In one example, the chain ring component can be formed as one integral structure including the big chain ring and the small chain ring.

In one example according to the teachings of the present disclosure, a method of mounting a front shift system on a bicycle includes mounting a shifter to a portion of the bicycle. The shifter is operable to transmit a wireless signal. A crank assembly rotatable about a rotation axis is attached to a frame of the bicycle. The crank assembly has two crank arms, a pedal associated with each of the two crank arms, and a front shift unit coupled to the crank assembly for rotation therewith about the rotation axis. The front shift unit has a chain ring component and a shift mechanism carried by the chain ring component. A chain is connected between the chain ring component and a rear cassette of the bicycle. The shifter is paired with an electronic control unit of the shift mechanism carried by the chain ring component.

In another example a bicycle front shifting assembly is presented. The front shifting assembly includes a front shift unit configured to be coupled to a crank assembly for rotation therewith about a rotation axis, the front shift unit having a chain ring component and a shift mechanism coupled to the chain ring component. The chain ring component has a big chain ring having a plurality of teeth defining a big chainring plane and a small chain ring having a plurality of teeth defining a small chainring plane, the small chain ring having a small diameter and the big chain ring having a big diameter that is larger than the small diameter. The shift mechanism includes at least one protruding shift element disposed in a transition zone between the big chain ring and the small chain ring, the shift mechanism configured to move the at least one protruding shift element axially between the big chainring plane and the small chainring plane. The shift mechanism may include a plurality of protruding shift elements disposed in the transition zone. The plurality of protruding shift elements may be upshift elements. The shift mechanism may include an upshift element configured to move axially to intersect the small chain ring plane. The upshift element configured to move axially to intersect the small chain ring plane may be disposed radially between a root circle and a tooth tip circle of the small chain ring. The shift mechanism may further include at least one downshift element movable relative to the front shift unit to selectively engage the chain to execute a downshift of a chain from the big chain ring to the small chain ring. The at least one downshift element may include a first downshift element and a second downshift element. The second downshift element may be positioned opposite the first downshift element around a circumference of the chain ring component. The front shift unit may further comprise an electric motor rotating fixed to the chain ring component, the electric motor configured to cause the at least one protruding shift element to move axially. The shift mechanism may further include at least one downshift element movable relative to the front shift unit to selectively engage the chain to execute a downshift of a chain from the big chain ring to the small chain ring, and the electric motor is configured to also cause the downshift element to move.

In another example, a front shift unit for a bicycle is provided. The front shift unit includes a chain ring component having a big chain ring and a small chain ring joined for co-rotation with one another about a rotation axis, the big chain ring having a big diameter and a plurality of big ring sprocket teeth and the small chain ring having a small diameter and a plurality of small ring sprocket teeth, the big diameter being larger than the small diameter. The front shift unit also includes a shift mechanism coupled to the chain ring component, the shift mechanism including an electronic control unit, a gearmotor unit, at least one upshift element, at least one downshift element, and a power supply arranged to provide power for the electronic control unit and the gearmotor unit to operate the at least one upshift element and the at least one downshift element. The at least one upshift element is disposed in a transition zone between the small chain ring teeth and the big chain ring teeth and axially movable by the electronic control unit and the gearmotor unit to shift a chain from the plurality of small ring sprocket teeth on the small chain ring to the plurality of big ring sprocket teeth on the big chain ring. The at least one downshift element is operable by the electronic control unit and the gearmotor unit to shift a chain from the plurality of big ring sprocket teeth on the big chain ring to the plurality of small ring sprocket teeth on the small chain ring. The chain ring component may be formed as one integrated component from the same material. The at least one upshift element may include a plurality of upshift elements. Each of the electronic control unit, the gearmotor unit, the at least one upshift element, the at least one downshift element, and the power supply may be carried on an outboard surface of the big chain ring. The at least one downshift element includes a first downshift element and a second downshift element positioned opposite the first downshift element around a circumference of the chain ring component. The first downshift element and the upshift element may be operable by a first link coupled to the gearmotor unit.

The shift mechanism may further include a first cam shaft coupled to the gearmotor unit and rotatable about a first cam axis, an upshift driver rotatable about the first cam axis and configured to move the upshift element between an upshift state capable of engaging a chain on the small ring sprocket teeth of the small chain ring and a neutral state not capable of engaging a chain on the chain ring component, and a first downshift driver rotatable about the first cam axis and configured to move the first downshift element between a downshift state capable of engaging a chain on the big ring sprocket teeth of the big chain ring and a neutral state not capable of engaging a chain on the chain ring component. The upshift element may move to the upshift state, the first downshift element is in the neutral state, and wherein, when the first downshift element moves to the downshift state, the upshift element is in the neutral state. The shift mechanism may further include a second cam shaft coupled to the gearmotor unit and rotatable about a second cam axis, and a second downshift driver rotatable about the second cam axis and configured to move the second downshift element between the downshift state capable of engaging a chain on the big ring sprocket teeth of the big chain ring and the neutral state not capable of engaging a chain on the chain ring component. The at least one upshift element may include a plurality of upshift elements and the plurality of upshift elements move in concert with one another to achieve the upshift state.

Although certain front shifting system examples, front shift unit examples, shifting mechanisms, parts, and/or components of same, and shifting methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this depiction should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to fewer than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle front shifting assembly, comprising:
a front shift unit configured to be coupled to a crank assembly for rotation therewith about a rotation axis, the front shift unit having a chain ring component and a shift mechanism coupled to the chain ring component,
wherein the chain ring component has a big chain ring having a plurality of teeth defining a big chainring plane and a small chain ring having a plurality of teeth defining a small chainring plane, the small chain ring having a small diameter and the big chain ring having a big diameter that is larger than the small diameter, and
wherein the shift mechanism includes plurality of protruding shift elements disposed in a transition zone between the big chain ring and the small chain ring, the shift mechanism configured to moves the plurality of protruding shift elements axially between the big chainring plane and the small chainring plane,
wherein the plurality of protruding shift elements disposed in the transition zone are upshift elements.

2. The front shifting assembly of claim 1, wherein the upshift elements are configured to move axially to intersect the small chain ring plane.

3. The front shifting assembly of claim 2, wherein the upshift element configured to move axially to intersect the small chain ring plane is disposed radially between a root circle and a tooth tip circle of the small chain ring.

4. The front shifting assembly of claim 1, wherein the shift mechanism further includes at least one downshift element movable relative to the front shift unit to selectively engage a chain to execute a downshift of the chain from the big chain ring to the small chain ring.

5. The front shifting assembly of claim 4, wherein the at least one downshift element includes a first downshift element and a second downshift element.

6. The front shifting assembly of claim 5, wherein the second downshift element is positioned opposite the first downshift element around a circumference of the chain ring component.

7. The front shifting assembly of claim 4, wherein the front shift unit further comprises an electric motor rotating fixed to the chain ring component, the electric motor configured to cause the plurality of protruding shift elements to move axially.

8. The front shifting assembly of claim 7, wherein the shift mechanism further includes the at least one downshift element movable relative to the front shift unit to selectively engage the chain to execute a downshift of the chain from the big chain ring to the small chain ring, and the electric motor is configured to also cause the at least one downshift element to move.

9. A front shift unit for a bicycle, the front shift unit comprising:
a chain ring component having a big chain ring and a small chain ring joined for co-rotation with one another about a rotation axis, the big chain ring having a big diameter and a plurality of big ring sprocket teeth and the small chain ring having a small diameter and a plurality of small ring sprocket teeth, the big diameter being larger than the small diameter; and
a shift mechanism coupled to the chain ring component, the shift mechanism including an electronic control unit, a gearmotor unit, at least one upshift element, at least one downshift element, and a power supply arranged to provide power for the electronic control unit and the gearmotor unit to operate the at least one upshift element and the at least one downshift element,
wherein, the at least one upshift element is disposed in a transition zone between the small ring sprocket teeth and the big ring sprocket teeth and axially movable by the electronic control unit and the gearmotor unit to shift a chain from the plurality of small ring sprocket teeth on the small chain ring to the plurality of big ring sprocket teeth on the big chain ring,
wherein, the at least one downshift element is operable by the electronic control unit and the gearmotor unit to shift the chain from the plurality of big ring sprocket teeth on the big chain ring to the plurality of small ring sprocket teeth on the small chain ring, and
wherein the at least one upshift element disposed in the transition zone includes plurality of protruding elements.

10. The front shift unit of claim 9, wherein the chain ring component is formed as one integrated component from a same material.

11. A front shift unit for a bicycle, the front shift unit comprising:
a chain ring component having a big chain ring and a small chain ring joined for co-rotation with one another about a rotation axis, the big chain ring having a big diameter and a plurality of big ring sprocket teeth and the small chain ring having a small diameter and a plurality of small ring sprocket teeth, the big diameter being larger than the small diameter; and a shift mechanism coupled to the chain ring component, the shift mechanism including an electronic control unit, a gearmotor unit, at least one upshift element, at least one downshift element, and a power supply arranged to provide power for the electronic control unit and the gearmotor unit to operate the at least one upshift element and the at least one downshift element, wherein, the at least one upshift element is disposed in a transition zone between the small ring sprocket teeth and the big ring sprocket teeth and axially movable by the electronic control unit and the gearmotor unit to shift a chain from the plurality of small ring sprocket teeth on the small chain ring to the plurality of big ring sprocket teeth on the big chain ring, wherein, the at least one downshift element is operable by the electronic control unit and the gearmotor unit to shift the chain from the plurality of big ring sprocket teeth on the big chain ring to the plurality of small ring sprocket teeth on the small chain ring, and wherein each of the electronic control unit, the gearmotor unit, the at least one upshift element, the at least one downshift element, and the power supply are carried on an outboard surface of the big chain ring.

12. A front shift unit for a bicycle, the front shift unit comprising:
a chain ring component having a big chain ring and a small chain ring joined for co-rotation with one another about a rotation axis, the big chain ring having a big diameter and a plurality of big ring sprocket teeth and the small chain ring having a small diameter and a plurality of small ring sprocket teeth, the big diameter being larger than the small diameter; and
a shift mechanism coupled to the chain ring component, the shift mechanism including an electronic control unit, a gearmotor unit, at least one upshift element, at least one downshift element, and a power supply arranged to provide power for the electronic control unit and the gearmotor unit to operate the at least one upshift element and the at least one downshift element,
wherein, the at least one upshift element is disposed in a transition zone between the small ring sprocket teeth and the big ring sprocket teeth and axially movable by the electronic control unit and the gearmotor unit to shift a chain from the plurality of small ring sprocket teeth on the small chain ring to the plurality of big ring sprocket teeth on the big chain ring,
wherein, the at least one downshift element is operable by the electronic control unit and the gearmotor unit to shift the chain from the plurality of big ring sprocket teeth on the big chain ring to the plurality of small ring sprocket teeth on the small chain ring, and
wherein the at least one downshift element includes a first downshift element and a second downshift element positioned opposite the first downshift element around a circumference of the chain ring component.

13. The front shift unit of claim 12, wherein the first downshift element and the at least one upshift element are operable by a first link coupled to the gearmotor unit.

14. The front shift unit of claim 13, wherein the shift mechanism further comprises:
a first cam shaft coupled to the gearmotor unit and rotatable about a first cam axis;
an upshift driver rotatable about the first cam axis and configured to move the at least one upshift element between an upshift state capable of engaging the chain on the small ring sprocket teeth of the small chain ring and a neutral state not capable of engaging the chain on the chain ring component; and
a first downshift driver rotatable about the first cam axis and configured to move the first downshift element between a downshift state capable of engaging the chain on the big ring sprocket teeth of the big chain ring and a neutral state not capable of engaging the chain on the chain ring component.

15. The front shift unit of claim 14, wherein, when the at least one upshift element moves to the upshift state, the first downshift element is in the neutral state, and wherein, when the first downshift element moves to the downshift state, the at least one upshift element is in the neutral state.

16. The front shift unit of claim 14, wherein the shift mechanism further comprises:
a second cam shaft coupled to the gearmotor unit and rotatable about a second cam axis; and
a second downshift driver rotatable about the second cam axis and configured to move the second downshift element between the downshift state capable of engaging the chain on the big ring sprocket teeth of the big chain ring and a neutral state not capable of engaging the chain on the chain ring component.

17. The front shift unit of claim 16, wherein the at least one upshift element includes a plurality of upshift elements and the plurality of upshift elements move in concert with one another to achieve the upshift state.

* * * * *